(12) United States Patent
Zhou

(10) Patent No.: US 10,371,938 B2
(45) Date of Patent: Aug. 6, 2019

(54) METHOD AND APPARATUS TO ACHIEVE VIRTUAL REALITY WITH A FLEXIBLE DISPLAY

(71) Applicant: Yuchen Zhou, San Jose, CA (US)

(72) Inventor: Yuchen Zhou, San Jose, CA (US)

( * ) Notice: Subject to any disclaimer, the term of this patent is extended or adjusted under 35 U.S.C. 154(b) by 40 days.

(21) Appl. No.: 15/836,682

(22) Filed: Dec. 8, 2017

(65) Prior Publication Data

US 2018/0146183 A1    May 24, 2018

Related U.S. Application Data

(63) Continuation-in-part of application No. 15/601,383, filed on May 22, 2017, now Pat. No. 10,178,367, which is a continuation of application No. 14/162,758, filed on Jan. 24, 2014, now Pat. No. 9,699,433, application No. 15/386,682, which is a continuation of application No. 14/582,199, filed on Dec. 24, 2014, now abandoned.

(60) Provisional application No. 61/771,091, filed on Mar. 1, 2013, provisional application No. 61/756,433, filed on Jan. 24, 2013.

(51) Int. Cl.
| | |
|---|---|
| G06F 3/01 | (2006.01) |
| G02B 26/08 | (2006.01) |
| G02B 27/00 | (2006.01) |
| G02B 27/01 | (2006.01) |
| H04N 13/122 | (2018.01) |
| H04N 13/322 | (2018.01) |
| H04N 13/332 | (2018.01) |
| H04N 13/344 | (2018.01) |
| H04N 13/383 | (2018.01) |

(52) U.S. Cl.
CPC ..... *G02B 26/0833* (2013.01); *G02B 26/0825* (2013.01); *G02B 27/0093* (2013.01); *G02B 27/0172* (2013.01); *G06F 3/013* (2013.01); *H04N 13/122* (2018.05); *H04N 13/322* (2018.05); *H04N 13/344* (2018.05); *H04N 13/383* (2018.05); *G02B 2027/0178* (2013.01); *H04N 13/332* (2018.05)

(58) Field of Classification Search
CPC .............. G02B 26/08; G02B 26/0825; G02B 26/0833; G02B 27/0093; G02B 27/017; G02B 27/0172; G02B 2027/0138; G02B 2027/0187; G02B 2027/0178; H04N 13/344; H04N 13/383; H04N 13/322; H04N 13/122; G06F 3/013
See application file for complete search history.

(56) References Cited

U.S. PATENT DOCUMENTS

| | | | |
|---|---|---|---|
| 5,576,780 A | 11/1996 | Yancey et al. | |
| 6,008,781 A * | 12/1999 | Furness, III | G02B 27/017 345/8 |

(Continued)

*Primary Examiner* — John Villecco

(57) ABSTRACT

The current invention relates to the method to achieve virtual reality or augmented reality with using flexible substrate containing light emitting arrays, or optical passage arrays, to project image upon the retinas of human eyes. Further, it relates to the method to detect the real-time focal length change of the eye-lens and modify the flexible substrate's curvature and distance from the eye to vary global angle configurations of light beams that go into the eye to produce images on the retina at various focus depth of the eyes to achieve re-focusable artificial vision.

20 Claims, 43 Drawing Sheets

(56) References Cited

U.S. PATENT DOCUMENTS

| | | | |
|---|---|---|---|
| 6,215,593 B1* | 4/2001 | Bruce | G02B 6/08 359/619 |
| 6,317,103 B1* | 11/2001 | Furness, III | G02B 27/017 345/8 |
| 6,639,570 B2* | 10/2003 | Furness, III | G02B 27/017 345/8 |
| 7,639,208 B1 | 12/2009 | Ha et al. | |
| 8,248,458 B2* | 8/2012 | Schowengerdt | G02B 26/005 348/43 |
| 8,482,858 B2* | 7/2013 | Sprague | G02B 27/0172 359/630 |
| 8,520,309 B2* | 8/2013 | Sprague | G02B 27/286 359/630 |
| 8,786,675 B2* | 7/2014 | Deering | G09G 3/02 348/46 |
| 8,922,897 B2* | 12/2014 | Sprague | G02B 27/286 359/630 |
| 9,076,368 B2 | 7/2015 | Evans et al. | |
| 9,137,524 B2 | 9/2015 | Maciocci | |
| 9,250,445 B2* | 2/2016 | Tosaya | G02B 27/0172 |
| 9,251,745 B2* | 2/2016 | Sprague | G02B 27/286 |
| 9,354,445 B1 | 5/2016 | Weaver et al. | |
| 9,507,174 B2* | 11/2016 | Qin | G02B 27/2214 |
| 9,530,382 B2* | 12/2016 | Simmons | G02B 27/225 |
| 9,576,399 B2* | 2/2017 | Lo | G06T 7/00 |
| 9,874,760 B2* | 1/2018 | Hua | G02B 27/0101 |
| 9,927,614 B2* | 3/2018 | Vallius | G02B 3/14 |
| 9,933,620 B2* | 4/2018 | Van Heugten | G02C 7/04 |
| 9,989,765 B2* | 6/2018 | Jepsen | G02B 27/0172 |
| 9,995,857 B2* | 6/2018 | Evans | H04N 13/363 |
| 10,073,268 B2* | 9/2018 | Alexander | G06F 3/013 |
| 10,168,550 B2* | 1/2019 | Kinser | B29D 11/00028 |
| 10,216,008 B2* | 2/2019 | Kinser | B29D 11/00028 |
| 2002/0163484 A1* | 11/2002 | Furness, III | G02B 27/017 345/32 |
| 2003/0095081 A1* | 5/2003 | Furness, III | G02B 27/017 345/32 |
| 2004/0027536 A1 | 2/2004 | Blum et al. | |
| 2008/0117289 A1* | 5/2008 | Schowengerdt | G02B 26/005 348/46 |
| 2009/0196460 A1 | 8/2009 | Jakobs et al. | |
| 2010/0053030 A1* | 3/2010 | Sprague | G02B 27/286 345/7 |
| 2010/0149073 A1* | 6/2010 | Chaum | G02B 27/0093 345/8 |
| 2010/0749073 | 6/2010 | Chaum et al. | |
| 2011/0075257 A1* | 3/2011 | Hua | G02B 27/017 359/464 |
| 2011/0227820 A1 | 9/2011 | Haddick et al. | |
| 2012/0089488 A1 | 4/2012 | Letchford | |
| 2012/0194418 A1 | 8/2012 | Osterhout et al. | |
| 2012/0287123 A1 | 11/2012 | Starner et al. | |
| 2012/0290401 A1 | 11/2012 | Neven et al. | |
| 2012/0294590 A1 | 11/2012 | Pitts et al. | |
| 2012/0327101 A1 | 12/2012 | Blixt et al. | |
| 2012/0327222 A1 | 12/2012 | Ng et al. | |
| 2013/0002846 A1 | 1/2013 | Brujin et al. | |
| 2013/0016070 A1 | 1/2013 | Starner et al. | |
| 2013/0021658 A1 | 1/2013 | Miao et al. | |
| 2013/0033756 A1* | 2/2013 | Spitzer | G02B 27/0176 359/630 |
| 2013/0187835 A1 | 7/2013 | Vaught et al. | |
| 2013/0201080 A1 | 8/2013 | Evans et al. | |
| 2013/0201081 A1 | 8/2013 | Evans et al. | |
| 2014/0118829 A1 | 5/2014 | Ma et al. | |
| 2014/0292620 A1* | 10/2014 | Lapstun | G02B 26/10 345/6 |
| 2015/0015814 A1* | 1/2015 | Qin | G02B 27/2214 349/13 |
| 2015/0077312 A1* | 3/2015 | Wang | G02B 27/017 345/7 |
| 2015/0097756 A1 | 4/2015 | Ziarati et al. | |
| 2015/0212326 A1 | 7/2015 | Kress et al. | |
| 2015/0301338 A1* | 10/2015 | Van Heugten | G02C 7/04 345/8 |
| 2016/0077336 A1* | 3/2016 | Hainich | G02B 27/017 345/8 |
| 2016/0170097 A1* | 6/2016 | Milton | B29D 11/00038 349/13 |
| 2016/0260258 A1 | 9/2016 | Lo | G06T 7/00 |
| 2016/0363770 A1* | 12/2016 | Kim | G02B 27/0172 |
| 2017/0171533 A1* | 6/2017 | Benitez | H04N 13/383 |
| 2017/0345402 A1* | 11/2017 | Zhou | G06T 7/11 |
| 2017/0353717 A1* | 12/2017 | Zhou | H04N 9/3182 |
| 2017/0372683 A1* | 12/2017 | Du | G09G 5/10 |
| 2018/0120573 A1* | 5/2018 | Ninan | G02B 27/0179 |
| 2018/0239177 A1* | 8/2018 | Oh | G02F 1/137 |
| 2018/0329219 A1* | 11/2018 | Muller | G02B 27/2214 |

* cited by examiner

*FIG. 1 (Prior Art - Background)*

*FIG. 2 (Prior Art - Background)*

METHOD AND APPARATUS TO ACHIEVE VIRTUAL REALITY WITH A FLEXIBLE DISPLAY

CROSS-REFERENCE TO RELATED APPLICATIONS

The present application is a Continuation-In-Part of the commonly assigned application bearing Ser. No. 15/601,383, filed on May 22, 2017, by Yuchen ZHOU, and entitled "METHOD AND APPARATUS TO REALIZE VIRTUAL REALITY." The application Ser. No. 15/601,383 is a continuation of the commonly assigned application bearing Ser. No. 14/162,758, filed Jan. 24, 2014, entitled "METHOD AND APPARATUS TO PRODUCE RE-FOCUSABLE VISION WITH DETECTING RE-FOCUSING EVENT FROM HUMAN EYE," which claims the benefit of the provisional application bearing Ser. No. 61/756,443, filed on Jan. 24, 2013, by Yuchen ZHOU, and entitled "Re-focusable stereo vision," as well as the benefit of the provisional application bearing Ser. No. 61/771,091, filed on Mar. 1, 2013, by Yuchen ZHOU, and entitled "RE-FOCUSABLE STEREO VISION." The present application is a continuation of the commonly assigned application bearing Ser. No. 14/582,199, filed on Dec. 24, 2014, entitled "METHOD AND APPARATUS TO PROJECT IMAGE ON RETINA AT VARIOUS FOCAL DEPTHS UTILIZING FLEXIBLE SUBSTRATE CONTAINING OPTICAL ARRAY."

BACKGROUND

The current invention generally relates to three-dimensional visual perception technology and more particularly to a system and method for realizing real-time re-focusable stereo vision.

Stereo vision, or stereoscopic vision, better known as 3D vision, realizes three-dimensional visual perception of an object by recording the images of the same object from at least two different viewing angles, and then displaying the two different images separately to each of the two eyes of a viewer. The viewer perception from the separately shown images of the same object to different eyes with different viewing angles is a three-dimensional object existing in the viewer's viewing space.

For motion picture utilizing stereo vision, i.e. 3D movies, image recording by the recording devices generally has only a single focus depth. The objects not being focused upon by the recording devices stay de-focused in the recorded images and are perceived as blurred objects to the viewer during stereoscopic playback of the 3D movies. In prior art practices of 3D recording and viewing, a viewer is not given the ability to re-focus on the defocused and blurred objects as one can do in reality.

For a 3D viewing experience of the viewer to better simulate a real-life three-dimensional visualization of objects within the viewing space of the viewer, it is desirable for a viewer to be able to focus on the objects of interest and be able to re-focus on new objects within the same viewing space, following viewer's own re-focusing intention, for example by viewer's eye-lens change, eyeball position change or brain-wave pattern change that naturally happen during a human vision re-focus event without viewer's active effort to change the focus depth of the shown images. Thus a reality viewing experience can be achieved. The ability of being able to focus on objects of interest by viewer's intention, without active effort from viewer, during stereo vision, gives unprecedented advantage in its closest-to-reality viewing experience. This ability will promote stereo vision's application in areas where varying focus depth vision provides best life-like visual comprehension of an object of interest.

As shown in FIG. 1, vision of a human eye 11 is achieved by three key optical components that determine the imaging of surrounding objects that the eye can see: the Lens (eye-lens) 1, the Retina 2, and the Iris 3. The lens 1 is the component that functions the same as the optical lenses used in cameras. Light reflected or emitted from an outside object passes through the pupil 9 and the lens 1. An optical image of the object is projected on the retina 2 with the light from the object being re-focused by the lens 1. The lens 1 is controlled by the Ciliary Muscle 4 and Ligament 5 which can compress or stretch the lens 1 shape, which in turn changes the optical focus depth of the lens 1 and makes objects at various distances from the viewer producing focused images on the retina 2, and thus the viewer can see objects far or near clearly. This control of lens focus depth gives a viewer the ability to see objects near and far at will. The retina 2 is like a film screen within a camera. When the light from an object passes through the lens 1 and is projected onto the retina 2 and makes a clear and focused image, the vision cells of the retina 2 sense the color and intensity of the projected image and send such information to human brain through the optical nerves 6, and thus human vision is realized. The iris 3 controls the total amount of light that can go into the eye by adjusting the pupil 9 size, which helps maintain the right amount of light intensity that goes into the eye 11 without damaging the retina cells.

FIG. 2 is a schematic diagram illustrating how normal human vision is achieved according to prior art. Same object 29 is projected into different images 25 and 26 in different eyes 21 and 22 of a viewer due to the angle of viewing is different for the two eyes 21 and 22. The angle difference as inferred from the two images 25 and 26 of the same object 29 in the two eyes 21 and 22 as being perceived by the brain is used to extract the information as to how far the object 29 is from the viewer. When images of the same object 29 are taken at different viewing angles, and then projected separately onto the retina 24 of the different eyes 21 and 22 of a viewer, the viewer can also have a similar distance perception of the object in the viewing space, where the object is actually not existent. This gives rise to the stereo vision, or 3D vision, meaning viewing of an object with a distance perception from the viewer.

FIG. 3 is a schematic diagram illustrating stereo-vision being achieved according to prior art. The principle function of all currently existing stereo-vision, or 3D vision, is the same, which includes: (1) Projecting two different images 391 and 392 of the same object 390 (not shown in FIG. 3) captured at two different angles on the same screen 38; (2) Allowing each eye 21 and 22 to see only one of the two images 391 and 392; and (3) The viewer with each eye 21 and 22 seeing a different projected image 25 and 26 from images 391 and 392 taken at different angle of the same object 390 perceives an imaginary object 39 in space that is at a distance from viewer different than the screen 38 where images 391 and 392 are shown.

When the stereo-vision is applied to a motion picture, a 3D movie is produced. The methods used to achieve each eye viewing different images are accomplished by wearing 3D viewing glasses that can do any of: (1) filter polarized light; (2) filter light of different colors; and (3) have timed shutter being synchronized with the showing of different viewing angle images on the screen. By showing the images of the same object recorded at different angles, arranging the images at different locations on the same screen, and using a method to individually show image recorded at different view angle to different eye, viewer perceived an imaginary object in space at a distance from the viewer different than the screen distance to the viewer.

FIG. 4 is a schematic diagram illustrating the problems of the prior art stereo-vision techniques. A fundamental drawback of all existing stereo-vision techniques and 3D movie techniques in the attempt to simulate real-life viewing experience is that when the object images are captured from two different viewing angles, objects 391 and 392 that are focused upon will show up as focused objects when projected on screen. Objects 491 and 492 within the same scene but not focused upon during recording will stay defocused on the screen 38. Thus, when viewer perceived the 3D image, only the objects 391 and 392 that are focused upon during image capturing can be viewed clearly, while other objects 491 and 492 stay blurred. Viewer only sees a clear imaginary object 39 from the images 391 and 392, while object 49 from images 491 and 492 are defocused. The existing prior art techniques do not allow viewer to view all objects within same scene clearly and does not have a method to bring objects into focus at viewer's own discretion. Even though other objects in the recorded images also show up on the same screen 38, due to the fact that the focus was only on the object where images 391 and 392 are taken from, other objects stay defocused. Thus, viewer's intention of focusing upon the objects 491 and 492 that are not currently in-focus cannot be achieved in conventional prior art stereo vision. This limitation makes 3D vision of prior art an obvious deviation from reality. In comparison, in real life, for objects near or far, a viewer can freely adjust to their distance with eye-lens focal length change and eyeball pupil position change and achieve clear view of any object in the viewing angle. Prior art is limited in the ability to re-produce the life-like stereo-vision viewing experience.

It is desired to have a method and an apparatus that can achieve real-time re-focusable vision based on viewer's own re-focus intention to simulate more life-like stereo-vision experience without active viewer participation or intervention.

SUMMARY OF THE INVENTION

This invention proposes a novel method to realize the real-time re-focusable stereo vision with utilizing: (1) producing stereoscopic images at multiple focus depth; (2) active sensing the intention of vision re-focus from the viewer; and (3) retrieving and displaying of the images with the focus depth according to sensed viewer-desired focus depth in real time to produce stereo vision to the viewer, which reflects viewer's intended focus depth with objects of interest being in-focus in viewer's vision.

This method provides the viewer the ability to view the objects of interest in focus at will, while not requiring the viewer's effort to actively participate to achieve such re-focus task.

This invention helps achieve 3D vision that most closely simulates real-life viewing experience, and can give the impression of viewing a real-life scene where viewer can focus on objects of interest with pure intention.

Viewer intention of re-focused is obtained by sensing and calculating the natural changes of the eye-lens shape and/or curvature, eye ball pupil position, or by brain-wave pattern.

Although this invention is intended to achieve re-focusable stereo vision, same techniques can also be used to achieve re-focusable non-stereoscopic flat vision without limitation.

BRIEF DESCRIPTION OF THE DRAWINGS

For purposes of clarity and brevity, like elements and components may bear the same designations and numbering throughout the Figures, which are not necessarily drawn to scale.

DETAILED DESCRIPTION OF THE INVENTION

Figure 1:
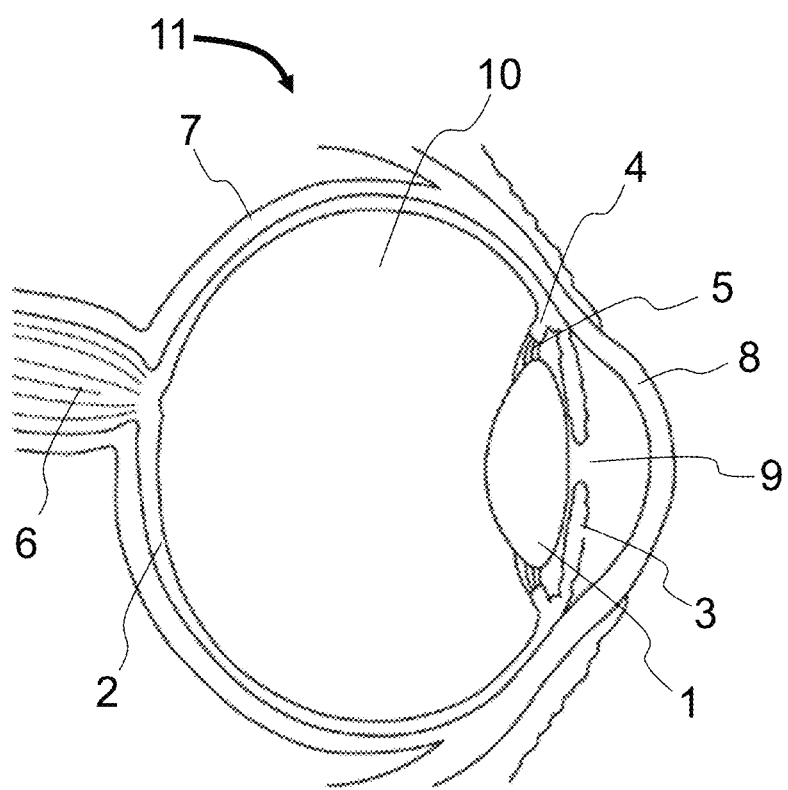
FIG. 1 is a schematic illustrating human eye's
Figure 2:
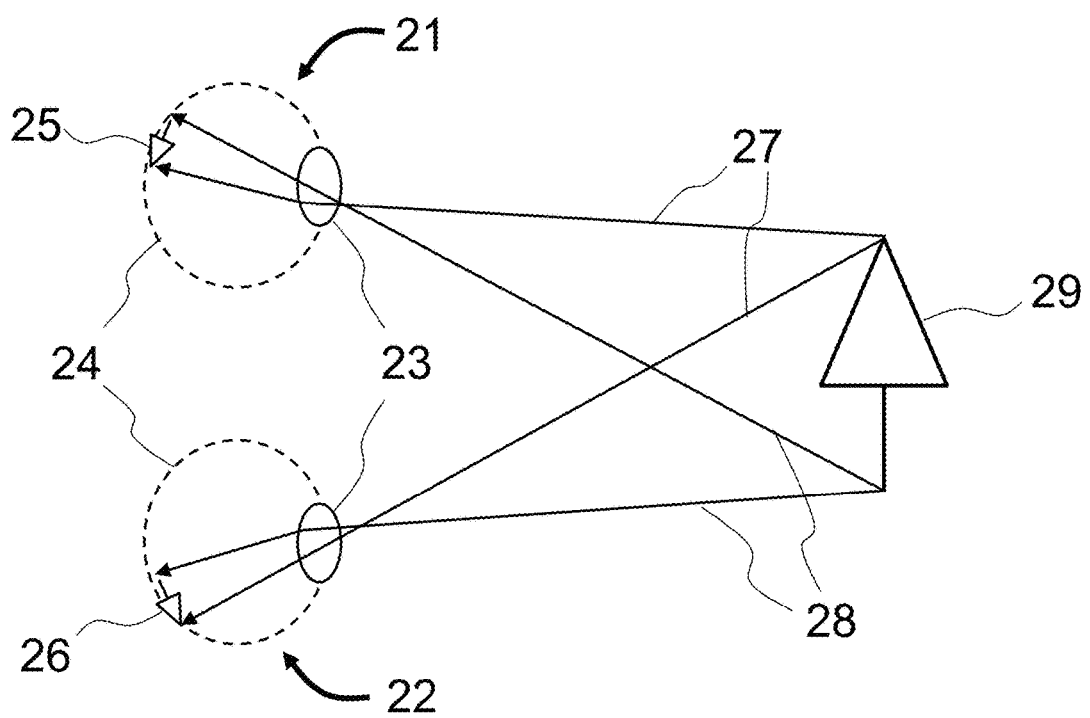
FIG. 2 is a schematic illustrating human vision being formed according to prior art.
Figure 3:
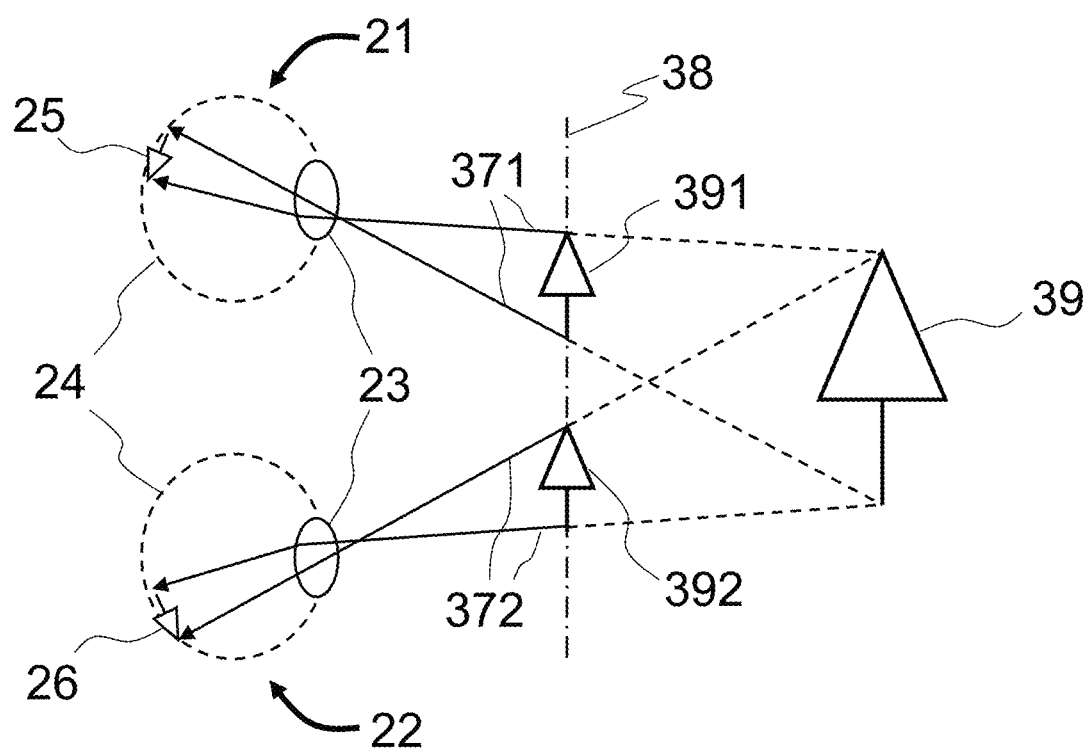
FIG. 3 is a schematic illustrating stereo-vision being formed according to prior art.
Figure 4:
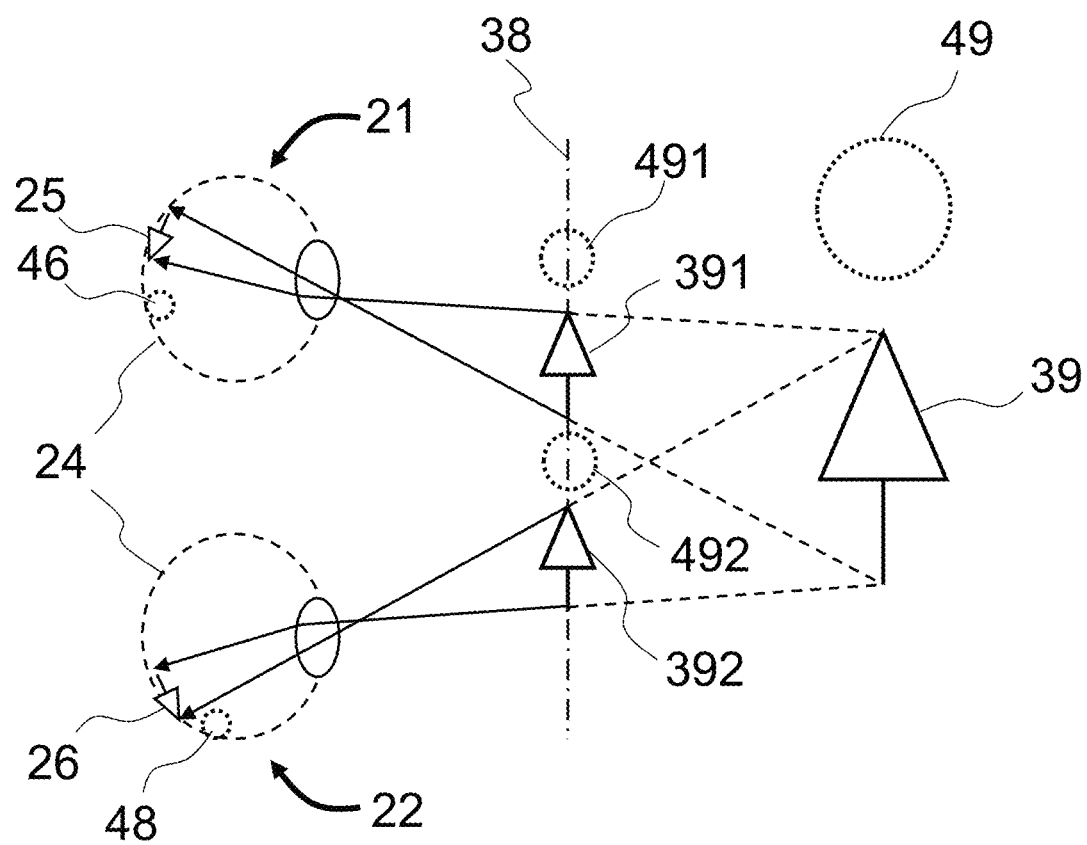
FIG. 4 is a schematic illustrating the limitation of the prior art stereo-vision techniques.

While the current invention may be embodied in many different forms, designs or configurations, for the purpose of promoting an understanding of the principles of the invention, reference will be made to the embodiments illustrated in the drawings and specific language will be used to describe the same. It will nevertheless be understood that no limitation or restriction of the scope of the invention is thereby intended. Any alterations and further implementations of the principles of the invention as described herein are contemplated as would normally occur to one skilled in the art to which the invention relates.

The first embodiment of the current invention is for static or motion pictures. The method according to the first embodiment includes the steps of: (Step 101) Recording of the same scene simultaneously into multiple images with each image recorded with a different focus depth into the scene on recording media; (Step 102) Active sensing the re-focus intention of viewer by monitoring the physiological change of viewer's eye including eye-lens change without viewer's active participation or physical action and generating such physiological change information; (Step 103) Calculating intended focus depth and/or intended in-focus objects in the scene from the physiological change information from Step 102; (Step 104) Retrieving the images with intended focus depth from the recording media containing recorded images from Step 101; and (Step 105) Displaying the retrieved image from Step 104 to the viewer's eyes.

In Step 102, the said physiological change of viewer's eye can also include the rotational position of the viewer's eye pupil.

In Step 105, an optical imaging system 18912 with a variable effective focus depth can be disposed in the optical path between the image and the viewer's eye, where the effective focus depth of the system is automatically adjusted to the viewer's eye-lens focus depth change in real-time according to the physiological change information from Step 102, such that the image of Step 105 shown on the same screen appears focused on the retina of the viewer's eye at various viewer's eye-lens focus depth. Such optical image system can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component composed of micro-electro-mechanical-system (MEMS) actuated lens, mirror or prism arrays that performs effectively as an optical lens or an optical concave or convex mirror.

Figure 5:
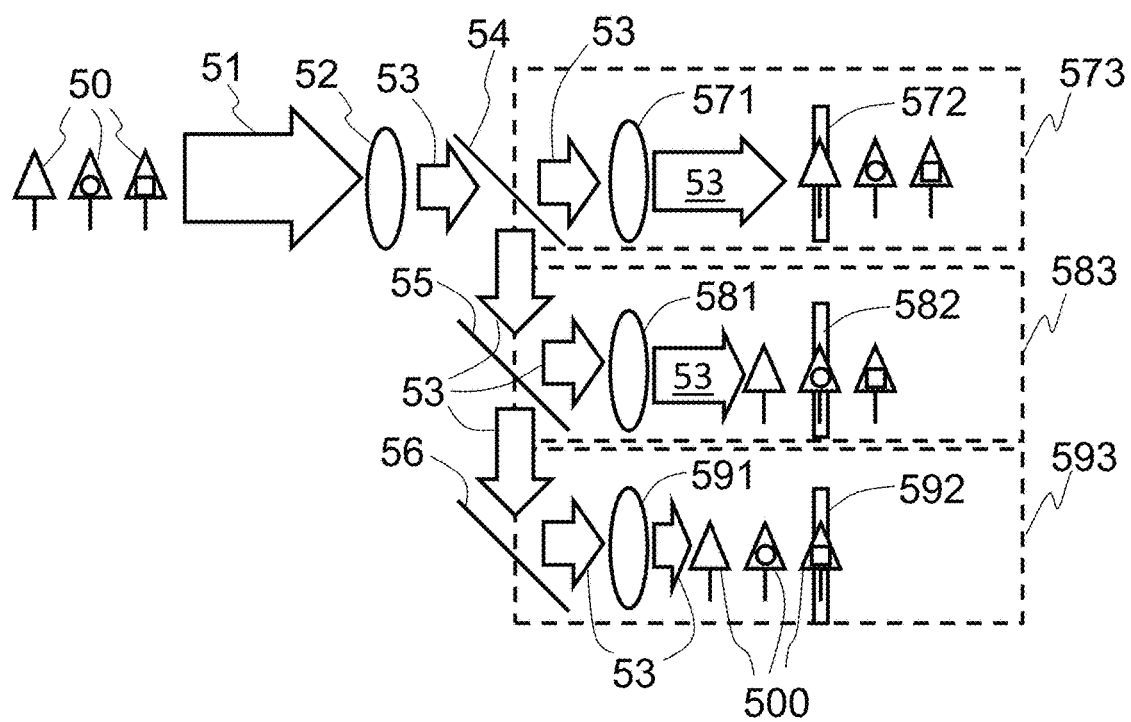
FIG. 5 is a schematic illustrating the first implementation for the step of recording of same scene simultaneously into multiple images with each image recorded with a different focus depth into the scene according to the embodiments of the current invention.

FIG. 5 is a schematic diagram illustrating a first implementation for the step of recording of same scene simultaneously into multiple images with each image recorded with a different focus depth into the scene according to the embodiments of the current invention. In this implementation, light splitters 54 and 55 are used to split incoming light 51 from scene into different light paths to realize different focus depth image recording on different recording media 572, 582 and 592. The light splitters 54 or 55 can be any of: a light splitter, a prism, a lens, or a shutter with mirror on light incoming side and shutter can be timed open and close to pass and reflect light. The light splitter 54 is preferably positioned at the phase plane of the objective lens 52. Both the objective lens 52 and the imaging lens 571, 581 or 591, can each be composed of a series of lenses. On different recording media 572, 582 and 592, images 500 of different objects of 50 at different distance from the objective lens 52 from the scene are in focus in different light paths 573, 583 and 593. Distance between recording media and imaging lens can be different in different light path 573, 583 and 593. Light splitter 54 and 55 transmission and reflection efficiencies may be different for different light path 573 and 583. Light reflector 56 provides total light reflection for the last light path 593. Different recording media 572, 582 and 592 may have different sensitivity to light intensity to adjust to the different incoming light intensity of each light path 573, 583 and 593. Imaging lens 571, 581 and 591 of different light path may have different focus depth and optical property.

There can be more than two light paths in the system and more than two light splitters accordingly. The two or more of similarly structured imaging system can be used to record multiple-focus-depth images of same scene in different viewing angles for stereo-vision purpose.

Figure 6:
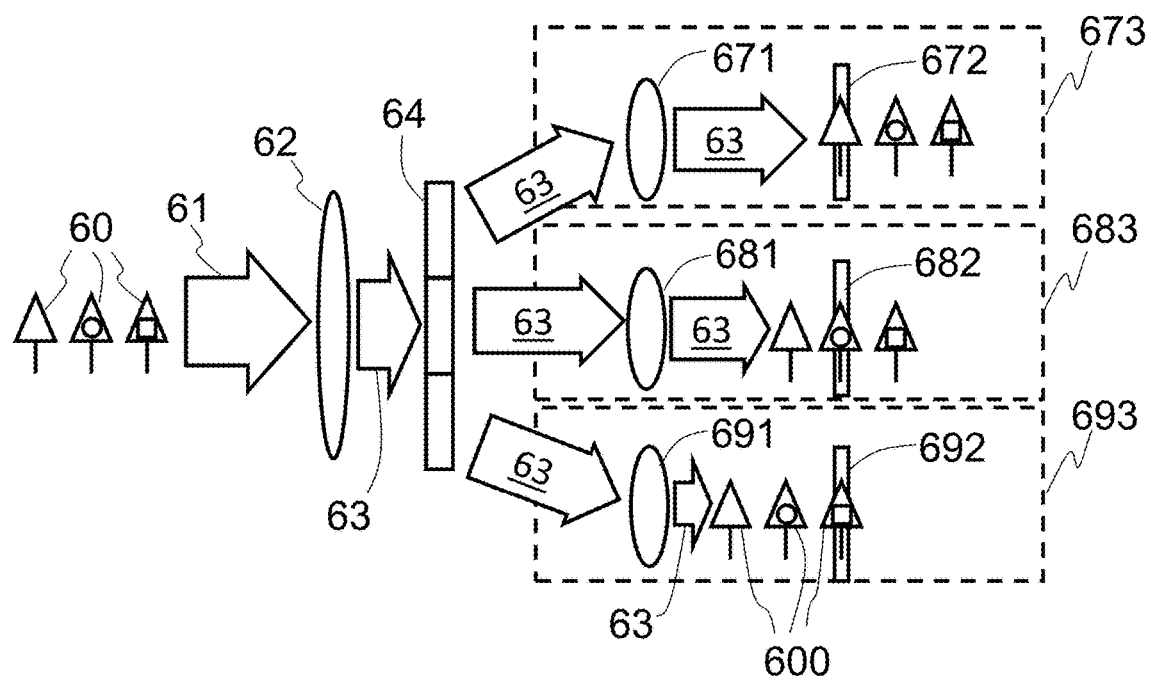
FIG. 6 is a schematic illustrating the second implementation for the step of recording of same scene simultaneously into multiple images with each image recorded with a different focus depth into the scene according to the embodiments of the current invention.

FIG. 6 is a schematic diagram illustrating the second implementation for the step of recording of same scene simultaneously into multiple images with each image recorded with a different focus depth into the scene. In this implementation, phase diverter 64 is used to divert incoming light 61 from scene into different light paths at different directions to realize different focus depth image recording on different recording media 672, 682 and 692. The phase diverter 64 can be any of: a lens array, a mirror array, a phase plate, or a phase plate array, which can be mechanically or electrically actuated. The phase diverter 64 is positioned at the phase plane (focus plane) of the objective lens 62. Both the objective lens and the imaging lens 671, 681 and 691 can each be composed of a series of lens. On different recording media 672, 682 and 692, images 600 of different objects 60 at different distance from the objective lens 62 from the scene are in focus in different light paths 673, 683 and 693. Different recording media 672, 682 and 692 may have different sensitivity to light intensity to adjust to the different incoming light intensity of each light path 673, 683 and 693. Distance between recording media 672, 682 or 692, and imaging lens 671, 681 or 691 can be different in different light path. Imaging lens 671, 681 and 691 may have different focus depth and optical property.

There can be more than three light paths in the system and more than three phase diverting paths accordingly. Two or more of similarly structured imaging system can be used to record multiple-focus-depth images of same scene in different viewing angles for stereo-vision.

With phase diverter 64 being a two-dimensional lens matrix at the phase plane of the objective lens 62, same scene may be recorded at different viewing angles simultaneously by a single system for stereo-vision purpose, i.e. multiple focus depth and multiple viewing angles recording can be achieved at same time.

Figure 7:
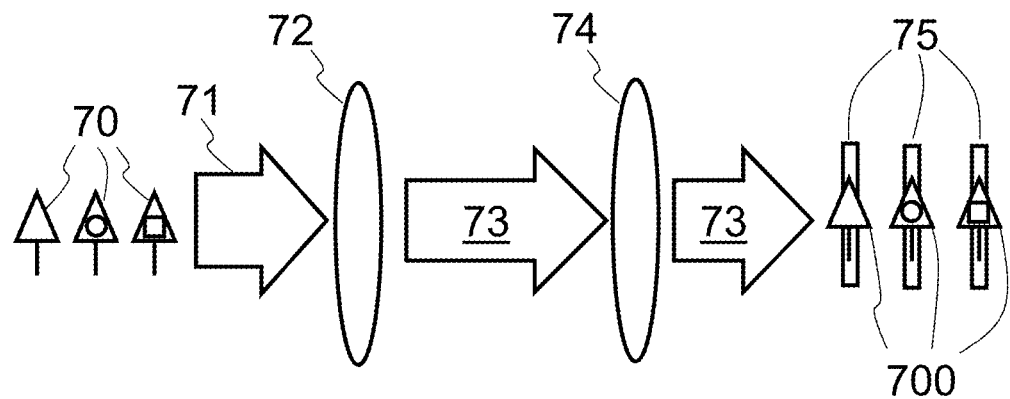
FIG. 7 is a schematic illustrating the third implementation for the step of recording of same scene simultaneously into multiple images with each image recorded with a different focus depth into the scene according to the embodiments of the current invention.

FIG. 7 is a schematic diagram illustrating the third implementation for the step of recording of same scene simultaneously into multiple images with each image recorded with a different focus depth into the scene. In this implementation, shuttered recording media 75 is used to record image of scene 700 with different distance objects in-focus on different recording media. Single light path with multiple recording media 75 arranged in an array along the light path. Both the objective lens 72 and the imaging lens 74 can each be composed of a series of lens. Recording media 75 are shuttered to open or close to allow the light 71 to go through or to record the image. At any instant time only one media is recording the image 700. When a recording media is receiving the incoming light and recording the image 700, all media behind will not record image and all media in front of the recording media will be shuttered open. After a media finishes recording, it can be shuttered open or a media in the front is shuttered close to allow another media to record image 700. On different recording media, images 700 from different objects 70 at different distance from the objective lens from the scene are in focus. Different recording media may have different sensitivity to light intensity to adjust to the different incoming light intensity.

Single light path of FIG. 7 can also be realized by having a single recording media 75 that moves from a position close to the imaging lens 74 and away to a position farther away from imaging lens 74, or moves in the reversed direction. During the moving process of the media 75, the images 700 of the objects 70 are captured by the recording media 75 at different distance from the imaging lens. To avoid overlapping the recorded images, image recorded by media 75 at different distance from lens 74 is constantly removed and stored and media 75 is refreshed. Alternatively, when one image of 700 is recorded by 75, before new image is recorded, the recorded image is transformed into data stream and stored in digital format in a separate data storage device.

Two or more of similarly structured imaging system can be used to record multiple-focus-depth images of same scene in different viewing angles for stereo-vision purpose.

Figure 8:
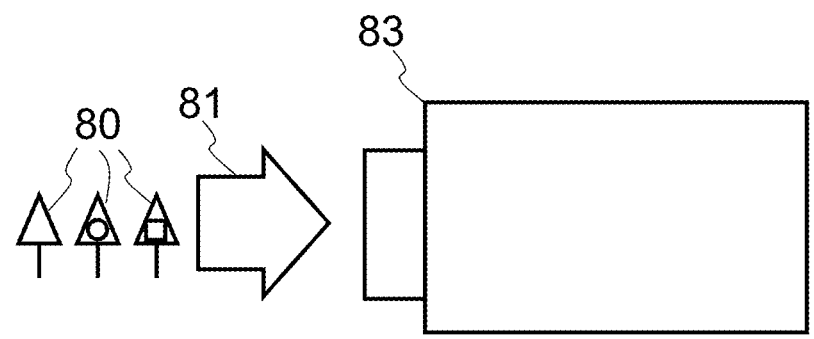
FIG. 8 is a schematic illustrating the fourth implementation for the step of recording of same scene simultaneously into multiple images with each image recorded with a different focus depth into the scene according to the embodiments of the current invention.

FIG. 8 is a schematic diagram illustrating the fourth implementation for the step of recording of same scene simultaneously into multiple images with each image recorded with a different focus depth into the scene. In this implementation, a light field recording device 83 is used to record image of scene with various focus depth and having different distance objects 80 in-focus. Multiple light field recording device can be used to record image of the scene at various viewing angles. Same light field recording device may be able to record same scene at different viewing angles, achieving multiple focus depth and stereoscopic recording at same time.

Figure 9:
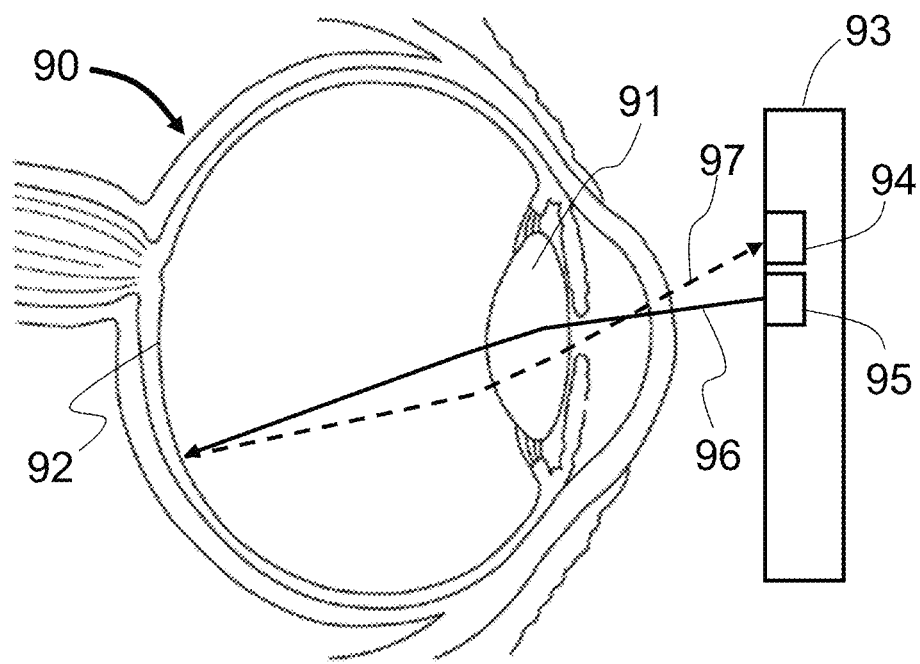
FIG. 9 is a schematic illustrating the first implementation for the step of sensing the re-focus intention of viewer according to the embodiments of the current invention.

FIG. 9 is a schematic diagram illustrating the first implementation for the step of sensing the re-focus intention of viewer according to the embodiments of the current invention. This implementation is for retrieving the viewer's eye-information by retina-reflected probing light. See-through substrate 93 can be any type of substrate that allows visible light to pass through. Please note that in the specifications of various embodiments of the current invention, the word "glass" is sometimes used as one type of, or an implementation of, or interchangeably as, a "see-through substrate". See-through substrate 93 provides a supporting frame for the transmitter 95 and the detector 94 and allow viewer's eye 90 to see through. Light from images that are displayed to the viewer can pass through see-through substrate 93 and forms optical projection on the retina 92. See-through substrate 93 can serve as part of the stereo vision system that helps images taken from same scene at different viewing angles being shown to each eye 90 of the viewer separately, so that viewer has a stereo vision impression. The detector 94 and transmitter 95 do not affect viewer's ability to see the images displayed to the viewer.

Transmitter 95 produces light beam or light pattern that is projected into the viewer's eye 90 as the probing light 96. The probing light 96 can have a wavelength that is invisible to human eye, for example infrared. The probing light 96 can have a wavelength that is visible to human eye, but not affecting viewer's normal vision, which can be any one or any combination of: (1) the probing light has a small beam size that is insensitive to human eye; (2) the probing light is projected onto the blind spot of the viewer's retina; (3) the probing light is the in the form of short pulses with pulse duration being too small for eye 90 to sense.

Detector 94 detects the reflected probing light (Reflection light) 97 from the retina 92. Detector 94 and transmitter 95 are composed of electric and/or optical circuitry. The transmitter 95 can be in the form of a transmitter array or a transmitter matrix. The detector 94 can be in the form of a detector array or a detector matrix.

The probing light 96 from the transmitter can be scanning in one-dimensional or two-dimensional patterns into the eye 90.

Reflection light 97 received by detector 94 is used to calculate the eye-information defined as any of, but not limited to, viewer's eye-lens focus depth, eye-lens shape, eye-lens curvature, eyeball rotational position. Calculation of the said eye-information can be combined with the probing light 96 information from transmitter 95. Reflection light 97 can be monitored by the detector 94 for any of, but not limited to, intensity, angle, reflection spot position on retina 92, color, pattern and beam shape, pattern shift, optical interference with the incoming probing light 96. The calculated eye-information can be transmitted to another device or temporarily stored in a data storage component not shown in FIG. 9.

Probing light 96 generation by the transmitter 95 can be integrated with a shutter function of the see-through substrate 93, for example in stereo vision with active 3D glass where during the interval that the outside image was temporarily shielded from the viewer's eye, the eye-information can be retrieved by enabling the probing light for minimal disturbance of normal viewing. Probing light 96 source can be any of, laser, LED, lamp, and can have an MEMS based mirror and/or light scanning system. The see-through substrate 93 position is substantially fixed relative to the position of eye 90.

An image capturing device, for example a camera, can be integrated with the see-through substrate 93 or be in proximity to the see-through substrate 93, and moves together with the see-through substrate 93 to capture the image that the viewer sees for comparison with the reflection light 97 information and calculate eye-information.

Figure 10:
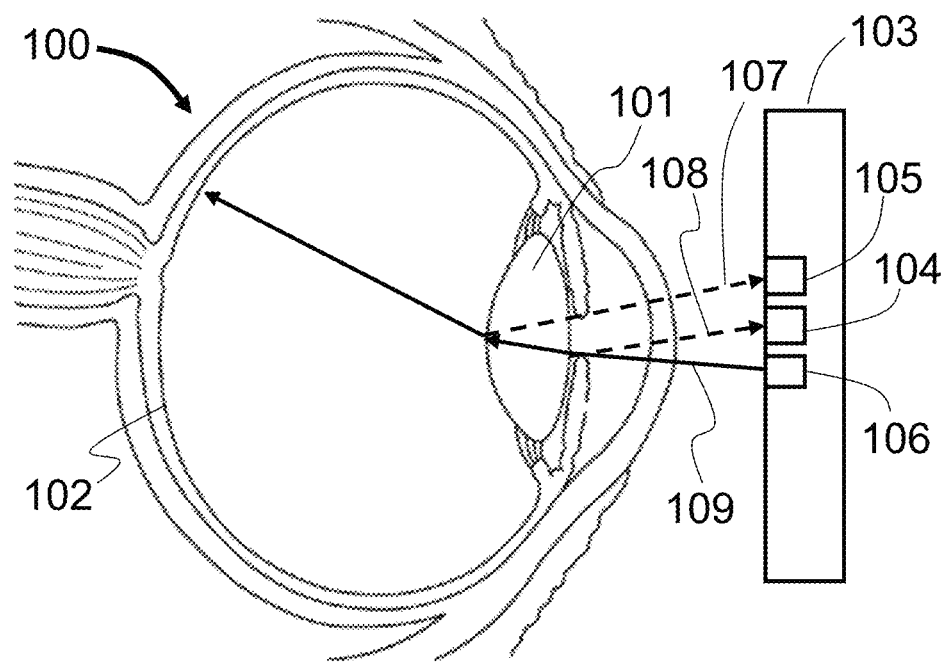
FIG. 10 is a schematic illustrating the second implementation for the step of sensing the re-focus intention of viewer according to the embodiments of the current invention.

FIG. 10 is a schematic diagram illustrating the second implementation for the step of sensing the re-focus intention of viewer according to the embodiments of the current invention. This implementation is for retrieving the viewer's eye-information by eye-lens 101 reflected probing light 109. Every other aspect of this implementation is the same as in the first implementation (FIG. 9) with the exception of following: the detector 104 and the detector 105 do not capture the reflection light of the probing light from the retina 102; detector 104 captures reflection light 107 reflected from the front outside surface of the lens 101 when the probing light 109 enters the lens; detector 105 captures reflection light 108 reflected from the back inside surface of the lens 101 when the probing light 109 exits the lens 101 and enters the vitreous humor of the eye 100; either one or both of the reflection light 107 and 108 information received by the detector 104 and detector 105 can be used to extract the eye-information; detector 104 and detector 105 can be in the form of a detector array or a detector matrix.

Figure 11A:
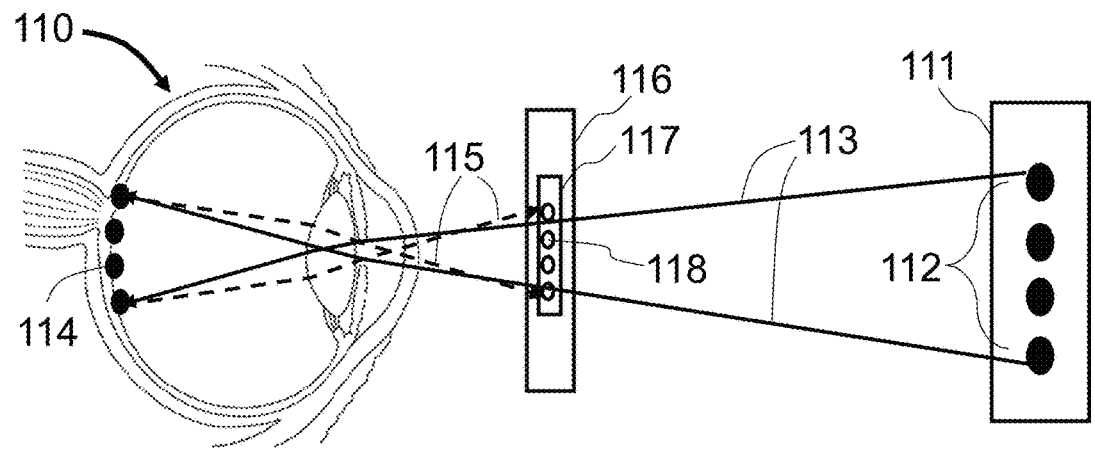
FIG. 11A is a schematic illustrating the third implementation for the step of sensing the re-focus intention of viewer according to the embodiments of the current invention.

Optical interference pattern produced between any of the probing light 109, reflection light 108, and reflection light 107 may be used to retrieve the re-focus intention of the viewer. Note that detector 104 and detector 105 can be used together or only one of the two can be used to retrieve the eye-information FIG. 11A is a schematic diagram illustrating the third implementation for the step of sensing the re-focus intention of viewer according to the embodiments of current invention. This implementation is for retrieving the viewer's eye-information by projected pattern 114 on retina. Image screen 111 is the place where object image 119 (no shown in FIG. 11A) that viewer is viewing is being created, where the image 119 is also adjusted in real-time following viewer's re-focus intent to provide a re-focusable vision for the viewer eye 110.

Pattern 112 on the image screen 111 is used to help retrieve the viewer's eye-information. The pattern 112 can be produced by a light at wavelength that is invisible to human eye, for example infrared. The pattern 112 can also be produced by a light at wavelength that is visible to human eye, but not affecting viewer's normal vision. The pattern 112 can be produced in very short time pulsed interval that is insensitive to human eye 110. The pattern 112 can be produced overlapping other image 119 shown to the viewer on the image screen 111. The pattern 112 can be produced interlacing with the image 119 shown to the viewer with a shuttered mechanism, where pattern 112 is not shown at the same time as the image 119, and pattern 112 showing time is comparatively much shorter than the image 119. The pattern 112 can be varying density, arrangement, shape, size and position over time to help enhance the extraction of the eye-information. The pattern 112 position on the image screen 111 can have a one dimensional or two-dimensional temporal oscillation.

See-through substrate 116 provides a supporting frame for the detector 117 and allow viewer to see through. Light 113 from image screen displayed to the viewer can pass through see-through substrate and forms optical projection on the retina for viewer to see. See-through substrate 116 can serve as part of the stereoscopic vision system that helps images taken from same scene at different viewing angles being shown each eye 110 of the viewer separately, so that viewer has a stereoscopic vision impression. See-through substrate 116 with detector 117 does not affect viewer's normal vision of the image on the screen 111.

Pattern 112 produces projected pattern 114 image on the retina of the viewer. Pattern image 114 is further reflected by the retina and the detector 117 receives the reflected pattern image 118 from the retina. The detector 117 can be in the form of a detector array or a detector matrix. Reflection light 115 of the pattern 114 received by detector 117 is used to calculate the eye-Information. Calculation of the said eye-information can be combined with the information of the pattern 112 on the image screen 111. Reflection light 115 of the pattern 114 can be monitored by the detector 117 for any of, but not limited to, intensity, position on retina, color, shape, size, density, arrangement, position, oscillation pattern and oscillation frequency. The calculated eye-information can be transmitted to another device or temporarily stored in a data storage component that is not shown in FIG. 11A. An image capturing device, for example a camera, can be integrated with the see-through substrate 116 or be in proximity to the see-through substrate 116, and moves together with the viewer's eye and see-through substrate to capture the pattern 112 that is shown to the viewer on the image screen for comparison with the reflection pattern 114 information and calculate eye-information. The detector 117 is composed of electric and optical components.

Figure 11B:
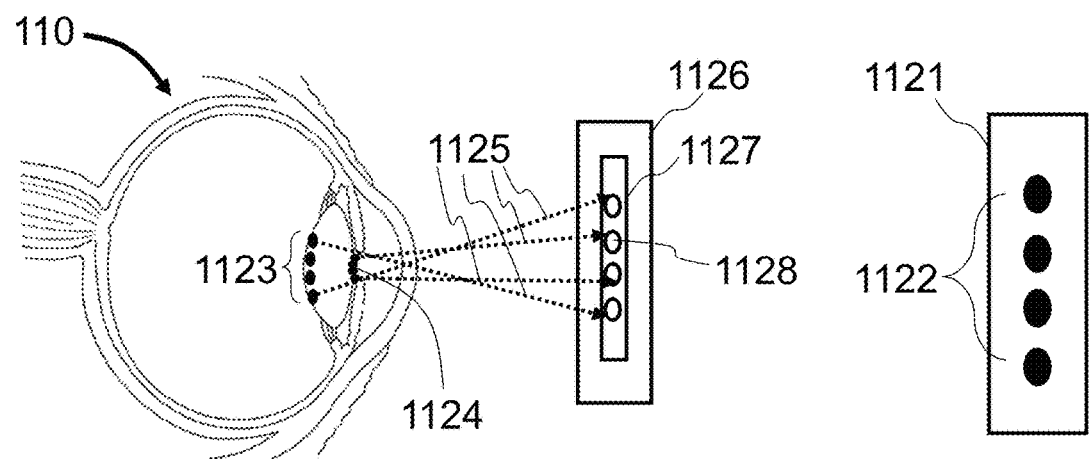
FIG. 11B is a schematic illustrating the fourth implementation for the step of sensing the re-focus intention of viewer according to the embodiments of the current invention.

FIG. 11B is a schematic diagram illustrating the fourth implementation for the step of sensing the re-focus intention of viewer according to the embodiments of current invention. This implementation is for retrieving the viewer's eye-information by reflected images from the lens.

Every other aspect for this implementation is the same as in the third implementation (FIG. 11A) with the exception of following: the detector does not capture the reflection of the pattern on image screen from the retina; at least one detector captures reflection image 1124 of the pattern 1122 reflected from the front outside surface of the lens when the light from the pattern 1122 on screen 1121 enters the lens; at least one second detector captures reflection image 1123 of the pattern 1122 reflected from the back inside surface of the lens when the light from the pattern on screen exits the lens and enters the vitreous humor of the eye 110; either one or both of the reflection pattern 1123 and 1124 information received by the first detector and second detector can be used to extract the eye-information; both first and second detectors 1127 can be in the form of an array or a matrix; the first and second detectors 1127 can be same detector; during usage, it is possible to use only one of the first and second detectors; during usage, it is possible to use both of the first and second detectors; and the optical interference of the pattern 1123 and pattern 1124 can also be used to calculate eye-information.

Figure 12A:
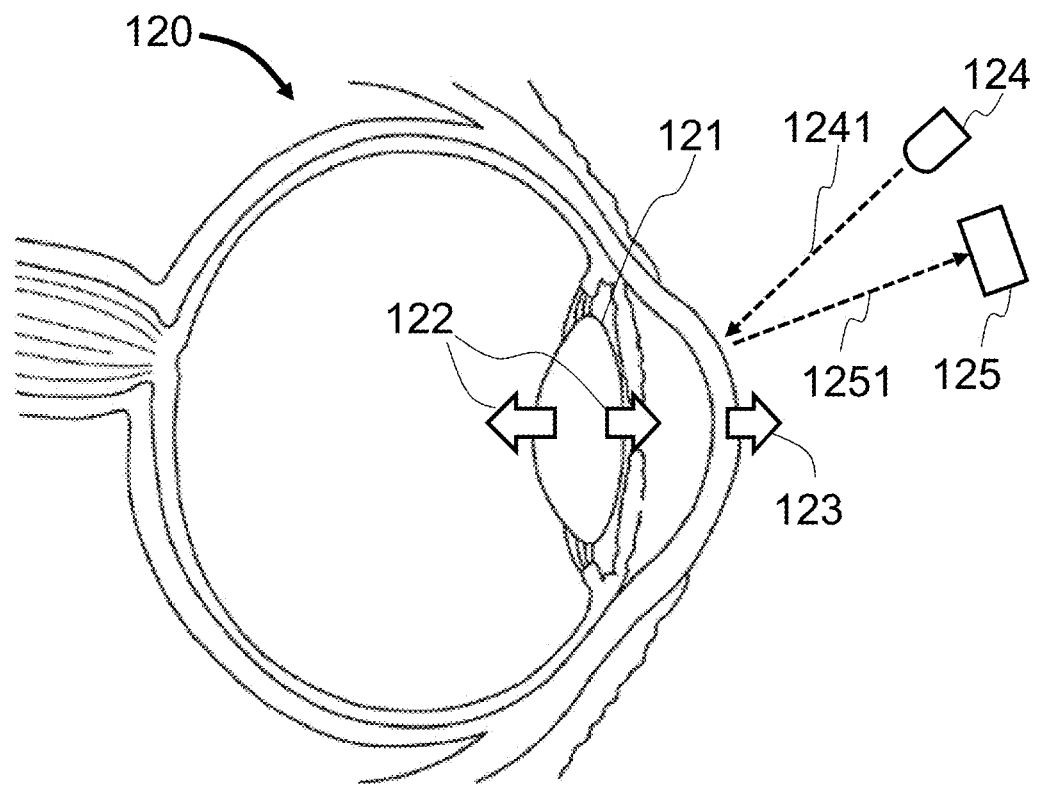
FIG. 12A is a schematic illustrating the fifth implementation for the step of sensing the re-focus intention of viewer according to the embodiments of the current invention.

FIG. 12A is a schematic diagram illustrating the fifth implementation for the step of sensing the re-focus intention of viewer according to the embodiments of current invention. This implementation is for retrieving the viewer's re-focus intention by using a scanning probing light beam 1241 across viewer's eyeball and simultaneously monitoring the reflected optical signal from the eye 120.

When viewer's intention of re-focus happens, the eye-lens 121 of the viewer eye 120 can change in shape and curvature. The change of eye-lens 121 shape in the form of compression or stretching 122 in the direction of the viewers' eye-sight causes the part of the eye 120 in front of the eye-lens to deform correspondingly. Such process is also called "accommodation" during an eye 120 re-focus process. The corneal shape 123 of the eye 120 can also be deformed in small amount by the shape and curvature change 122 of the eye-lens 121. In FIG. 12A, an optical emitter 124 is used to project an directional probing light 1241 upon the cornea and an optical detector 125 is used to detect the reflection light 1251 from the cornea. At different corneal shape 123 caused by the different eye-lens shape change 122, the reflection light 1251 as received by the optical detector 125 also changes its intensity or reflection angle. By scanning the probing light 1241 across the viewer's eye 120, and by monitoring the reflection light 1251 change during the scan, the information of the eye-lens change as well as the pupil position of the eye-ball can be measured.

Figure 12B:
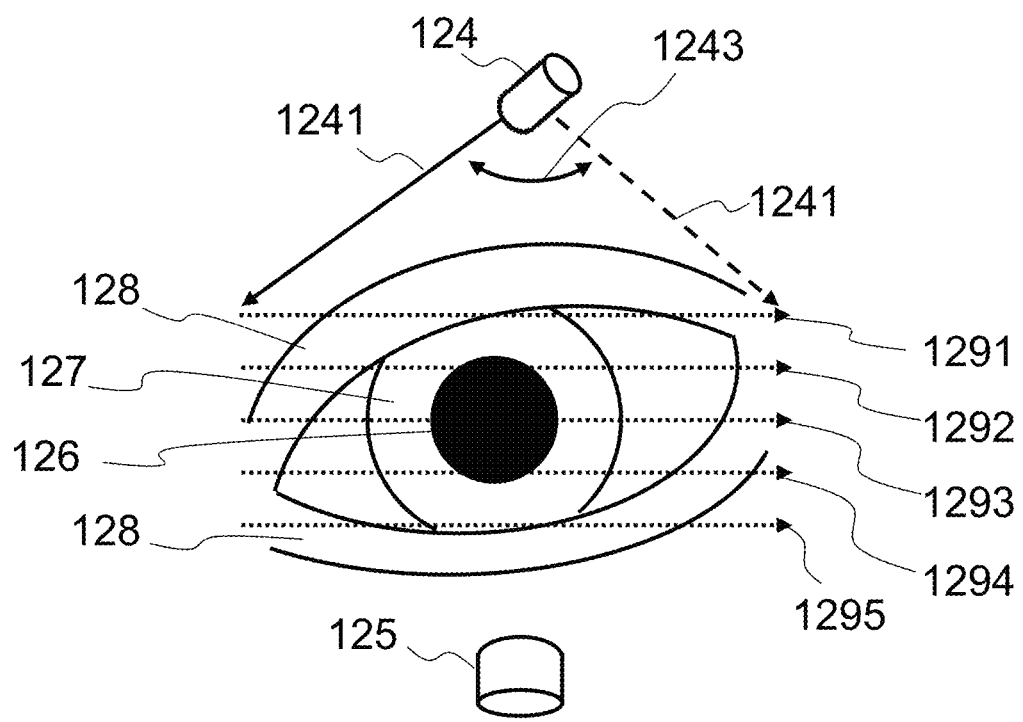
FIG. 12B is a schematic illustrating the scanning procedure of the probing light 1241 by oscillating the optical emitter 124 of FIG. 12A.

FIG. 12B is a schematic diagram illustrating the scanning procedure of the probing light 1241 by oscillating the optical emitter 124 of FIG. 12A. The optical emitter 124 oscillates from left to right in FIG. 12B and produces scanning of probing light 1241 across the eye 120 of the viewer. With the optical emitter also changes its rotational orientation in the direction normal to the scan direction, multiple discrete scan lines, 1291, 1292, 1293, 1294 and 1295 can be produced from top to bottom of the eye 120 with the scan lines covering the exposed eyeball area between the eye lips 128. The optical detector 125 detects the reflection light 1251 from the viewer's eyes while probing light 1241 scans across the eye 120.

The eye-information detection scheme as shown in FIG. 12A and FIG. 12B has the advantage over prior arts in the aspect of simpler structure and lower cost. The major components of this new scheme are the optical emitter 124 and the optical detector 125. With the probing light 1241 scanning positions well controlled and calibrated, mapping of the eye 120 by the reflection light 1251 captured by the optical detector 125 can be realized by simple electronics with low cost. The optical emitter 124 can be low cost light emission diode (LED) or laser diode with good light directionality. The optical detector 125 can also be low cost photodiode with proper optical filter. This new scheme can also be integrated into head-mounted supporting structures, for example in the form of eye-glasses, due to no complicated optics is required. Prior arts that detect pupil 126 positions, i.e. eye-tracking, generally use imaging of the user's eyes, which not only require complicated and expensive optical lens system but also require sophisticated and expensive electronics for image processing to retrieve pupil position information.

The eye-information detection scheme as shown in FIG. 12A and FIG. 12B also has the advantage over prior arts in the aspect of accurate focus depth extrapolation, high precision and less interference from environment. Spatial resolution of this new scheme is defined by the light beam size and the scanning resolution of the probing light 1241, which can realize high precision with commercially available low cost LED, laser diode and MEMS technologies, with spatial resolution reaching micron level or smaller. For prior art image capture methods, such high resolution is either not economically achievable or having to use expensive optical and electrical components. Additionally, the probing light 1241 can also be modulated with single-tone high frequency pattern that enables lock-in technique detection of the reflection light, or it can be modulated with digital patterns that enables high speed digital filtering, both of which can increase signal-to-noise-ratio (SNR) of the method and is well beyond prior art method.

The eye-information detection scheme as shown in FIG. 12A and FIG. 12B further has the advantage over prior arts in the aspect of simultaneous detection of eye-lens change and pupil position change. In prior art schemes, due to the spatial resolution limitation and long detection distance of the optical system, it is only possible to detect the pupil 126 position, i.e. eye-tracking. The new scheme of this invention as shown in FIG. 12A through FIG. 12D, with its ability to be integrated to head-mount structure and the close proximity of both the optical emitter 124 and optical detector 125 to the viewer's eye 120, the optical signal captured by the detector during the scanning of the probing light not only can identify the position of the pupil, but also can be used to extract the information of the eye-lens change, which gives unprecedented advantage in faster focus depth calculation, lower calculation complexity, and higher calculation accuracy.

Method of FIG. 12A and FIG. 12B can have any one or a combination of below features: (1) there can be multiple optical detectors 125 to capture the reflection light 1251 signal from the same probing light at different locations relative to the eye 120; (2) there can be multiple optical emitters 124 with each emitter 124 producing scan lines not exactly overlapping any of the scan lines produced by any other emitter 124; (3) a single scan line of probing light 1241 can be in any direction across the eye 120; (4) when probing light 1241 scans over the pupil area, reflection light 1251 from the eye 120 can be reflected from any of: cornea, eye-lens 121 front surface facing cornea, eye-lens 121 back surface facing retina; (5) probing light 1241 can be invisible light, and preferably infra-red light; (6) probing light 1241 can be visible light but with intensity insensible by human eye; (7) probing light 1241 can be modulated into pulsed patterns wherein the duty cycles of the pulses are short enough such that the effective probing light intensity is insensible by human eye; (8) probing light 1241 can be modulated into pulsed patterns that has a single tone frequency wherein the optical signal captured by the optical detector 125 also shows same single tone frequency pulse pattern, which can then be processed by an lock-in method that enhances the SNR of the detection result; (9) probing light 1241 can be modulated into pulsed patterns that represents a digital sequence wherein the optical signal captured by the optical detector 125 also shows same digital sequence pattern, which can then be processed by a digital filter that enhances the SNR of the detection result; (10) special pulsing patterns of the probing light 1241 can exist at the beginning, or at the end, or in the middle section of any of the scan line 1291,1292,1293,1294,1295, to designate the beginning, ending, or within-scan locations of the scan. Such special pulse patterns can be also used to identify the order of the different scan lines for spatial alignment of different scan lines during signal processing of the optical signal captured by the optical detector 125; (11) the optical emitter 124 oscillatory motion can be generated by a driving mechanism that can be based on any of: MEMS, magnetic force, piezoelectric effect, electrostatic effect, capacitive effect, or thermally induced shape change.

Figure 12C:
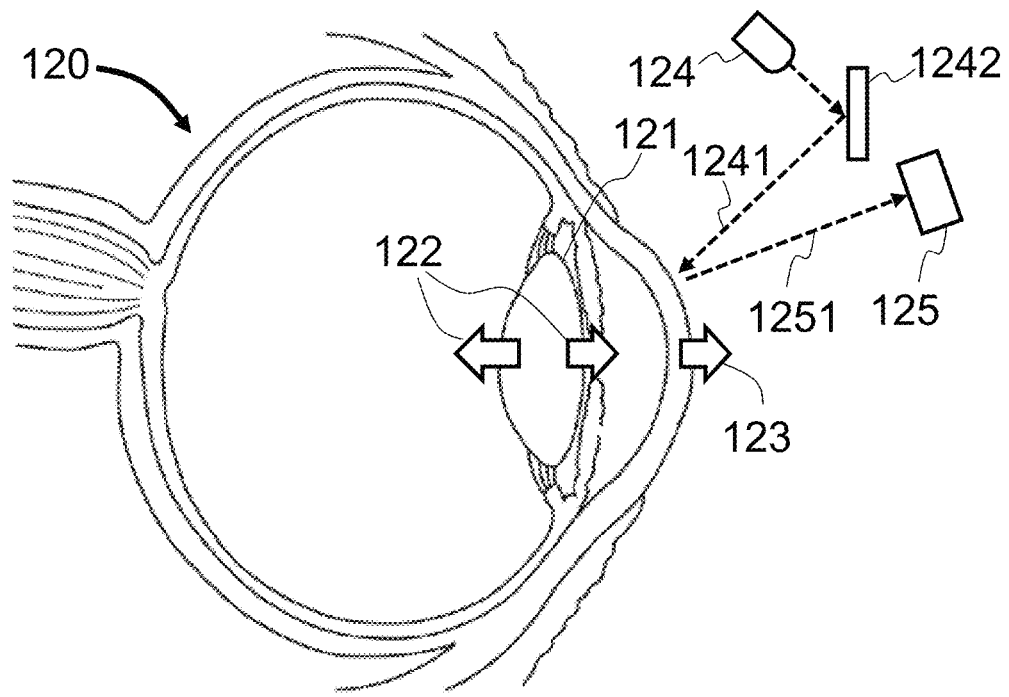
FIG. 12C is a schematic illustrating the sixth implementation for the step of sensing the re-focus intention of viewer according to the embodiments of the current invention.
Figure 12D:
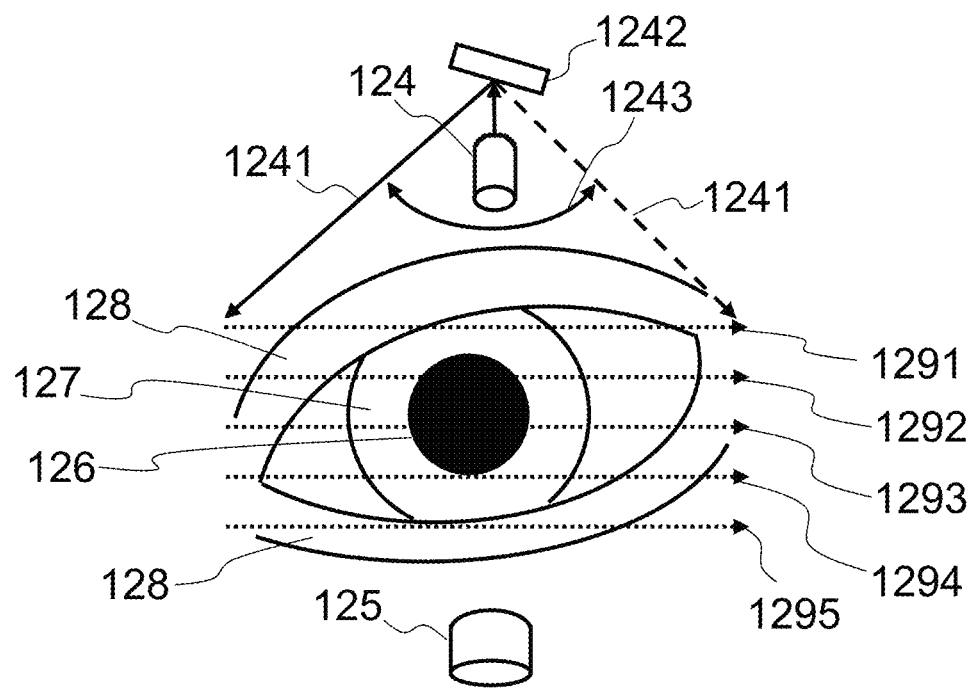
FIG. 12D is a schematic illustrating the scanning procedure of the probing light 1241 by oscillating the scanning mirror or prism 1242 of FIG. 12C.

FIG. 12C and FIG. 12D are schematic diagrams illustrating the sixth implementation for the step of sensing the re-focus intention of viewer according to the embodiments of current invention. All other aspects of FIG. 12C and FIG. 12D are identical to FIG. 12A and FIG. 12B case, except that the scanning of the probing light 1241 is produced by a reflection mirror or prism 1242, wherein the optical emitter 124 is stationary.

Method of FIG. 12C and FIG. 12D can have any one or any combination of below features: (1) a single mirror or prism 1242 can be used to scan the probing light 1241 in spatially discrete scan lines as shown in FIG. 12D; (2) a series of mirrors or prisms 1242 can be used with single or multiple optical emitters 124 with each mirror or prism 1242 producing one or more scan lines not exactly overlapping any one of the scan lines produced by any other mirror or prism 1242; (3) an array of mirrors or prisms 1242 can be used with single or multiple optical emitters 124 with each mirror or prism 1242 producing a light spot on the eye 120 and area around the eye 120. By enabling the mirrors or prisms 1242 to produce the light spots in a sequential order, effective scan lines can be produced; (4) the mirror 1242 can be a mirror array that is the same one being used to directly project image upon the retina of the viewer's eye 120 as described in FIG. 34, wherein scanning of the probing light and image projection by the same mirror can be interlaced or multiplexed with the same mirror or mirror arrays; (5) the oscillatory motion of the mirror or prism can be generated by a driving mechanism that can be based on any of: MEMS, magnetic force, piezoelectric effect, electrostatic force, capacitive force, or thermally induced shape change.

Figure 12E:
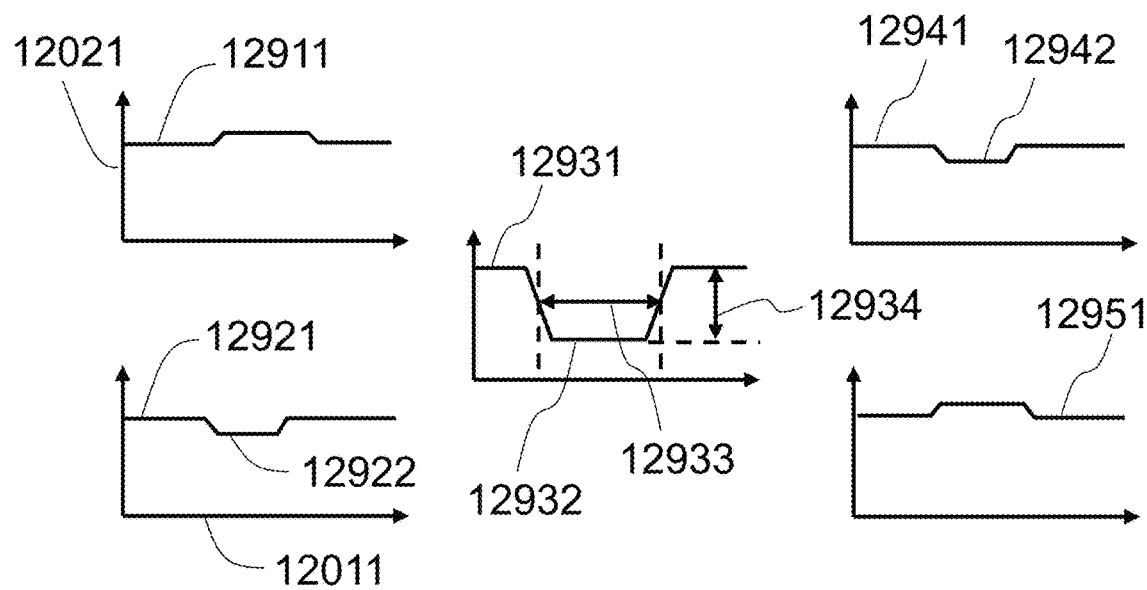
FIG. 12E is a schematic illustrating one example of optical signals sensed by the optical detector 125 during scanning of the probing light 1241 in FIG. 12B and FIG. 12D.

FIG. 12E shows examples of the optical signal sensed by the optical detector 125 during scanning of the probing light 1241 in FIG. 12B and FIG. 12D. The X axes of all sub-figures in FIG. 12E are the physical position along each scan line across the eye 120, while the Y axes are the strength of the optical signal sensed by an optical detector 125. The signal traces 12911, 12921, 12931, 12941 and 12951 are respectively corresponding to the scan traces of 1291, 1292, 1293, 1294 and 1295 of FIG. 12B and FIG. 12D. For the examples of FIG. 12E, the probing light is assumed to be infra-red light. The infra-red light reflects from the eye-ball area is stronger than from eye-lip and pupil. Pupil area cornea reflects infra-red light the weakest due to highest absorption of infra-red light. Trace 12911 and trace 12951 both have two levels in the signal strength, with the higher level in the center corresponding to the probing light scanning over the eye-ball and lower level at the sides corresponding to the eye-lip. Traces 12921, 12931 and 12941 are from scans that pass across pupil, therefore they show lower signal level at regions around the middle of the traces, with trace 12931 having the highest downwards peak 12932 at the trace center.

The width 12933 and amplitude 12934 of the downwards peak 12932 can be used to calculate the position of the pupil and the lens change information. With pupil position change, the horizontal position of the highest amplitude point 12934 of the downwards peak 12932 can shift in the trace 12931. Additionally, with pupil position change, the trace that exhibits the largest downwards peak may also shift from 12931 to another trace. The shift of the maximum downwards peak position between traces and along scan direction can be used to calculate pupil position. When eye-lens focus depth changes, shape change of the eye-lens can cause shape change of the cornea as shown in FIG. 12A and FIG. 12C. With the light reflecting from cornea, or from the eye-lens, or both, the shape change of cornea or eye-lens can produce a reflection light change, in intensity or in reflection angle or both, most likely at the boundary of the pupil. Such change will affect the pulse width 12933 or pulse shape of peak 12932. Thus, with capturing the reflection light 1251 during scanning of probing light 1241, and with monitoring the peak 12932 position, peak height 12934, peak width 12933, or pulse shape, information of the pupil position and eye-lens change can be retrieved with signal processing and calculation.

It needs to be noted that although infra-red light and its lower reflection by pupil is used as example in FIG. 12E, other light wavelength with other reflection properties can also be used without limitation. Multiple wavelength probing light can also be used at same time. Additionally, scan lines as shown in FIG. 12E can be obtained from more than one optical detectors 125 around the eye 120, for better signal capture and higher accuracy in calculation of eye-information.

For the scan lines 1291,1292,1293,1294,1295 of probing light 1241 shown in FIG. 12B and FIG. 12D, although straight parallel scan lines are used as example, the scan lines are not limited to straight line or parallels lines. The scan lines can be any one or any combination of the below types to efficiently cover the area of the viewer's eye: (1) at least two sets of parallel straight or curved lines that cross each other at various crossing points with crossing angles between 0 to 90 degrees; (2) concentric circles; (3) at least two circles partially overlapping each other; (4) at least two close-loop shapes overlapping each other; (5) one or more continuous scan lines with irregular scan traces that covers sufficient amount of the viewer's eye area; (6) a rotating regular or irregular scan pattern; (7) at least one set of parallel straight or curved lines; (8) at least two close-loop shapes with one enclosed entirely by the other one.

Figure 12F:
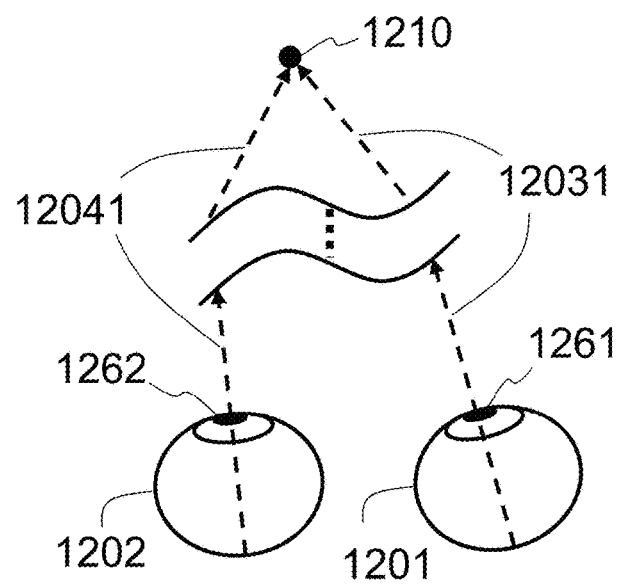
FIG. 12F is a schematic illustrating the pupil positions of the eyes of the viewer when viewer is focusing on a far point.
Figure 12G:
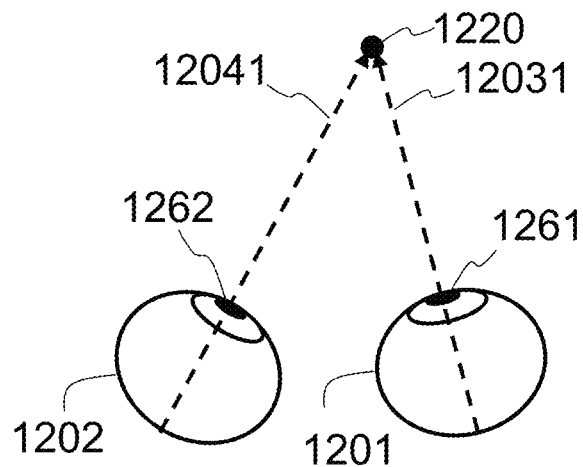
FIG. 12G is a schematic illustrating the pupil positions of the eyes of the viewer when viewer is focusing on a near point.

FIG. 12F is a schematic diagram illustrating the pupil positions of the eyes of the viewer when viewer is focusing on a far point 1210, and FIG. 12G is a schematic diagram illustrating the pupil positions of the eyes of the viewer when viewer is focusing on a near point 1220. In FIG. 12F and FIG. 12G, although viewer is focusing on different points in space that are at different distances from the viewer, the right eye 1201 pupil 1261 position and eye-sight direction 12031 is the same. Therefore, by only monitoring the pupil position, similar as in "eye-tracking" techniques used in prior arts, both eyes 1201 and 1202 must be monitored at the same time to extrapolate the focusing point of the viewer's eye sight with extending the eye-sight line 12031 and 12041 directions of both eyes 1201 and 1202, to find out the eye-sight crossing points as the focus points. The prior art "eye-tracking" method, although is straight forward, requires tracking of both eyes and ability to find the actual focus point with complicated electronics and algorithm, which are slow in speed, expensive in implementation and inapplicable to viewers with disability in one of the two eyes.

Figure 12H:
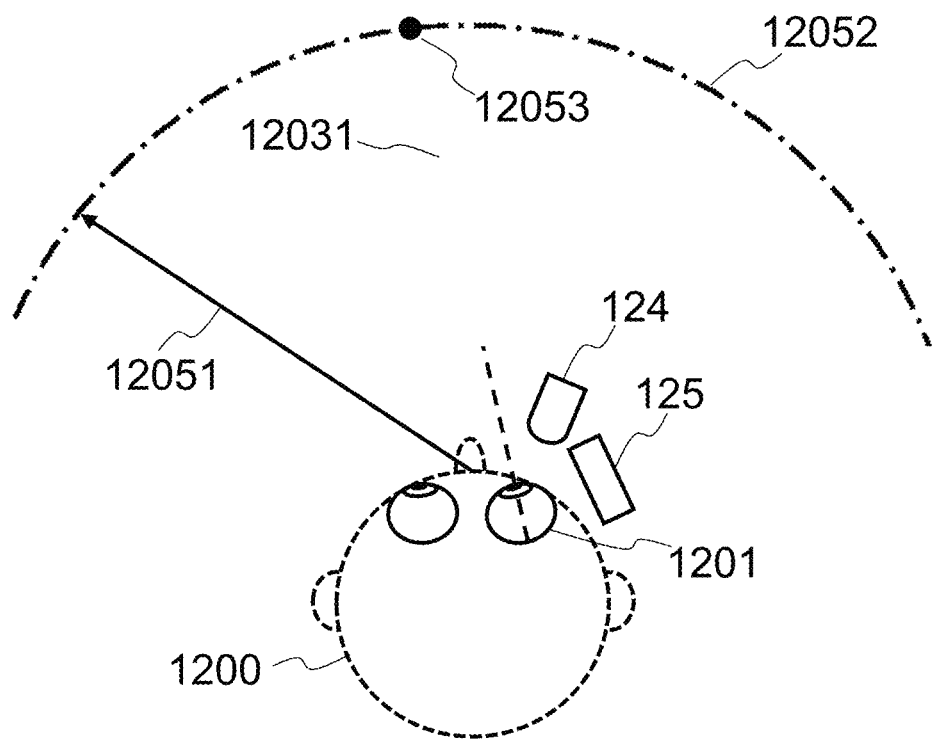
FIG. 12H is a schematic illustrating an example of utilizing FIG. 12A implementation to sense a viewer's re-focus intention.

With the ability to obtain eye focus depth information from eye-lens change, monitoring both eyes is then not required. FIG. 12H shows an example of utilizing FIG. 12A and FIG. 12B implementation method for identifying the focus point of the viewer 1200 with monitoring a single eye, i.e right eye 1201. With the ability of detecting right eye 1201 eye-lens change and its focus depth, the focusing point of the viewer can be found locating on a focus circle 12052 with a radius of 12051 with the focus circle 12052 centered on the viewer. The radius 12051 is defined as the distance from the viewer that the viewer is focusing on by the eye 1201's detected focus depth. Then with the ability to detect the position of the pupil, the eye sight 12031 direction of the right eye 1201 can be extrapolated. The crossing point of right eye sight 12031 and the focus circle 12052 is then the focusing point 12053 of the viewer. Since when viewer focuses on a spatial point, both eyes will focus at that same point, with locating the point of the focus for right eye 1201, it is also the point of focus of left eye.

To apply FIG. 12H scheme in applications as shown in FIG. 18 through FIG. 33, the information of the exact location of focus point 12053 and eye sight 12031 direction are not required in certain embodiments. With obtaining the focus circle 12052 and radius 12051 from the eye-lens change, of all objects that are being shown to the viewer, the ones that are on or in close proximity to the focus circle 12052, can be brought into clear focus to the viewer's eye 1201, and then allow the viewer eye to select and focus on the object of interest on the focus circle by viewer's choice, i.e. finding and looking at the object of interest. In this way, the complexity of eye information detection is further reduced with only requiring detection of focus depth change information, and eye-information processing speed is faster and cost of implementation is also cheaper.

Figure 13A:
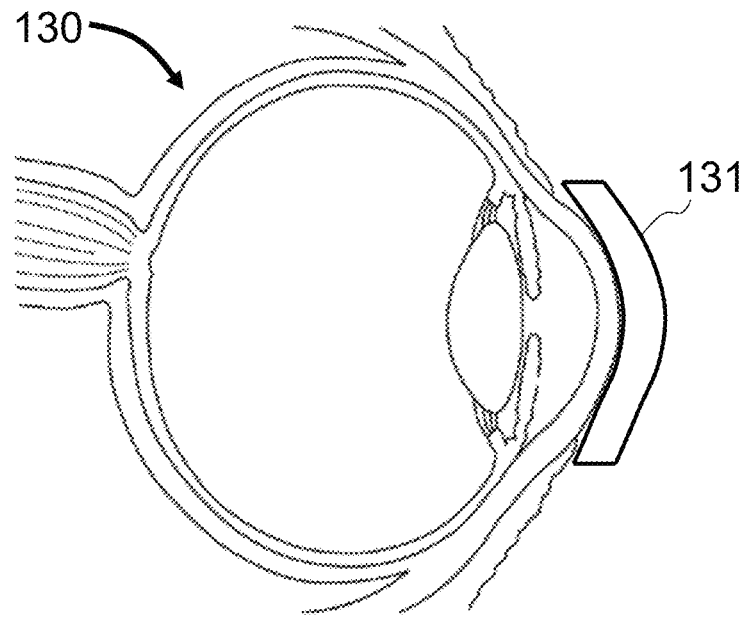
FIG. 13A is a schematic illustrating the seventh implementation for the step of sensing the re-focus intention of viewer according to the embodiments with using a contact-lens type of see-through substrate being used for the same purpose of the see-through substrates in the implementations of FIG. 9, FIG. 10, FIG. 11A, and FIG. 11B.

FIG. 13A is a schematic illustrating the fifth implementation for the step of sensing the re-focus intention of viewer according to the embodiments of current invention with a contact-lens type of see-through substrate 131, which is in direct contact with the eye ball and substantially covers the pupil of the eye 130, being used for the same purpose of the see-through substrates described in earlier figures. Instead of a see-through substrate that is positioned apart from the viewer's eye with a gap, a contact-lens type of see-through substrate 131 can be used for fulfilling the functions of the see-through substrates 93, 103, 116 and 1126 as respectively illustrated in FIG. 9, FIG. 10, FIG. 11A and FIG. 11B.

Figure 13B:
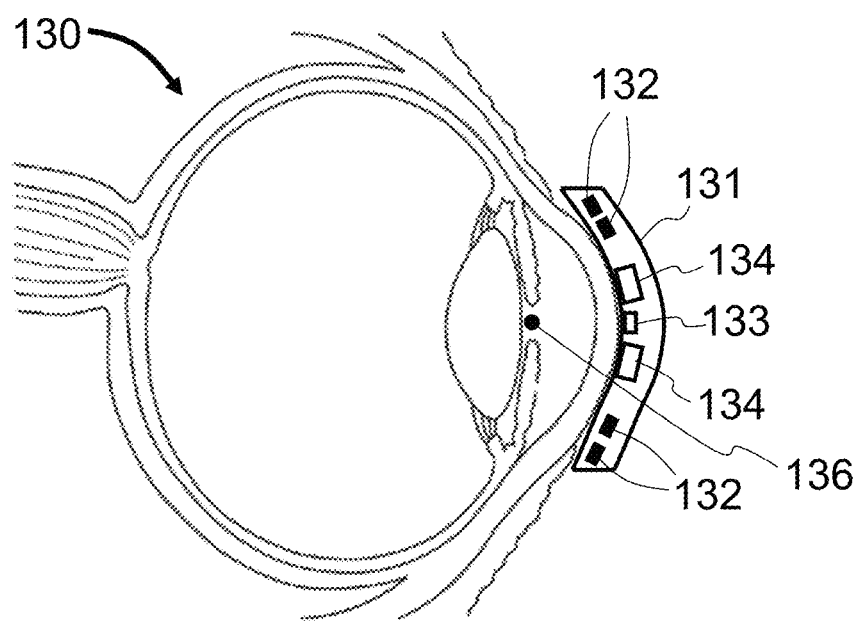
FIG. 13B is a schematic illustrating a see-through substrate with embedded circuitry, optical emitter and optical detector for detection of change of focus depth of the eye.

FIG. 13B is a schematic illustrating a contact-lens type of see-through substrate 131 ("contact lens") that is in direct contact with the eye ball and substantially covers the pupil of the eye 130, with embedded electronics 132, optical emitter 133 and optical detectors 134 to realize FIG. 9 and FIG. 10 type of functions to detect focus depth change of the eye 130. Electronics 132 is preferred located close to the outer edge of the contact lens to avoid interfering with the viewing of the eye 130 through pupil 136. One obvious advantage of FIG. 13B type of solution over prior arts is that the optical emitter 133 and optical detector 134 are always moving together with the pupil position. During movement of eye ball 130, relative position of the substrate 131 together with all embedded components to the pupil is fixed. Thus, the detection accuracy is greatly enhanced. Electronics 132 is providing power to and communicating with optical emitter 133 and optical detector 134. Electronics 132 can also have components interacting wirelessly through electromagnetic coupling to an external circuitry not shown in FIG. 13B to realize functions of: (1) harvesting external power wirelessly; (2) transmitting data into electronics 132 to control emitter 133 or transmitting data of optical signal detected by detector 134 out from electronics 132. Optical emitter 133 is located in close proximity, and preferably directly above, the pupil 136. Optical emitter 133 produces optical radiation towards inside the eye 130 through pupil 136 with a pre-determined optical pattern. Such optical pattern can be continuous light beam with constant intensity, light pulses, or continuous light team with varying intensity over time. At least one optical detector 134 exists in substrate 131. Optical detector 134 can detect any one, or any combination, of following properties: (1) reflected light intensity change over time at a specific location within the substrate 131; (2) reflected light intensity at various locations within the substrate 131; (3) time delay between different reflected pulses at a specific location with the substrate 131; and (4) time delay between different reflected pulses at various locations within the substrate 131. With the detected light signal from detector 131 alone, or in combination with emitted light signal from emitter 133, the focus depth information of the eye 130 can be retrieved. An external circuitry not shown in FIG. 13B can be used to monitor the electronics 132 spatial position change following the rotation of the eye 130, such that both the direction of eye sight and the focus depth can be obtained to reproduce exact focus point in space by the eye 130, wherein electromagnetic coupling between at least one component in the external circuitry and at least another component in electronics 132 is used for such monitoring.

There can be more than one optical emitter 133 and more than one optical detector 134 embedded in the substrate 131. The optical emitter 133 can emit visible light or infra-red light. When optical emitter 133 or optical detector 134 are in close proximity to the pupil, or directly above pupil, to avoid interfering with vision of eye 130, the emitter 133 or detector 134 can be made transparent, or can be in the size small enough that will not affect vision, for example in the size smaller than 100 micrometers.

The optical emitter 133 or optical detector 134 can be also be part of the electronics 132 and located away from the pupil 136 same as the electronics 132. In this case, optical paths connect the output of the emitter 133 or input of the detector 134 towards the location of the pupil 136, and reflective components, for example micro-mirrors, terminate at the other ends of the optical paths at the locations of 133 and 134 shown in FIG. 13B to emit light into the pupil 136 or collect light reflected back from the pupil 136. The light paths and reflective components are both small enough to avoid affecting eye 130 vision, for example with maximum width less than 100 micrometers.

One example of operation of FIG. 13B scheme is that emitter 133 emits light beam into pupil 136. The various surfaces of cornea, eye-lens, and retina reflect and scatter the incident light from the emitter 133. When the reflected light reaches detector 134, it produces a light pattern of dispersion. With various eye length focusing depth, such dispersion pattern changes either or both of its size and its shape. By correlating the dispersion pattern change with intended focus depth, the intended focus depth of the eye 130 can be extrapolated.

Another example of operation of FIG. 13B scheme is that emitter 133 produces light pulses into pupil 136. The various surfaces of cornea, eye-lens, and retina reflect the incident light pulses at different time when the incident light passes through its optical path into the eye 130 until reaching the retina layer. When reflected light pulses from different surfaces passes through various eye components, for example, eye-lens, cornea, and are diffracted variously before reaching the detector 134 and the detector detects the reflect pulses arriving time. From the time delay between two or more reflected light pulses that reach detector 134, the intended focus depth of the eye 130 can be calculated.

Still another example of operation of FIG. 13B scheme is that emitter 133 produces light beam into pupil 136 with a given incident angle to the surface of the eye-lens. The light beam is then reflected from the surfaces of the eye-lens when light beam passes through the eye-lens and produces at least one reflection light point on the substrate 131 which is then detected by at least one of the detectors 134. For light reflected from eye-lens insider surface, it is also refracted by the eye-lens during the reflection. When eye focus depth changes due to eye-lens shape change, the reflected light is reflected into different directions due to surface curvature change of the eye-lens and thus the reflection light point on the substrate moves to a different location on substrate 131. By correlating the position of the reflection light points with the intended focus depth, the intended focus depth of the eye 130 can be extrapolated. The circuitry 132 may contain any of or any combination of, but not limited to, metal circuit, organic circuit, optical circuits, MEMS sensor, piezo sensor, capacitance sensor, magnetoelastic sensor, pressure sensor, deformation sensor, RF circuit.

Figure 13C:
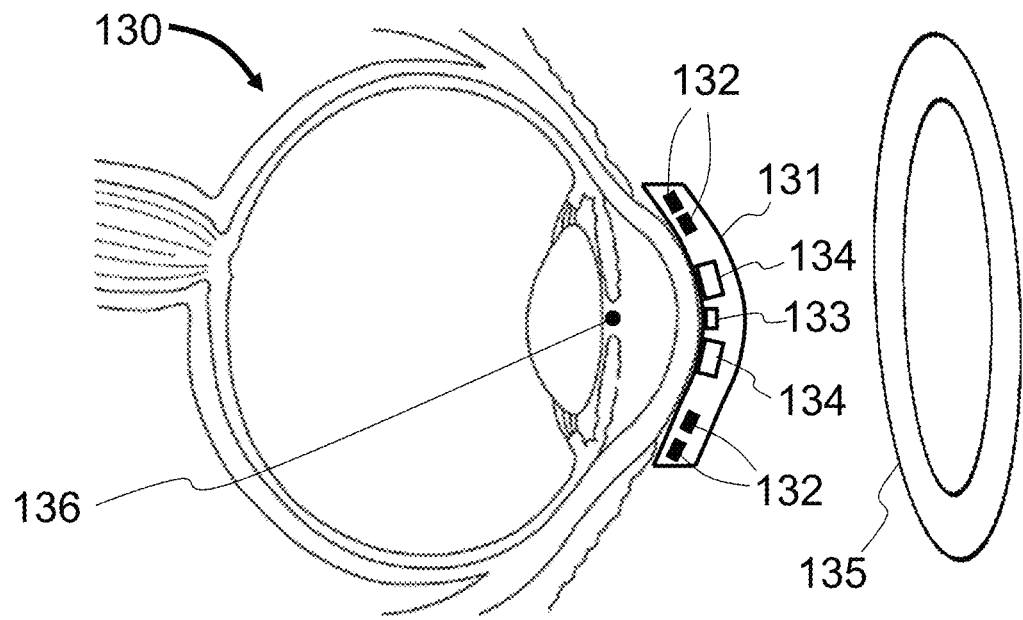
FIG. 13C is a schematic illustrating a contact-lens type of see-through substrate with embedded circuitry, optical emitter and optical detector, working together with a fixed frame in proximity to the eye, for detection of change of focus depth of the eye.

FIG. 13C is a schematic illustrating a focus-depth detection with using same as FIG. 13B scheme with addition of a fixed frame 135 in close proximity to the eye 130. The fixed frame 135 can serve the one or both functions of: (1) providing power to the electronics 132 wirelessly through electromagnetic coupling to electronics 132, for example by inductive coupling or wireless antenna; (2) detecting the spatial position change of the pupil 136 through monitoring the spatial position change of the electronics 132 relative to the frame 135, such that both the direction of eye sight and the focus depth can be obtained to re-produce exact focus point in space of the eye, wherein electromagnetic coupling between at least one component in the frame 135 and at least another component in electronics 132 is used for such monitoring.

Figure 14:
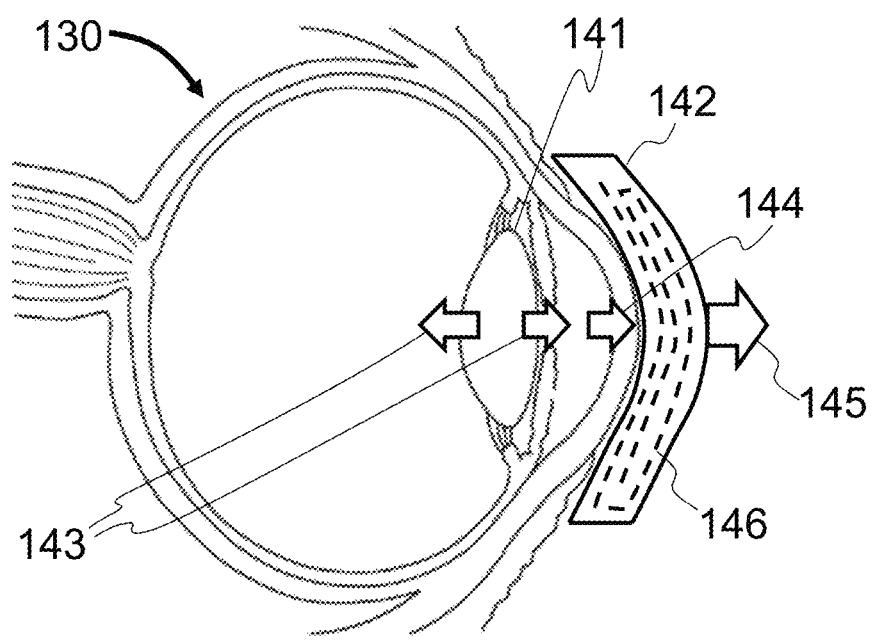
FIG. 14 is a schematic illustrating the eighth implementation for the step of sensing the re-focus intention of viewer according to the embodiments of the current invention.

FIG. 14 is a schematic diagram illustrating the eighth implementation for the step of sensing the re-focus intention of viewer according to the embodiments of current invention. This implementation is for retrieving the viewer's eye-information by electrical method.

Contact-lens 142, which is in direct contact with the eye ball and substantially covers the cornea of the eye 130, provides a supporting frame for the circuitry 146 embedded in the contact-lens 142. Light from image and scene that are displayed to the viewer can pass through the contact-lens 142 and allows viewer to see through. Contact-lens 142 can serve as part of the stereoscopic vision system that helps images taken from same scene at different viewing angles being shown to each eye of the viewer separately, so that viewer has a stereoscopic vision impression. Contact-lens 142 with embedded circuitry 146 does not affect viewer's normal vision of the shown images or scene.

When viewer's intention of re-focus happens, the eye-lens 141 of the viewer can change in shape and curvature. The change of eye-lens 141 shape in the form of compression or stretching 143 in the direction of the viewers' eye-sight causes the part of the eye in front of the eye-lens to deform correspondingly. The cornea 144 of the eye can be deformed in small amount by the shape and curvature change 143 of the eye-lens 141, and exerts different forces 144 onto the contact-lens 142.

The circuitry 146 embedded in the contact-lens can be used to sense the deformation of the of the contact-lens 142, or pressure and stretch force 145 change exerted on the contact lens 142. The circuitry 146 may contain any of or any combination of, but not limited to, metal circuit, organic circuit, optical circuits, MEMS sensor, piezo sensor, capacitance sensor, magnetoelastic sensor, pressure sensor, deformation sensor, RF circuit. The circuitry 146 may be powered by any of, but not limited to, an optical to electrical power converter, an electrical power source, an RF power detector, body temperature of viewer, chemical reaction within the contact-lens by moisture of the eye, an embedded battery in the contact-lens, eye-lips closing & opening mechanical forces, wireless electromagnetic coupling to external power source. The contact-lens 142 can be operating together with an external see-through substrate put in front of the eye to achieve re-focus sensing and stereoscopic vision.

Figure 15:
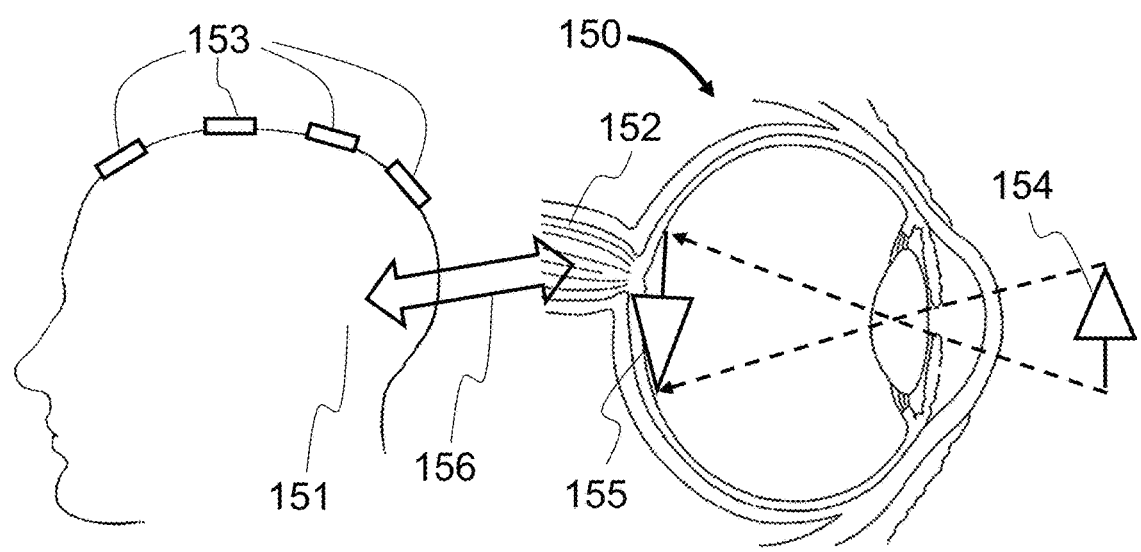
FIG. 15 is a schematic illustrating the ninth implementation for the step of sensing the re-focus intention of viewer according to the embodiments of the current invention.

FIG. 15 is a schematic diagram illustrating the ninth implementation for the step of sensing the re-focus intention of viewer according to the embodiments of current invention. This implementation is for retrieving the viewer's eye-information by brain wave pattern. When an object 154 is projected into the eye and forms image 155 on the retina of the eye, the eye nerves 152 sense the image information and transmits such information to brain 151 through neural pathways 156. Brain-wave pattern associated with vision and intention of vision will be generated after image information perceived by brain 151. Such brain-wave patterns of re-focus can be pre-characterized or pre-trained for the viewer. Brain-wave sensors 153 are attached to the skull of viewer. In certain medical applications, brain-wave sensors 153 can be in contact with the brain cells inside the skull for better brain-wave capturing. When brain-pattern changes, it is compared with a database of known brain-patterns and their intended actions. If a brain-pattern of re-focus and re-focus direction retrieved from database, or generated with data from the database, can be matched to the brain-pattern captured, a re-focus event is generated.

Now, coming back to the First Embodiment. For the Step 103 of calculating the desired focus depth (Step 103) and retrieving image (Step 104), a computing system is used to obtain information of viewer's eye-lens, eyeball or brain-wave pattern change from the sensors sensing such information from the viewer, and calculate the desired re-focus depth of the viewer about the image currently shown to the viewer. For brain-pattern recognition of viewer's re-focus intention, a brain-wave pattern database also provides information to the computing system to compare to the received brain pattern. Calculation of intended focus depth in Step 103 can be computed by the eye-lens, or together with eye-ball change, information obtained in Step 102, and optionally together with the image currently being displayed to the viewer. An image capturing device, for example a camera, can be in close proximity to the viewer's eyes to capture the scene that the viewer is currently being exposed to, wherein the eye-lens focus depth, or together with eye pupil position, can be compared to the captured image to calculate the object of interest that is being focused upon. The display device where the image is displayed can also provide the current image information directly to the computing system. After a desired re-focus depth is calculated, for single viewer case, the computing system then retrieves the correct image with the desired focus depth from the recording media or recorded image database and display such image on the display device. For the Step 105 of displaying the retrieved image, if the display device displays single focus depth image only, only single viewer is allowed. To share the same display between multiple viewers, multiplexing device is now required.

For the Step 105 of displaying images on the same display for multiple viewers with different intended focus-depth, multiplexing device is now required. For multiple viewer case, the first option is that the images of same scene but with different focus-depths are multiplexed by time-slot to be displayed on the same display and selectively shown by a shuttered image multiplexing device to the viewer with matching intended focus-depth. The see-through substrates that viewers view through can be an image multiplexing device, to differentiate the different focus depth each viewer desires, so that different viewer may see same displayed scene with different focus depth into the same scene. An example of the multiplexing is that images of same scene but with different focus-depth are sequentially shown on the same display to a group of viewers. The viewers with different intended focus-depth through changing their eye-lens can each only view one of the different sequentially displayed images due to the shutter function of the see-through substrates each of the viewer view through, where the see-through substrates synchronize with the display regarding the sequence of sequentially displayed different focus-depth images and only allow the image that has correct focus-depth to be displayed to the viewer that has same intended focus-depth. Other images with other focus-depths that are not matching the intended focus-depth of the viewer are blocked by the shutter of the see-through substrate so that the viewer cannot see. In this way, each viewer always sees a scene or a changing scene that is always with the correct focus-depth according to the viewer's own intended focus depth.

Figure 16:
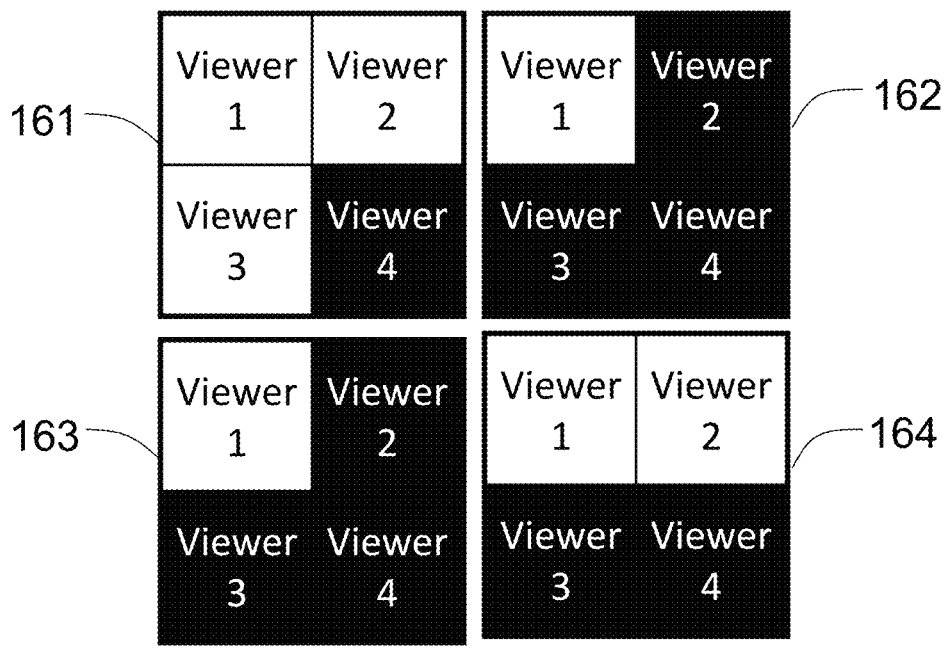
FIG. 16 is a schematic illustrating the second option for the step of displaying the retrieved image according to the embodiments of the current invention.

FIG. 16 is a schematic diagram illustrating the second option for the Step 105 of displaying the retrieved image to multiple viewers. Multiple viewers may share the same display where each viewer has a dedicated display unit of each pixel. Multiplexing device is required to share same display between multiple viewers. Each viewer has own retrieved image to be displayed on the same screen. Each viewer can only view assigned area of the screen. For the four adjacent pixels 161, 162, 163 and 164 shown, each viewer can only view one area within each pixel as assigned to each viewer: Viewer 1 sees four white color areas at the upper left corner of each pixel, which produce effective white color; Viewer 2 sees two white and two black color areas at the upper right corner of each pixel, which produce effective gray color; Viewer 3 sees one white and three black areas at the lower left corner of each pixel, which produce effective dark gray color; Viewer 4 sees four black areas at the lower right corner of each pixel, which produce effective black color. Such multiplexing can be achieved by synchronized shuttering of image by a shuttered device with-in the see-through substrate that viewers view through, where the shuttered device synchronized with the display of pixels to each viewer.

Figure 17:
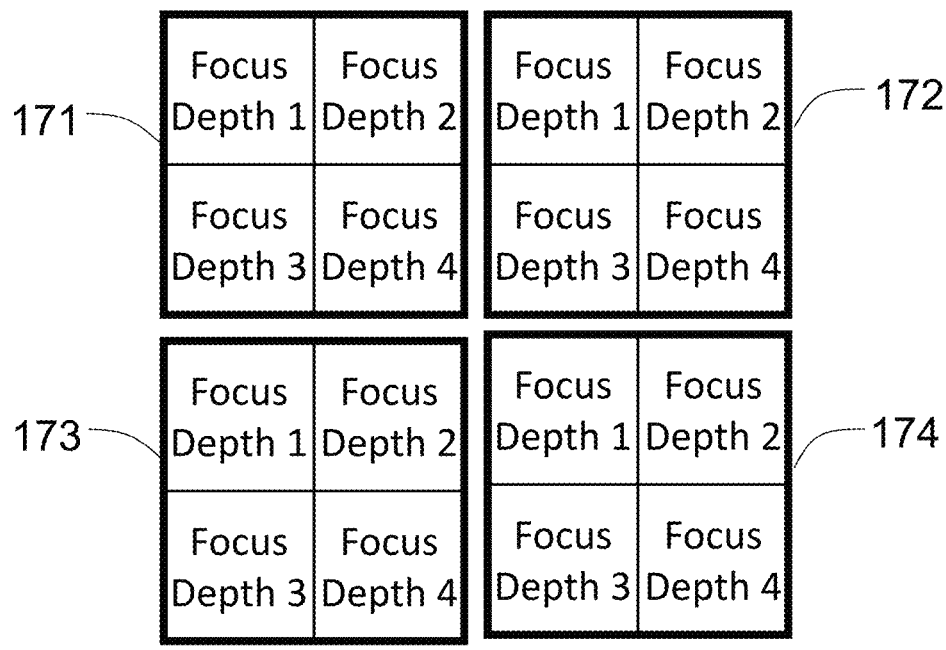
FIG. 17 is a schematic illustrating the third option for the step of displaying the retrieved image according to the embodiments of the current invention.

FIG. 17 is a schematic diagram illustrating the third option for the step of displaying the retrieved image according to the embodiments of current invention. Multiple viewers may share a same display with the display showing multiple focus depth images of the same scene. Multiplexing device is required to share same display between multiple viewers. Images for various focus depth of the eye are displayed simultaneously on the same screen. Each pixel on the display contains multiple areas with each area dedicated to a different focus depth. Each viewer can only see the areas with the same focus depth within all pixels at any instant time. Each viewer's desired focus depth is sent to the multiplexing device within the see-through substrate that the viewer see through. Each viewer's multiplexing device is adjusted to the desired focus depth and shifts between different areas of the pixels having different focus depth to achieve effective focus depth change. For the four adjacent pixels 171, 172, 173 and 174 shown in FIG. 17, each viewer can only view the areas with the same focus depth of all pixels at any instant time. If a viewer's desired focus depth is Focus Depth 1, the multiplexing device then allows only the areas marked in FIG. 17 as "Focus Depth 1" to be shown to the viewer. If the viewer wants to focus to Focus Depth 4, the multiplexing device then adjusts and allows only the areas marked "Focus Depth 4" to be shown to the viewer. Such multiplexing can be achieved by synchronized shuttering of image shown on screen and the multiplex device within the see-through substrate.

Figure 18:
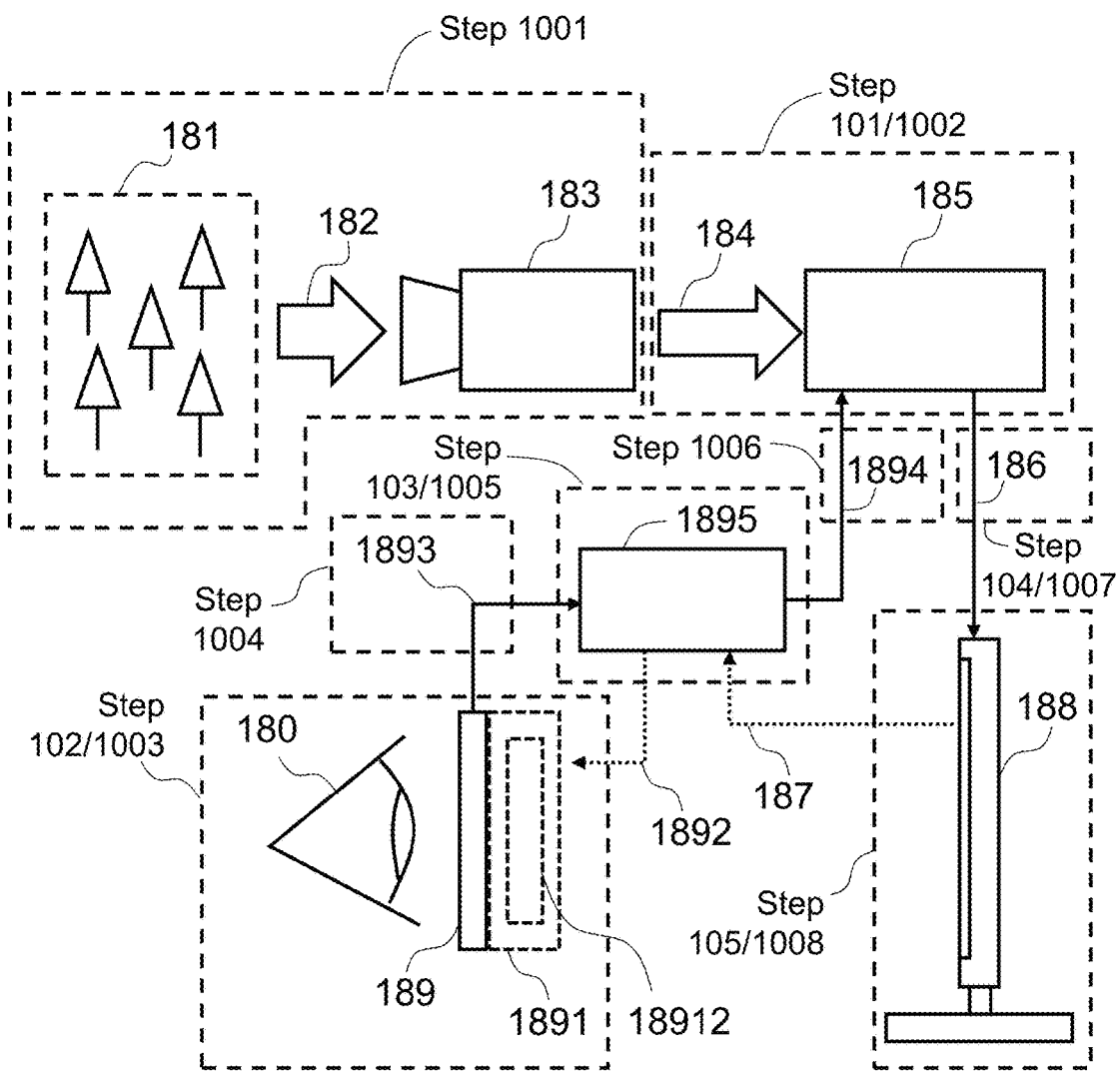
FIG. 18 is a schematic flow diagram illustrating the first embodiment wherein eye-lens and eye-ball sensing of eye-information are used.

FIG. 18 is a schematic flow diagram illustrating the first embodiment wherein eye focus-depth sensing for eye-information are used: (Step-1001) A scene 181 of objects is recorded by a recording device 183 as in 182; (Step-1002) The recorded image 184 of the scene 181 is stored in a recording media or a database of recorded image 185; (Step-1003) A sensor 189 is positioned in proximity to the viewer's eye 180 and detects re-focusing information from viewer's eye 180; (Step-1004) The said re-focusing data is transmitted as in 1893 to the computing device 1895 for computing desired focus depth of the viewer; (Step-1005) The device 1895 computes the desired focus depth of the viewer and determines the image to request from 185 media or database that has desired focus depth of the viewer; (Step-1006) The device 1895 sends request to 185 recording media or database to request image with desired focus depth of the viewer as in 1894; (Step-1007) The device 185 sends requested image with desired focus depth of the viewer to the image display device 188 as in 186; (Step-1008) The device 186 displays the requested image with desired focus depth to the viewer.

In Step-1005, the current image shown on the image display device 188 may optionally be used as an input to the device 1895 to compute desired focus depth of the viewer as in 187. Optional glasses 1891 can be integrated with sensor 189 and positioned in front of the viewer's eye 180 to allow viewer to see through, where the glasses 1891 can have the functions to enable any of: stereo vision, multiplexing different viewers to share same display, powering sensor 189, communicating between sensor 189 and device 1895, storing eye information detected by sensor 189, or provide a fixed spatial reference for detector 189 to detect eye 180 pupil position. In the case of multiple users sharing same display, in Step-1006, the device 1895 can send to glass 1891 of each viewer the desired focus depth information 1892 of the images shown on display 188 to enable different user seeing different focus depth images on the same image display 188.

Typically, when eye 180 focus depth changes the viewer sees objects at different spatial distances from the eye. Only displaying image on fixed display 188 will not replicate this real-life function and re-focusable vision will not work because the eye 180 is focusing on spatial distances from the eye 180 other than the place of the display 188. In Step-1008, an optical imaging system 18912 with a variable effective focus depth can be disposed in the glass 1891 that the viewer's eye 180 sees through, wherein the effective focus depth of the optical system 18912 real-time and automatically adjusted to the viewer's eye-lens focus depth change according to the focus depth information 1892 sent from device 1895, such that the image shown on same display 188 with fixed distance to eye 180 can appear to the viewer to be at different distances from the viewer when eye 180 intended focus-depth changes, and the images shown on the display 188 always appears focused on the retina of the viewer's eye at various viewer's eye-lens focus depth. Such optical image system 18912 can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component based on micro-electro-mechanical-system (MEMS) actuated lens, mirror or prism arrays.

Figure 19:
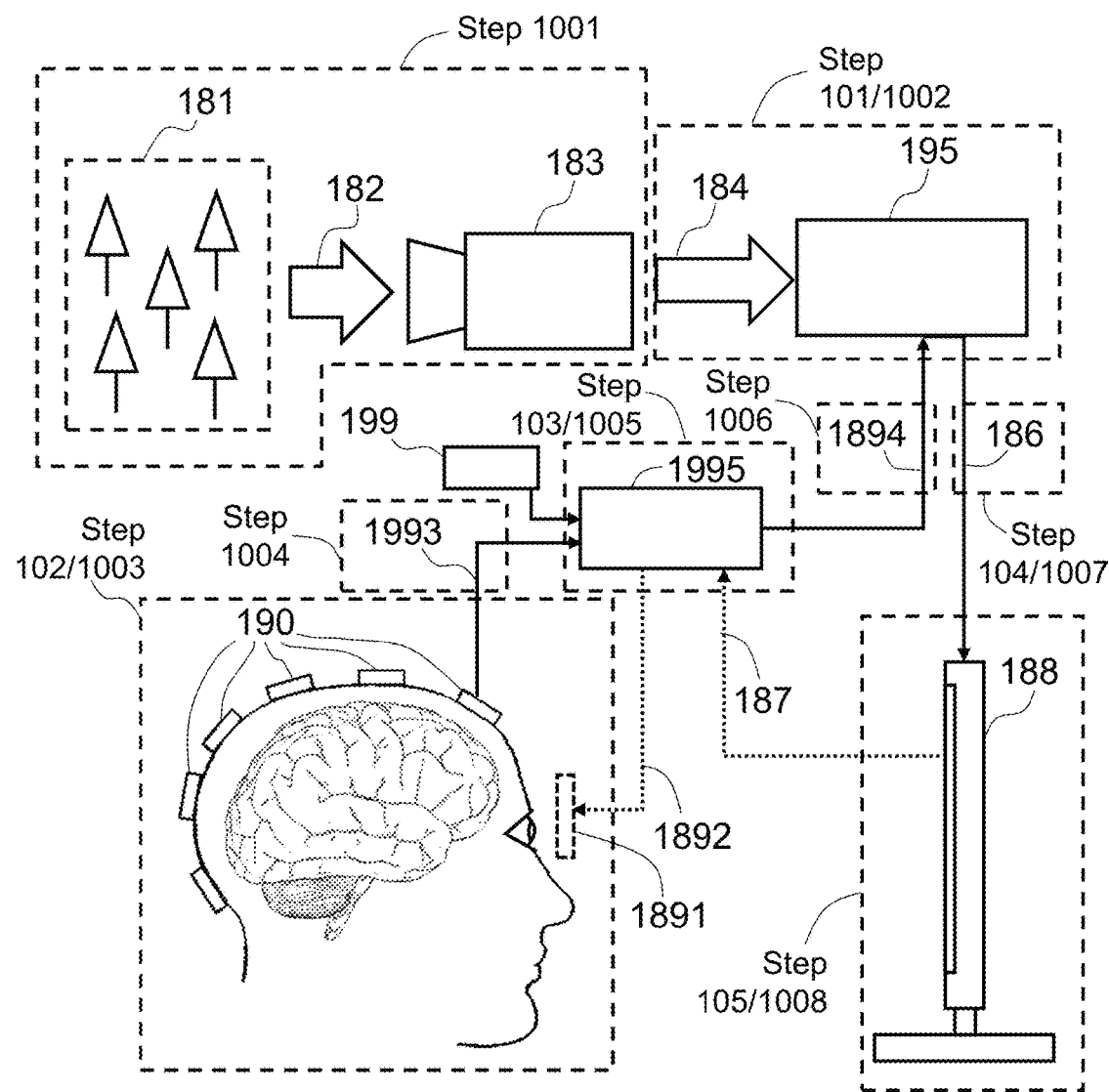
FIG. 19 is a schematic flow diagram illustrating the first embodiment wherein brain-wave pattern sensing of re-focus intention are used.

FIG. 19 is a schematic flow diagram illustrating the first embodiment wherein brain-wave pattern sensing of re-focus intention are used. All other steps, descriptions and procedures are same as in FIG. 18 case, except the following steps: (Step-1003) Brain-wave sensor 190 is positioned in contact with the viewer's head to sense the brain-wave pattern of the viewer; (Step-1004) The said brain-wave pattern is transmitted as in 1993 to the device 1995 for computing desired focus depth of the viewer; (Step-1005) The device 1995 computes the desired focus depth of the viewer with an additional input from a brain-wave pattern data-base 199, and determines the image with correct focus-depth to request from 195 media or database that matches the desired focus depth of the viewer.

The second embodiment of the current invention is also for static or motion pictures. The method according to the second embodiment includes the steps of: (Step 201) Having a recording media containing images of the same scene where images are recorded simultaneously with different focus depth into the same scene; (Step 202) Active sensing the re-focus intention of viewer by monitoring the physiological change of viewer's vision related body function including viewer's eye-lens change, without viewer's active participation or physical action, and generating such physiological change information; (Step 203) Calculating intended focus depth or intended focused object in the scene from the physiological change information from Step 202; (Step 204) Retrieving the images with intended focus depth from the recording media containing recorded images from Step 201; (Step 205) Display retrieved image from Step 204 to the viewer's eyes.

In Step 202, the said physiological change of viewer's vision related body function can also include the rotational position of the viewer's eye pupil.

In Step 205, an optical imaging system 18912 with a variable effective focus depth can be disposed in the optical path between the image and the viewer's eye, where the effective focus depth of the system is automatically adjusted to the viewer's eye-lens focus depth change in real time according to the physiological change information from Step 202, such that the image of Step 205 shown on the same screen appears focused on the retina of the viewer's eye at various viewer's eye-lens focus depth. Such optical image system can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component composed of micro-electro-mechanical-system (MEMS) actuated lens, mirror or prism arrays that performs effectively as an optical lens or an optical concave or convex mirror.

All other aspects in the second embodiment are identical to those in the first embodiment expect that Step 101 method of simultaneously recording images of the same scene with different focus depth on recording media are not specified. Actual method to record images with various focus depth is not limited to the methods as described in the first embodiment. The second embodiment focuses on the method to achieve real-time re-focus by measuring the viewer's re-focus intention and utilizing existing recorded images from the recording media. Steps 202, 203, 204 and 205 in the second embodiment are same as Steps 102, 103, 104 and 105 in the first embodiment.

Figure 20:
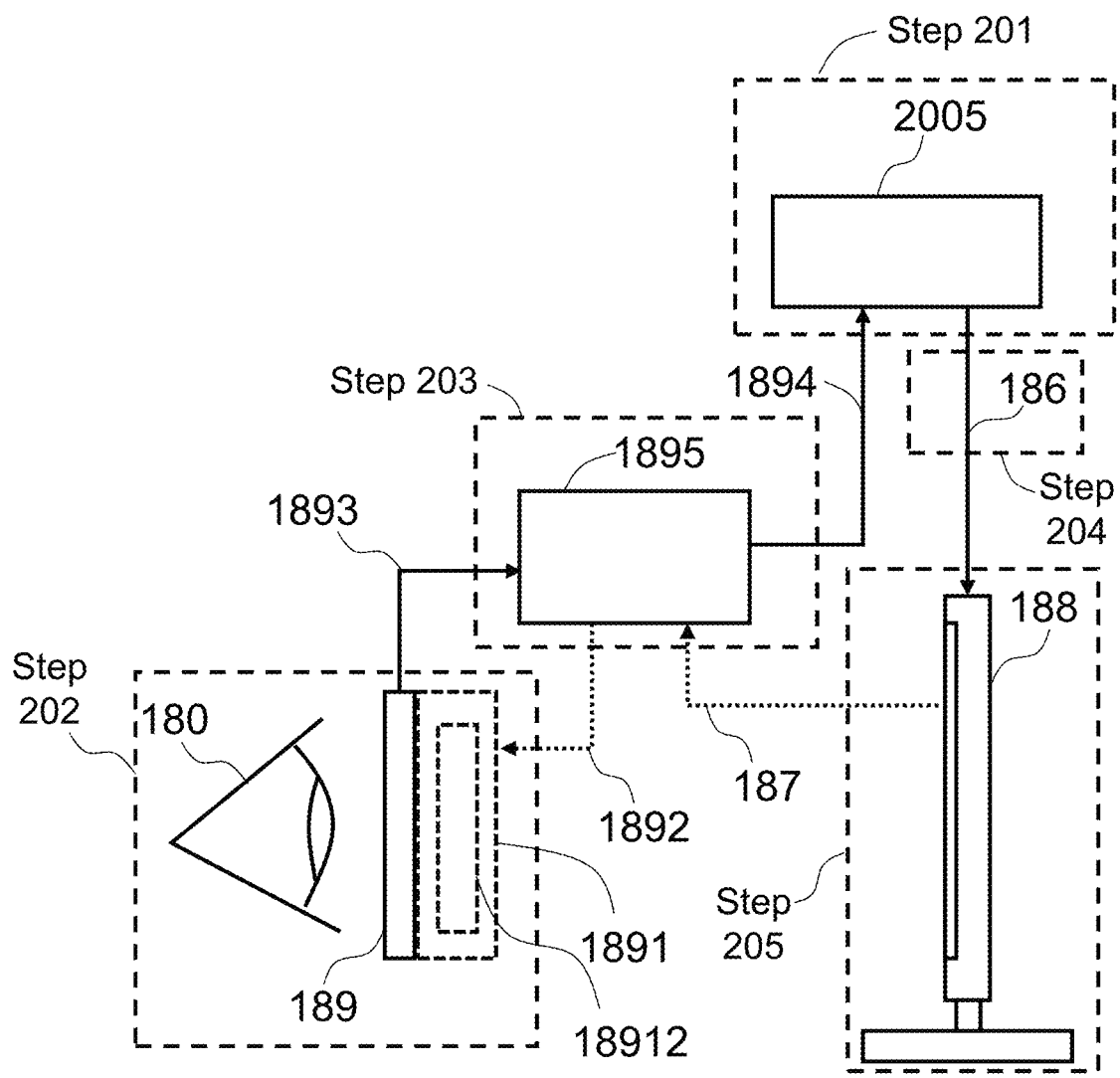
FIG. 20 is a schematic flow diagram illustrating the second embodiment wherein eye-lens and eye-ball sensing of eye-information are used.

FIG. 20 is a schematic flow diagram illustrating the second embodiment wherein eye-lens and eye-ball sensing of eye-information are used. All other steps, descriptions and procedures are same as in FIG. 18 case, except Step-1001 and Step-1002 are removed, wherein 205 recording media or recorded image database already exists and contains images simultaneously recorded from the same scene with different focus depth.

Figure 21:
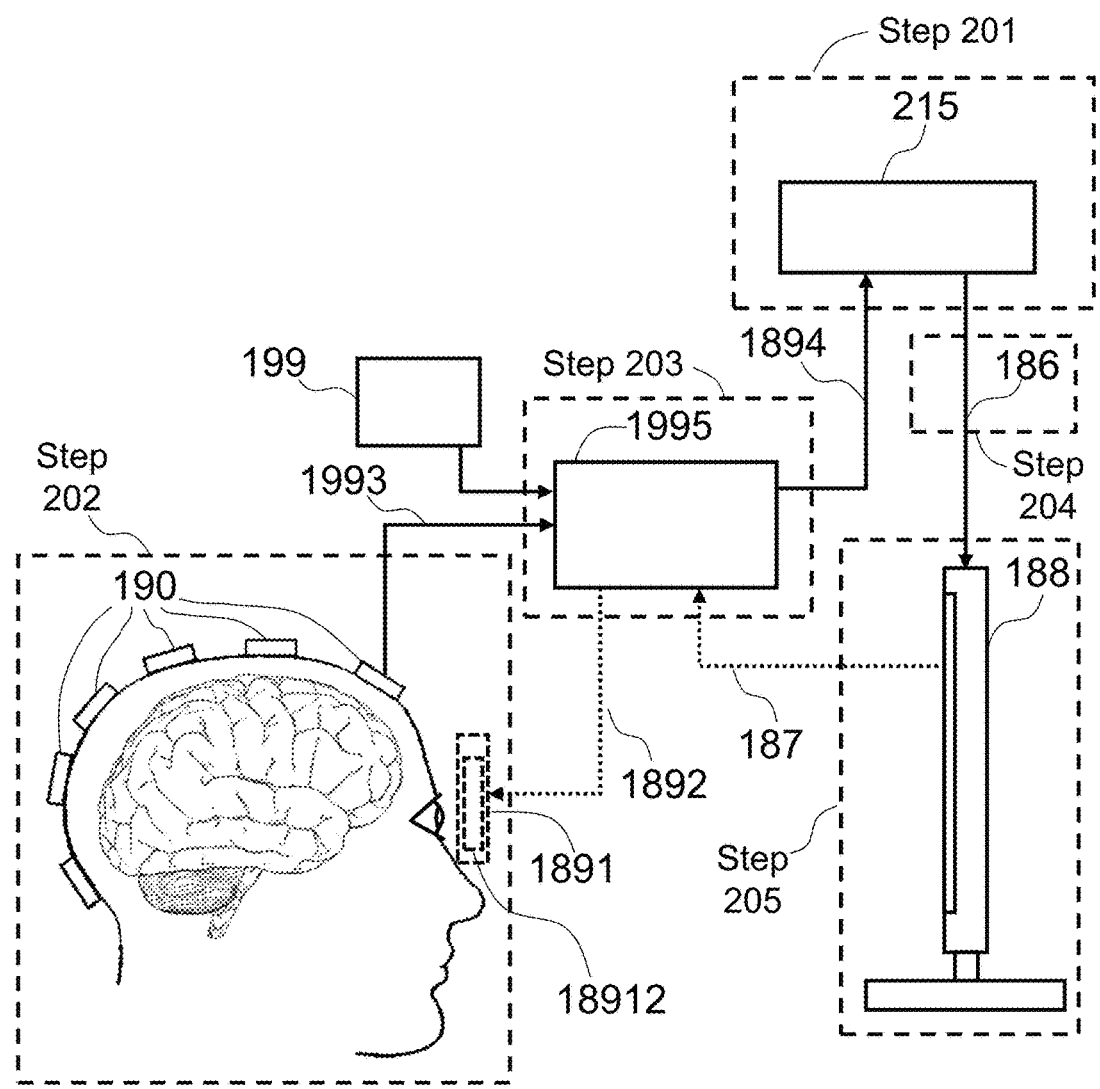
FIG. 21 is a schematic flow diagram illustrating the second embodiment wherein brain-wave pattern sensing of re-focus intention are used.

FIG. 21 is a schematic flow diagram illustrating the second embodiment wherein brain-wave pattern sensing of re-focus intention are used. All other steps, descriptions and procedures are same as in FIG. 19 case, except Step-1001 and Step-1002 are removed, wherein 215 recording media or recorded image database already exists and contains images simultaneously recorded from the same scene with different focus depth.

The third embodiment of the current invention is for enhanced human vision. The method according to the third embodiment includes the steps of: (Step 301) Having an image recording and transmission device that has at least one adjustable component that changes the focus depth of the device during recording process of a scene; (Step 302) Active sensing the re-focus intention of viewer by monitoring the physiological change of viewer's vision related body function including viewer's eye-lens change, without viewer's active participation or physical action, and generating such physiological change information; (Step 303) Calculating intended focus depth or intended focused object in the scene from the physiological change information from Step 302; (Step 304) Adjusting said adjustment component in Step 301 to reach intended focus depth of said device in Step 301; (Step 305) Recording and transmitting image by said device in Step 301 and displaying the transmitted image to the viewer's eyes.

Compared to the first embodiment, when a desired focus depth is calculated, instead of retrieving an image with the desired focus depth from the recording media or image database, the focus depth of the recording device into the scene is adjusted to the desired focus depth of the viewer. After recording a new image of a live scene with the adjusted focus depth, the newly recorded image with focus depth matching viewer's desired focus depth is then displayed to the viewer as the result of the viewer's intention to re-focus.

In Step 302, the said physiological change of viewer's vision related body function can also include the rotational position of the viewer's eye pupil.

In Step 305, an optical imaging system 18912 with a variable effective focus depth can be disposed in the optical path between the image and the viewer's eye, where the effective focus depth of the system is automatically adjusted to the viewer's eye-lens focus depth change in real time according to the physiological change information from Step 302, such that the image of Step 305 showing on the same display appears focused on the retina of the viewer's eye at various viewer's eye-lens focus depth. Such optical image system can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component composed of micro-electro-mechanical-system (MEMS) actuated lens, mirror or prism arrays that performs effectively as an optical lens or an optical concave or convex mirror.

Figure 22:
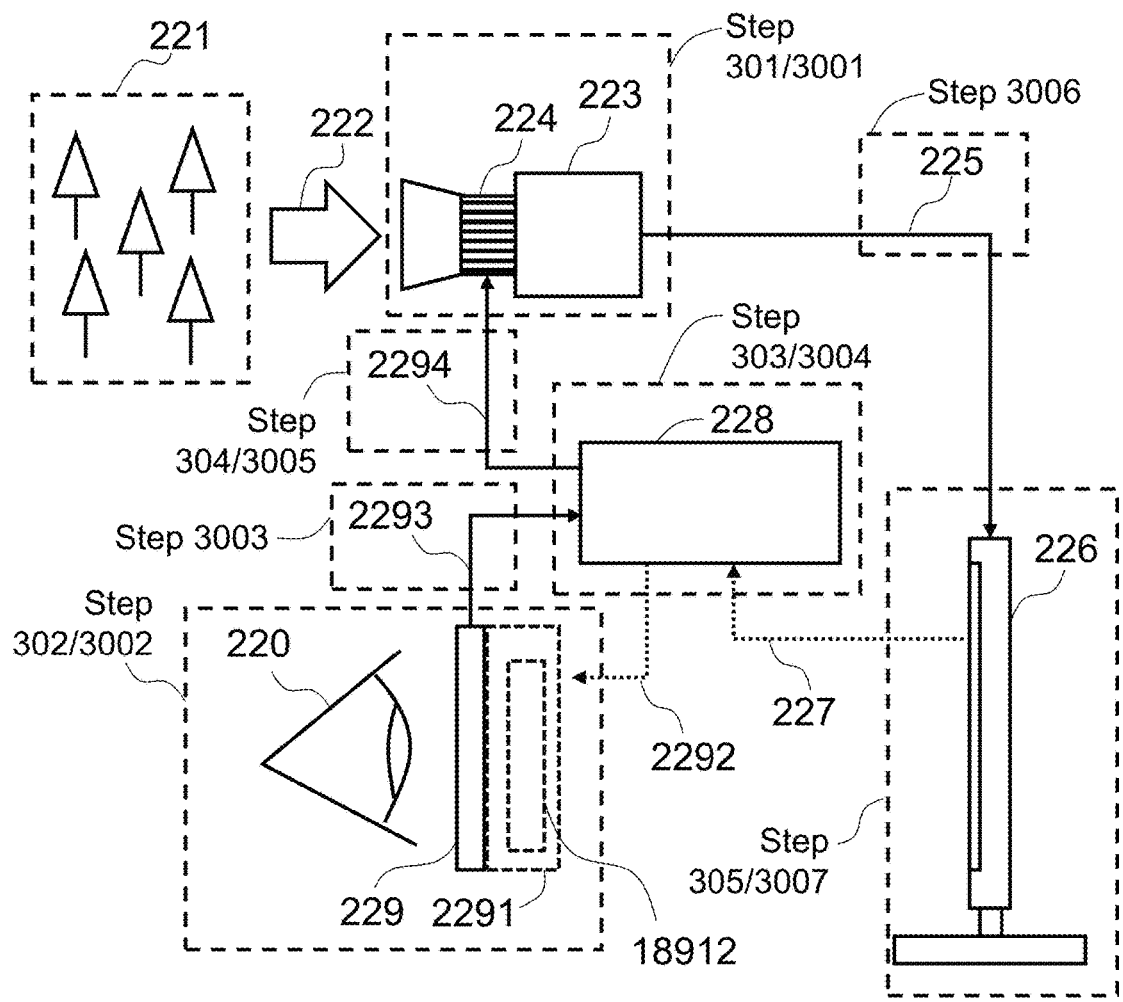
FIG. 22 is a schematic flow diagram illustrating the third embodiment wherein eye-lens and eye-ball sensing of eye-information are used.

FIG. 22 is a schematic flow diagram illustrating the third embodiment wherein eye-lens and eye-ball sensing of eye-information are used, including: (Step-3001) A scene 221 of objects is recorded by a recording device 223 having a focus depth adjustment component 224 as in 222; (Step-3002) A sensor 229 is positioned in proximity to the viewer's eye 220 and collects the re-focusing information or data from viewer's eye 220; (Step-3003) The said re-focusing data is transmitted as in 2293 to the device 228 for computing desired focus depth of the viewer; (Step-3004) The device 228 computes the desired focus depth of the viewer and determines the adjustment needed in said focus depth adjustment component 224; (Step-3005) The device 228 sends request to focus depth adjustment component 224 to adjust to desired focus depth of the viewer as in 2294; (Step-3006) The recording device 223 records image of current scene 221 of objects with adjusted focus depth adjustment component 224 and the said recorded image is transmitted to image display 226 as in 225; (Step-3007) The image display device 226 displays the updated image sent from recording devices 223 with desired focus depth of the viewer.

In Step-3004, the current image shown on the image display device 226 may optionally be used as an input to the device 228 to compute desired focus depth of the viewer as in 227. Optional glasses 2291 can be integrated with sensor 229 and positioned in front of the viewer's eye 220 to allow viewer to see through, where the glasses 2291 can have the functions to enable any of: stereo vision, multiplexing different viewers to share same display 226 and control same focus depth adjustment component 224, powering sensor 229, communicating between sensor 229 and device 228, storing eye information detected by sensor 229, or providing a fixed spatial reference for detector 229 to detect eye 220 pupil position. In the case of multiple users sharing same display, in Step-3007, the device 228 can send to glass 2291 of each viewer the desired focus depth information 2292 of the images shown on display 226 to enable different user seeing different focus depth images on the same image display 226; also in Step-3005, the device 228 can send request to focus depth adjustment component 224 as in 2294 to adjust to desired focus depths of all viewers which are implemented by the component 224 in a sequential and time slotted manner, whereas one viewer's desired focus depth is realized by the component 224 in an assigned time slot and image recorded by device 223 during that assigned time frame will be only shown to the said viewer by display 226 with the use of a multiplexing device in glass 2291.

In Step 3007, an optical imaging system 18912 with a variable effective focus depth can be disposed in the glass 2291 that the viewer's eye 220 sees through, wherein the effective focus depth of the system real-time and automatically adjusted to the viewer's eye-lens focus depth change according to the focus depth information 2292 sent from device 228, such that the image shown on the same display 226 always appears focused on the retina of the viewer's eye at various viewer's eye-lens focus depth. Such optical image system can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component composed based on micro-electro-mechanical-system (MEMS) actuated lens, mirror or prism arrays.

Figure 23:
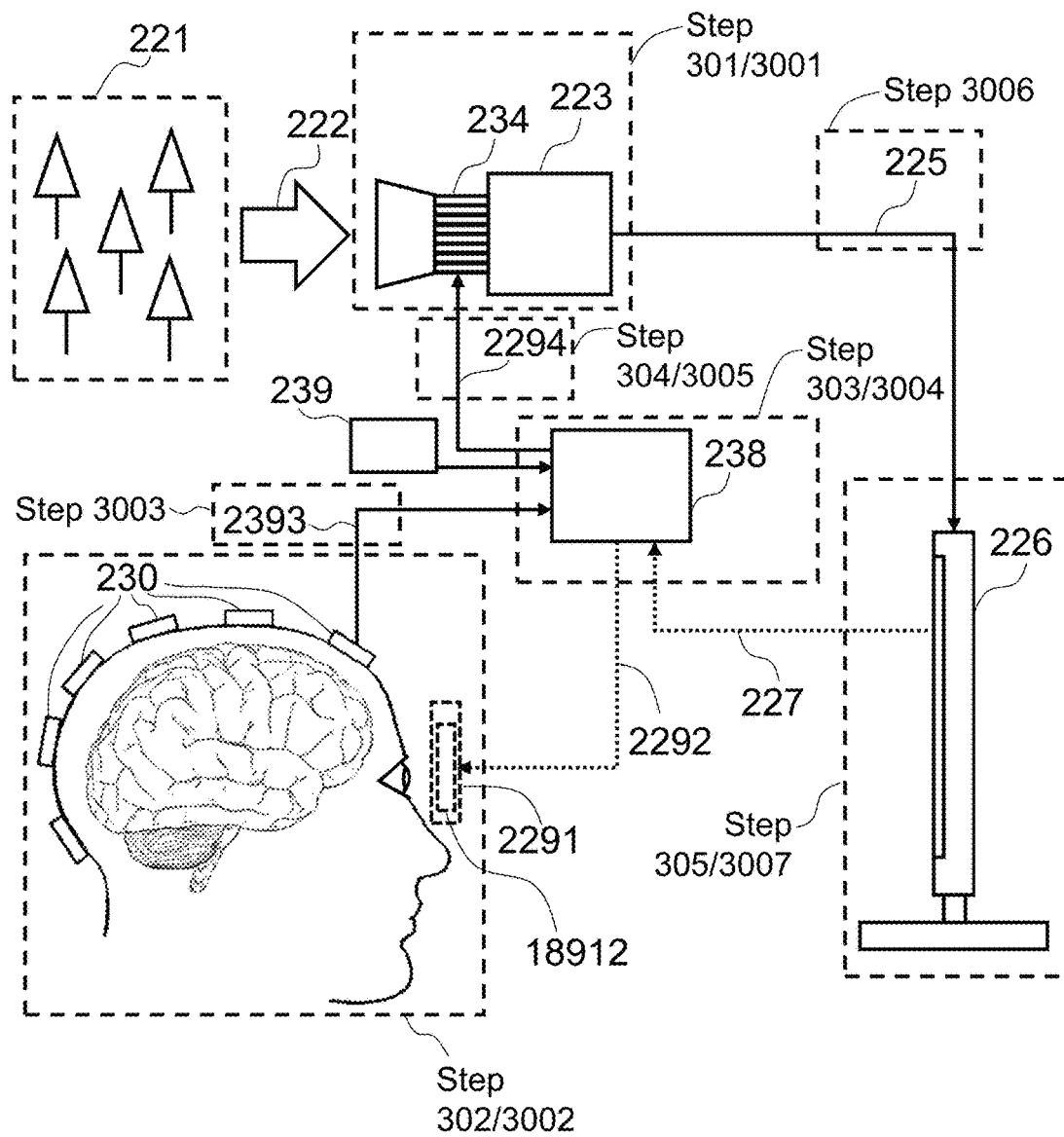
FIG. 23 is a schematic flow diagram illustrating the third embodiment wherein brain-wave pattern sensing of re-focus intention are used.

FIG. 23 is a schematic flow diagram illustrating the third embodiment wherein brain-wave pattern sensing of re-focus intention are used. All other steps, descriptions and procedures are same as in FIG. 22, except following steps: (Step-3002) Brain-wave sensor 230 is positioned in contact with the viewer's head to sense the brain-wave pattern of the viewer; (Step-3003) The said brain-wave pattern is transmitted as in 2393 to the device 238 for computing desired focus depth of the viewer; (Step-3004) The device 238 computes the desired focus depth of the viewer with an additional input from a brain-wave pattern data-base 239, and determines the adjustment needed in the focus depth adjustment component 234.

The fourth embodiment of the current invention is for artificial reality or augmented reality. The method according to the fourth embodiment includes the steps of: (Step 401) Having an artificial image generation device, for example a computer or an image processor, that has at least one input parameter that controls the focus depth during image generation process of a scene; (Step 402) Active sensing the re-focus intention of viewer by monitoring the physiological change of viewer's vision related body function including viewer's eye-lens change, without viewer's active participation or physical action, and generating such physiological change information; (Step 403) Calculating intended focus depth and/or intended in-focus objects in the scene from the physiological change information from Step 402; (Step 404) Adjusting the input parameter in Step 401 to reach intended focus depth of the scene generated by the image generation device in Step 401; and (Step 405) Generating a scene by the generation device in Step 401 and displaying the image of the generated scene to the viewer's eyes.

In Step 402, the said physiological change of viewer's vision related body function can also include the rotational position of the viewer's eye pupil.

In Step 405, an optical imaging system 18912 with a variable effective focus depth can be disposed in the optical path between the image and the viewer's eye, where the effective focus depth of the system is automatically adjusted to the viewer's eye-lens focus depth change in real time according to the physiological change information from Step 402, such that the image of Step 405 displayed on the same screen appears focused on the retina of the viewer's eye at various viewer's eye-lens focus depth. Such optical image system can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component composed of micro-electro-mechanical-system (MEMS) actuated lens, mirror or prism arrays that performs effectively as an optical lens or an optical concave or convex mirror.

Compared to first embodiment, when a desired focus depth is calculated, instead of retrieving an image with the desired focus depth from the recording media or image database of as in first embodiment, in fourth embodiment, a parameter controlling the focus depth of the image generated by the image generation device is adjusted and a new image is generated with the desired focus depth. The new image is then displayed to the viewer as the result of the viewer's intention to re-focus.

For Step 401, the image display can be an oblique display allowing image to be shown to viewer by itself, or a transparent see-through display allowing image to overlap a live scene that viewer sees.

Figure 24:
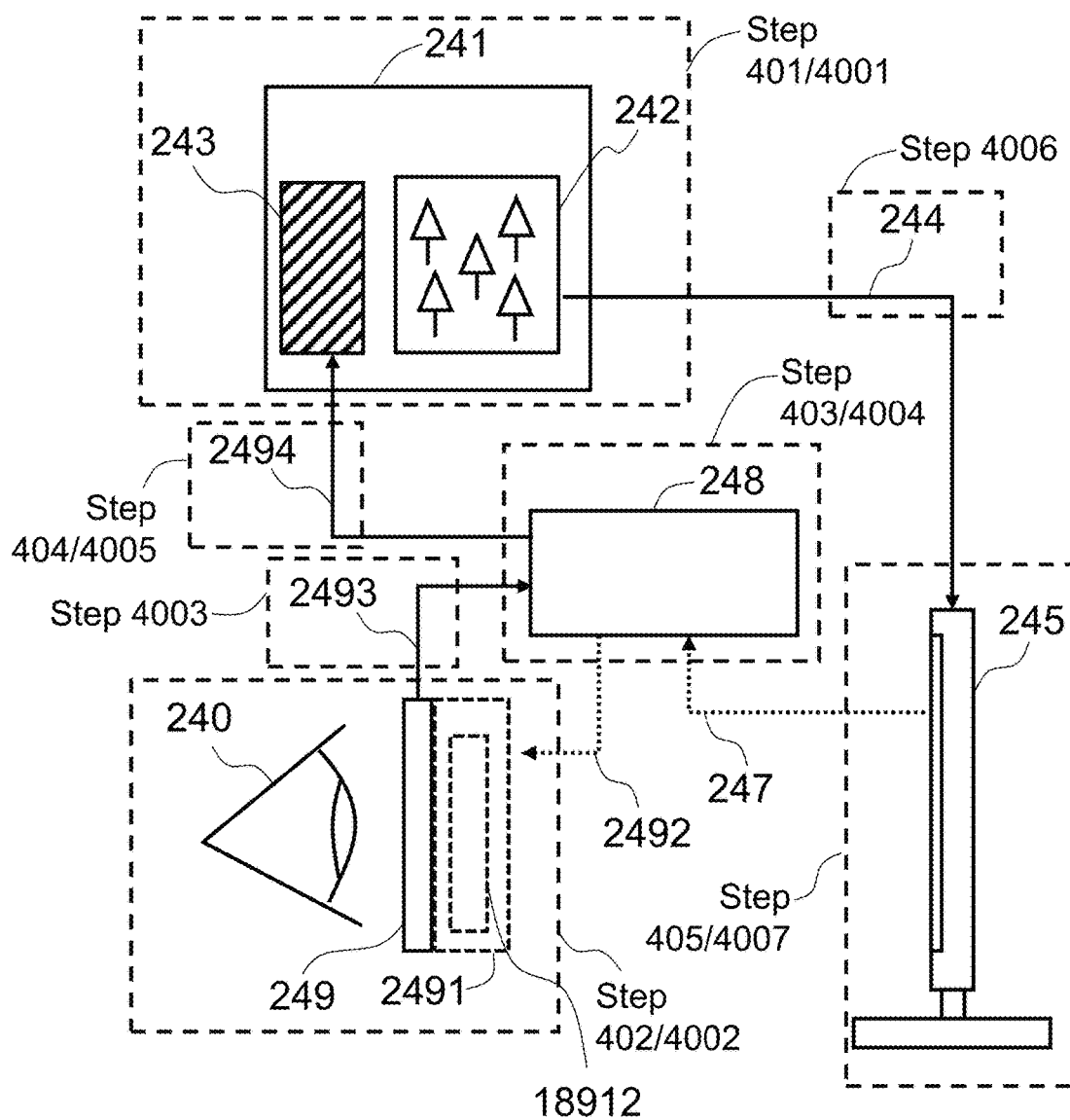
FIG. 24 is a schematic flow diagram illustrating the fourth embodiment wherein eye-lens and eye-ball sensing of eye-information are used.

FIG. 24 is a schematic flow diagram illustrating the fourth embodiment wherein eye-lens and eye-ball sensing of eye-information are used, including: (Step-4001) An image generation device 241 producing generated image 242 and having a focus depth adjustment parameter 243 as one input of the image generation process; (Step-4002) A sensor 249 is positioned in proximity to the viewer's eye 240 and collects the re-focusing information or data from viewer's eye 240; (Step-4003) The said re-focusing data is transmitted as in 2493 to the device 248 for computing desired focus depth of the viewer; (Step-4004) The device 248 computes the desired focus depth of the viewer and determines the adjustment needed of said focus depth adjustment parameter 243; (Step-4005) The device 248 sends request to image generation device 241 to adjust focus depth adjustment parameter 243 according to the desired focus depth of the viewer as in 2494; (Step-4006) The image generation device 241 generates image 242 reflecting the desire focus depth of the eye 240 with adjusted focus depth adjustment parameter 243 and the generated image 242 is transmitted to image display device 245 as in 244; (Step-4007) The image display device 245 displays the updated image 242 sent from the image generation devices 241 to the viewer.

In Step-4004, the current image shown on the image display device 245 may optionally be used as an input to the device 248 to compute desired focus depth of the viewer as in 247. Optional glasses 2491 can be integrated with sensor 249 and positioned in front of the viewer's eye 240 to allow viewer to see through, where the glasses 2491 can have the functions to enable any of: stereo vision, multiplexing different viewers to share same display 226 and control same focus depth adjustment parameter 243, powering sensor 249, communicating between sensor 249 and device 248, storing eye information detected by sensor 249, or providing a fixed spatial reference for detector 249 to detect eye 240 pupil position. In the case of multiple users sharing same display, in Step-4007, the device 248 can send to glass 2491 of each viewer the desired focus depth information 2492 of the images shown on display 245 to enable different user seeing different focus depth images on the same image display 245; also in Step-4005, the device 248 can send request to focus depth adjustment parameter 243 as in 2494 to adjust to desired focus depths of all viewers which are implemented by the parameter 243 and device 241 to generate multiple images of 242 of same scene with each image reflecting one viewer's desired focus and same image will only be shown to the said same viewer by display 245 with the use of a multiplexing device in glass 2491.

In Step 4007, an optical imaging system 18912 with a variable effective focus depth can be disposed in the glass 2491 that the viewer's eye 240 sees through, wherein the effective focus depth of the system real-time and automatically adjusted to the viewer's eye-lens focus depth change according to the focus depth information 2492 sent from device 248, such that the image shown on same display 245 always appears focused on the retina of the viewer's eye at various viewer's eye-lens focus depth. Such optical image system can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component composed based on micro-electro-mechanical-system (MEMS) actuated lens, mirror or prism arrays.

Figure 25:
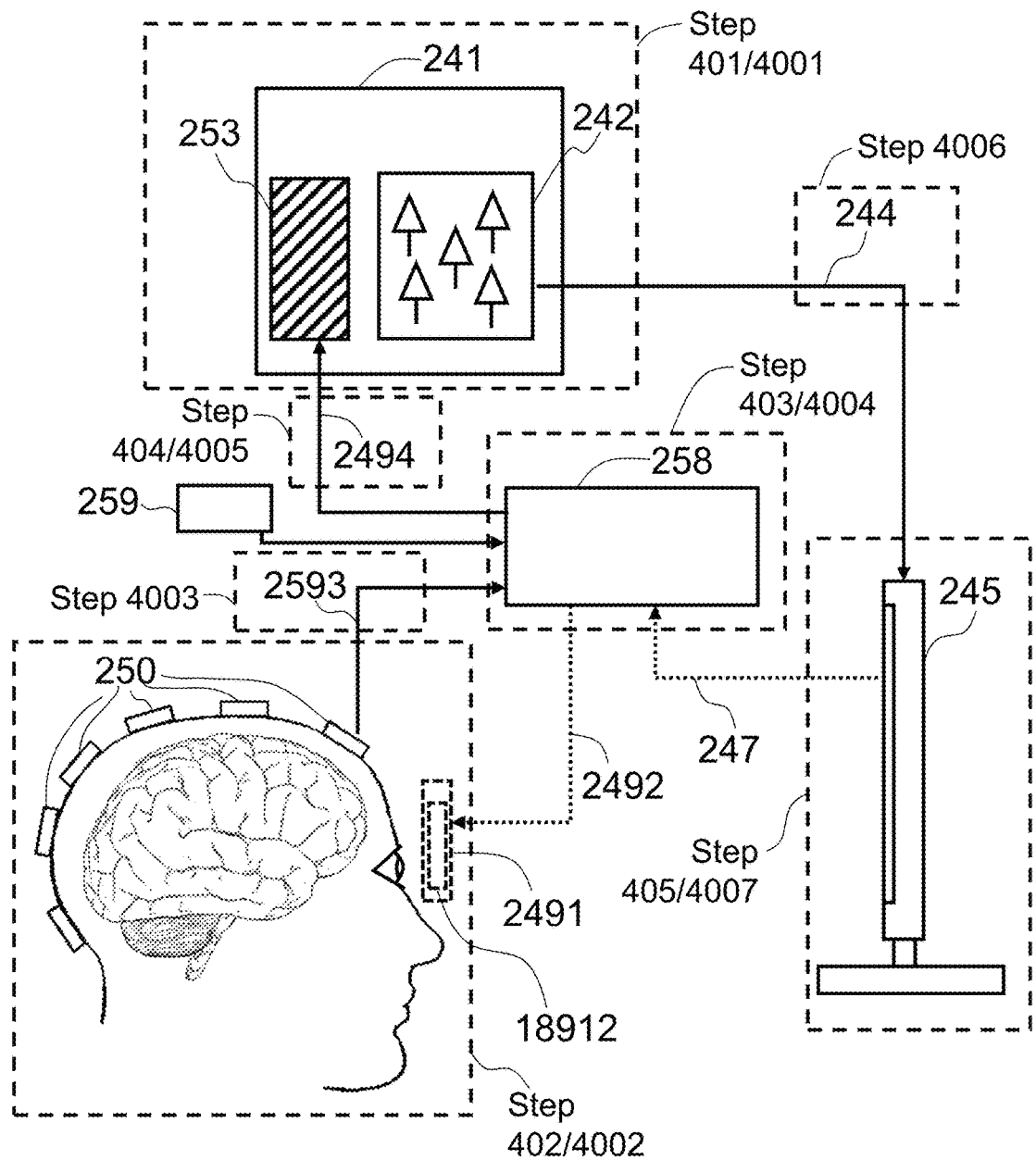
FIG. 25 is a schematic flow diagram illustrating the fourth embodiment wherein brain-wave pattern sensing of re-focus intention are used.

FIG. 25 is a schematic flow diagram illustrating the fourth embodiment wherein brain-wave pattern sensing of re-focus intention are used. All other steps, descriptions and procedures are same as in FIG. 24 case, except following steps: (Step-4002) Brain-wave sensor 250 is positioned in contact with the viewer's head to sense the brain-wave pattern of the viewer; (Step-4003) The said brain-wave pattern is transmitted as in 2593 to the device 258 for computing desired focus depth of the viewer; (Step-4004) The device 258 computes the desired focus depth of the viewer with an additional input from a brain-wave pattern data-base 259, and determines the adjustment needed in the focus depth adjustment parameter 253.

In Step 101, Step 201, Step 301 and Step 401, the image recording, or the recorded image, or the image recording device can be any of: (1) stereoscopic to achieve re-focusable stereo vision; and (2) conventional non-stereoscopic to achieve re-focusable plain vision.

In Step 102, Step 202, Step 302 and Step 402, the active sensing of the re-focus intention of viewer can be any of: (1) by monitoring the change of shape or curvature of any of: the viewer's eye-lens, cornea, and eyeball rotation by an optical method involving at least an optical emitter and an optical detector; (2) by monitoring the change of the projected image on the retina of the viewer's eye, where the projected image can be special patterns that are designed for sensing of re-focus intention, or the objects in the projected image that are focused clearer than other objects in the image, where these said clearer objects in the actual view that viewer is seeing are used to indicate viewer's focus depth and focusing point; (3) by monitoring the change of shape or curvature of any of: the viewer's eye-lens, cornea, and eyeball rotation, by an electrical method without using optical emitter or optical detector; and (4) by monitoring the brain wave pattern change of the viewer.

In Step 103, Step 203, Step 303 and Step 403, the calculation of intended focus depth can be any of: (1) by the physiological change information of viewer's eye; (2) by the image currently being displayed to the viewer together with the physiological change information. An image capturing device, for example a camera, can be in close proximity to the viewer's eyes to capture and/or record the scene that the viewer is being exposed to, wherein the eye-ball position and/or eye-lens focus depth can be compared to the captured image to calculate the objects of interest that need being focused upon.

In Step 304 of the third embodiment, the adjustable component can be (1) lens or lens array, mirror or mirror array, lens and mirror combination; or (2) mechanical or electrical mechanism that changes the focusing depth of the said recording device.

In Step 404 of the fourth embodiment, the input parameter component can be either a software input or a hardware input.

In Step 105, Step 205, Step 305 and Step 405, the displayed image can be any of: (1) stereoscopic to achieve re-focusable stereo vision; and (2) conventional non-stereoscopic to achieve re-focusable plain vision. The image can be displayed on a display screen that is positioned away from viewer's body. The image can also be displayed on a wearable display device that is disposed close to viewer's eye or fixed to viewer's head. The image can also be displayed by a scanning light beam projecting directly into viewer's eye and forms one or multiple scanning light spots on the viewer's eye retina, where the fast 2D scan of the light beam spot on retina forms perceived image by the viewer. The image can also be displayed by an MEMS actuated mirror array reflecting one or more light sources, or an MEMS actuated light source array, which projects light beams directly into viewer's eye and forms a 2D image directly on the retina of the viewer's eye.

The recording media of all four embodiments can be any of: (1) an analog or film based media; (2) a digital media, for example a Charge-coupled device (CCD) or a Complementary metal-oxide-semiconductor (CMOS) device; and (3) a holographic media.

Figure 26:
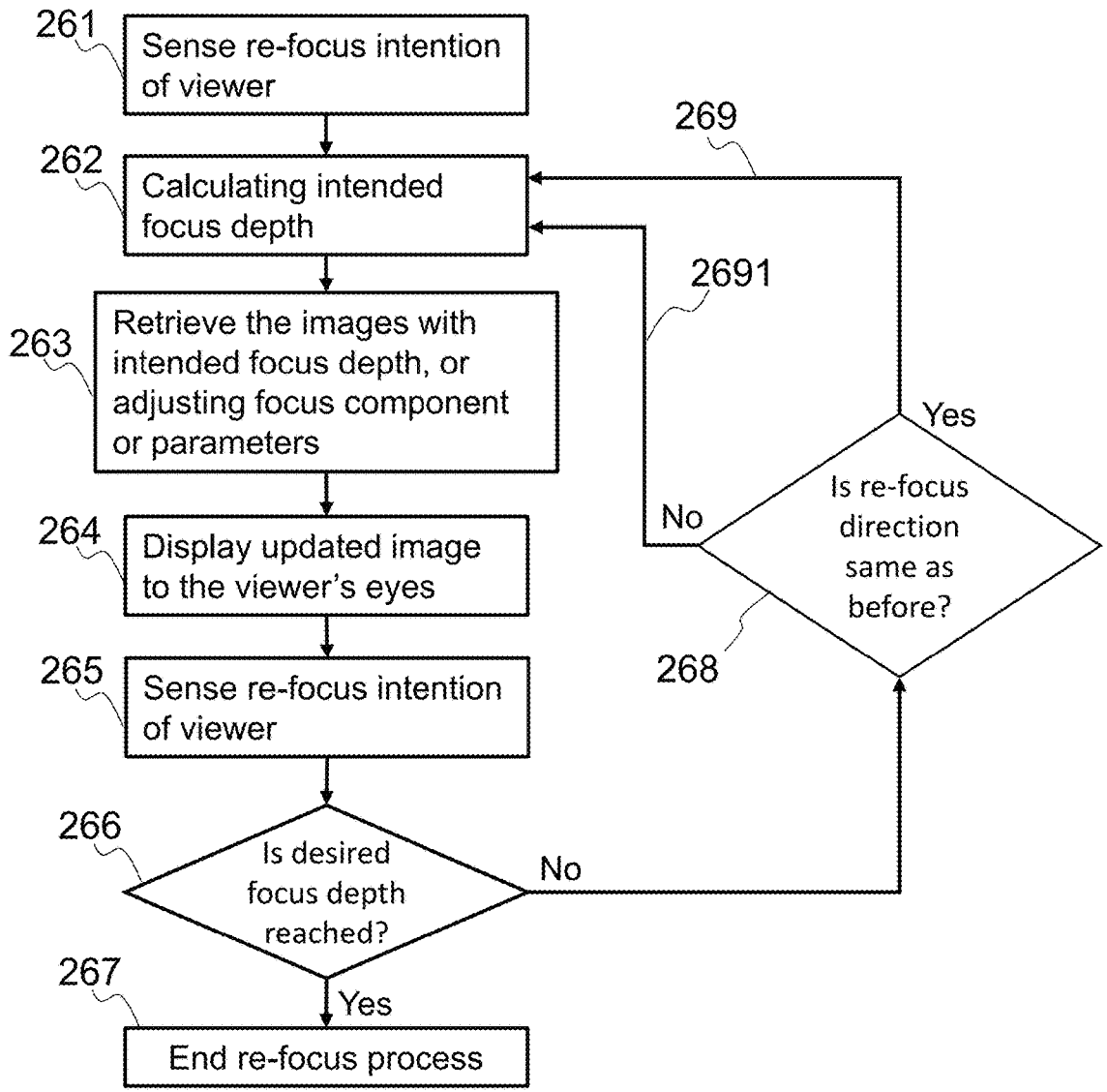
FIG. 26 is a schematic of a flow diagram illustrating a feed-back loop during re-focus.

FIG. 26 is a schematic flow diagram illustrating a feedback loop that can be used during the process to achieve desired focus depth of the viewer for all embodiments.

After initial sensing re-focus intention of viewer at step 261, intended focus depth of the viewer is calculated at step 262 with the information from step 261. Then at step 263, either image with corrected focus depth is retrieved from recording media or database as in embodiment 1 and embodiment 2, or new images are generated by adjusting the focus depth adjustment component as in embodiment 3 or by adjusting the focus depth adjustment parameter as in embodiment 4. The retrieved or updated image from step 263 is displayed to the viewer in step 264. Another step of sensing re-focus intention of viewer happens at step 265. A judgment step 266 of whether the desired focus depth has been reached is made by examining the re-focus information from step 265, wherein if desired focus depth is reached, viewer will show no desire to re-focus from step 265. Otherwise re-focus intention of viewer will still show in step 265. If desired focus depth is reached, then the re-focus adjustment process ends as in step 267. If desired focus depth is not reached, another judgment step 268 is made for whether the re-focus direction from step 265 is in the same direction of focusing as in step 261 or not. If the re-focus direction is the same, it means prior re-focus adjustment is under-adjustment and additional re-focus adjustment shall be incremental from the prior adjustment as in 269. Otherwise if the re-focus direction is opposite to step 261 direction, the prior adjustment is over-adjustment and a compensation of the over-adjustment shall be done as in 2691. Afterwards, the loop repeats from step 262 as described previously.

Such feedback loop can also be used to train the re-focus adjustment system to learn and accommodate each different user's re-focus habit and make best approach to reach desired focus depth in shortest time and fewest loops.

Before a re-focusable viewing procedure is applied to the viewer's viewing experience, a training process can be employed to better calibrate the viewer's re-focus and vision intention. Images with known and calibrated different focus depth, or objects with known and calibrated distance from viewer, can be shown to the viewer. The viewer's eye-lens information, eye ball position, or brain-wave patterns when viewing these images at various perceived distances, or objects at various spatial distances, from the viewer can be stored as calibration standards of the focus depth of this specific viewer. When eye-lens, eye ball position or brain-wave pattern changes during a viewing event of other images or objects, these previously stored calibration standards can be used to be compared to such changes and extrapolate the desired focus depth. The training process can be done each time before a re-focusable device is initially brought into utilization by a new user. It can also be done each time before a re-focusable viewing procedure takes place.

Figure 27:
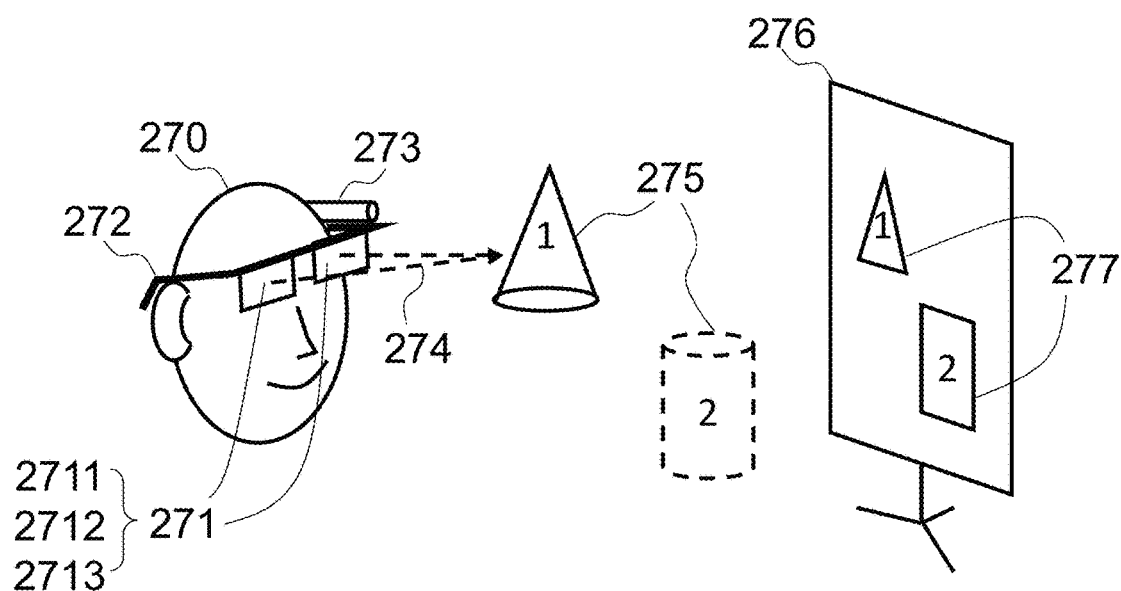
FIG. 27 is a schematic illustrating application of invention in pictures on display screen.

FIG. 27 is a schematic diagram illustrating the application of the invention in static and motion pictures on a display screen 276. Images 277 are displayed on an actual display screen 276 to the viewer 270. The viewer 270 is mounted with a supporting frame 272 that may contain a data processor 2721 (not shown in FIG. 27) that computes and processes information collected by the eye sensor 2711. The processor 2721 can also be a separate component not on the frame, wherein there is data communication between the frame 272 and the processor 2721. Supporting frame 272 supports see-through components 271 which can be composed of any one or any combination of: (1) sensor 2711 to detect eye-lens focus depth, or eyeball position at same time; (2) Stereoscopic vision enabling device 2712; and (3) Optional multiplexing component 2713 that chooses correct focus-depth image from display screen 276. The viewer's perception of the displayed images 277 through the stereoscopic vision device 2712 is 3D objects 275 containing "object 1" and "object 2" at different distances from the viewer. When viewer 270 pays attention to "object 1" and the re-focus intention is sensed by the eye sensor 2711 to be upon "object 1", the 2721 processor processes the eye sensor 2711 information and sends a command to the display screen 276 or the optional multiplex component 2713 to bring "object 1" into focus for viewer 270. "Object 1" is brought into focus in the viewer's vision as represented by the solid line, and "object 2" is defocused as represented by the dashed line. The viewer's sense of being focusing on "object 1' can be from changing the displayed images 277 on the display screen 276. The viewer's sense of being focusing on "object 1" can also be from adjusting a multiplexing component 2713 on the supporting frame 272 that only displays the images 277 on the display screen 276 that has correct focus depth that focuses on "object 1", in which case, multiple focus depth images are shown concurrently on the display screen 276.

An optional camera(s) 273 can be used to record current scene on the display screen 276 to help processor calculate viewer's desired focus depth. Same re-focus function can also be achieved without the stereoscopic vision, where objects 1 & 2 appear as flat picture instead of 3D objects in space, but can still be focused upon individually by the viewer 270. Position, orientation and movement of viewer's head can also be used as an input parameter when updating the images 277 displayed to the viewer 270.

An optical imaging system 18912 with a variable effective focus depth can be disposed as a part of the components 271 that the viewer's eyes see through, wherein the effective focus depth of the system is automatically adjusted to the viewer's eye-lens focus depth change in real-time, such that the images 277 shown focused on same display 276 that is at fixed distance from viewer 270 always appear focused on the retina of the viewer's eye at various viewer's eye-lens focus depth. To viewer 270, the images 277 are at different distances from viewer 270 when the focus depth changes in viewer 270's eye. Such optical image system can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component composed based on micro-electro-mechanical-system (MEMS) actuated lens, mirror or prism arrays.

Figure 28:
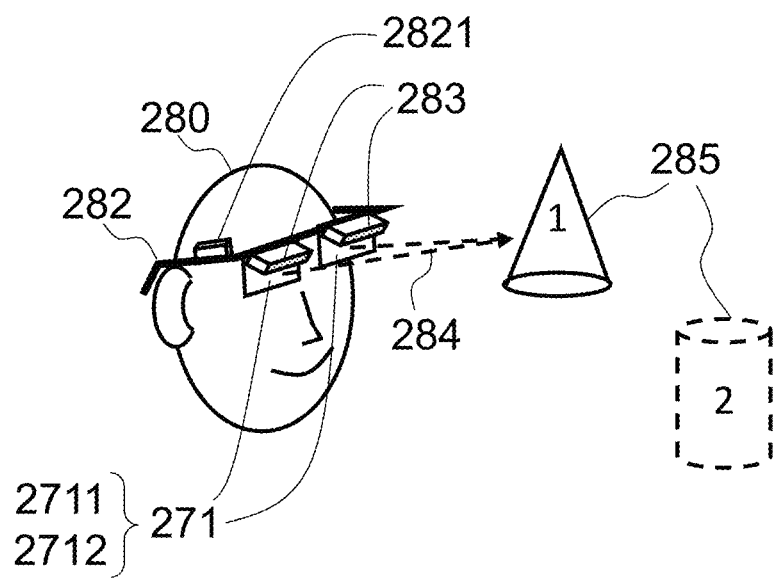
FIG. 28 is a schematic illustrating application of invention in pictures by image projector.

FIG. 28 is a schematic diagram illustrating the application of the invention in static and motion pictures with image projector 283. Images 285 are displayed to the viewer by an image projector 283 that projects image directly into the viewer 280's eye, or by projecting or displaying an image onto a display in front of the viewer 280's eyes where the display is also supported by the supporting frame 282. The viewer 280 is mounted with a supporting frame 282 that may contain computing and data processing components 2821 as shown in FIG. 28. The processor 2821 can also be a separate component not on the frame 282, wherein there is data communication between the frame 282 and the processor 2821.

Supporting frame supports see-through components 271 which can be composed of any one or any combination of: (1) sensor 2711 that detects eye-lens focus depth, or together with eyeball position; (2) stereoscopic vision enabling device 2712, as well as the image projector 283.

The viewer 280 perception of the displayed images 285 through the stereoscopic vision device 2712 is 3D "object 1" and "object 2" at different distances from the viewer 280. When the viewer 280 pays attention to "object 1" and the re-focus intention is sensed by the eye sensor 2711 on "object 1", the processor 2821 process the eye sensor 2711 information and sends command to bring "object 1" into focused image for viewer 280. "Object 1" is brought into focus in the viewer 280's vision as represented by solid line, and "object 2" is defocused as represented by the dashed line. The viewer 280's sense of being focusing on "object 1" is from changing the displayed images by the image projector 283.

The image projector 283 can be a wearable display device that is disposed closed to viewer 280's eye and fixed to viewer 280's head, wherein the display device has an internal image display screen and the viewer 280 sees the display screen through an optical path that makes the effective optical distance of the image 285 shown on the display appear at a distance that viewer can comfortably see clearly.

The image projector 283 can also be composed of a device producing a scanning light beam that projects directly into the viewer 280's eye pupil, wherein the scanning light beam projecting directly into viewer's eye forms one or multiple scanning light spots on the viewer 280's eye retina, where the fast 2D scan of the light beam spot on retina forms perceived image by the viewer.

The image projector 283 can also be composed of a device having an MEMS actuated mirror array reflecting one or more light sources, or an MEMS actuated light source array, which projects light beams directly into viewer 280's eye and forms a 2D image directly on the retina of the viewer 280's eye.

An optical imaging system 18912 with a variable effective focus depth can be disposed as a part of the components 271 that the viewer's eyes see through, wherein the effective focus depth of the system is automatically adjusted to the viewer's eye-lens focus depth change in real time, such that the image shown focused by image projector 283 always appear focused on the retina of the viewer's eye at various viewer's eye-lens focus depth. Such optical image system can be any of: a single optical lens with mechanical positioning, a series or an array of optical lenses with mechanical positioning, a variable focus depth optical component that is composed of electrically-controlled refractive index material, an optical component whose effective optical path for light passing through can be changed by an electrical signal, and an optical component composed based on micro-electro-mechanical-system (MEMS) actuated lens, mirror or prism arrays.

Same re-focus function can also be achieved without the stereoscopic vision, where "objects 1" and "object 2" appear as flat picture instead of 3D objects in space, but can still be focused upon individually by the viewer 280. Position, orientation and movement of viewer's head can also be used as input parameter when updating the images displayed to the viewer 280.

If same part appears in later figures and schematics of this current invention without further definition or description, it has the same function and definition as described above in FIG. 27 and FIG. 28.

Figure 29:
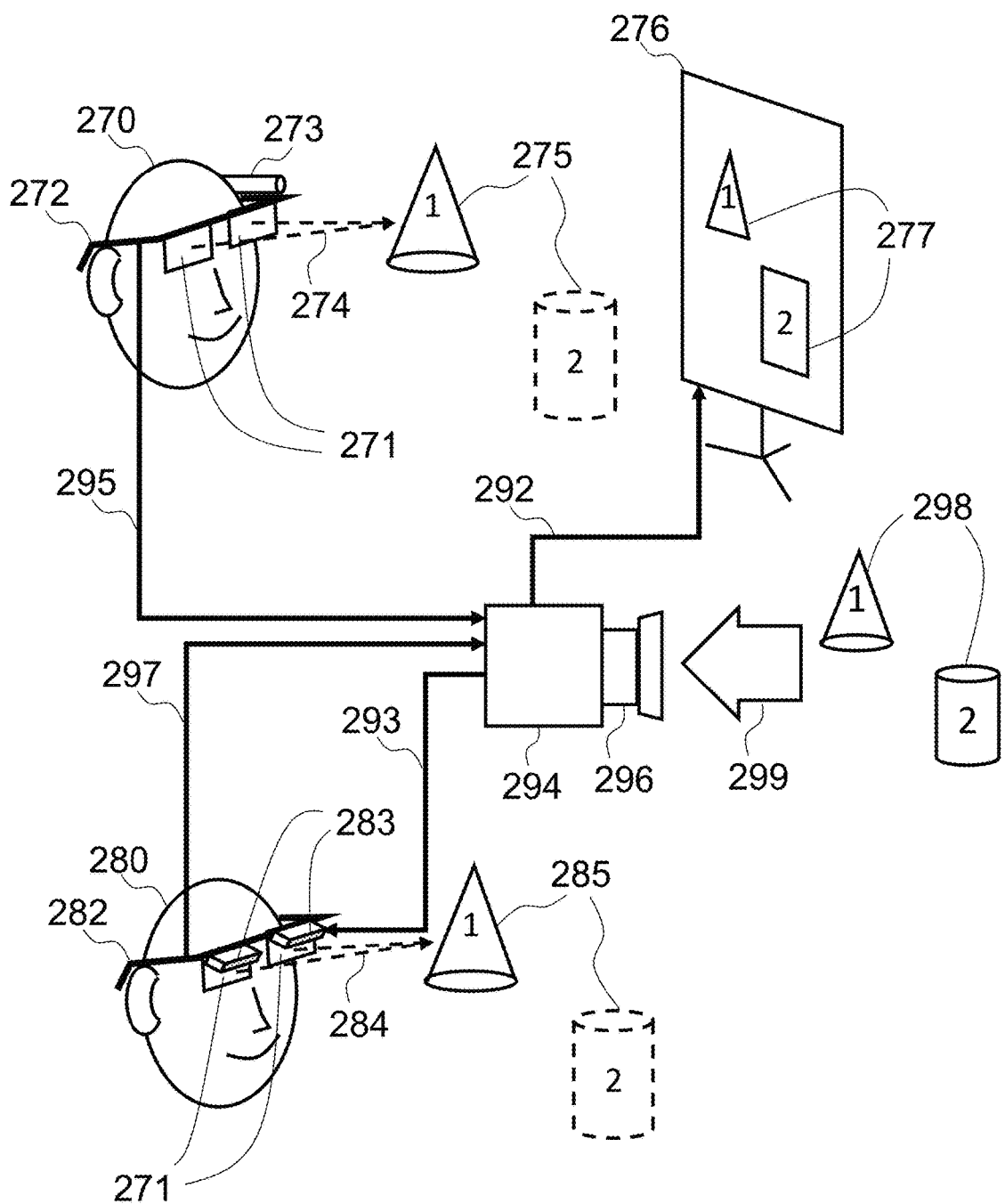
FIG. 29 is a schematic illustrating application of invention for enhanced vision.

FIG. 29 is a schematic diagram illustrating the application of the current invention for enhanced vision. The application in FIG. 29 is substantially similar as the application as illustrated in FIG. 27 and FIG. 28 except the following: (1) Images displayed to the viewer are transmitted from an image or video recording device 294 that records from a live scene of actual objects 298; (2) Viewer's sense of being focusing on "object 1" is achieved by sending a command to the focus depth adjustment component 296 of the recording device 294 to change the actual focus depth of the recording device 294 so that the "object 1" in actual scene is recorded in-focus as in 299; (3) The image of the live scene of objects 298 is recorded by the recording device 294 with correct focus depth reflecting the desired focus depth of the viewer 270 or viewer 280, and said recorded image is then sent to be displayed to the viewer 270 on the display screen 276 as in 292 or sent to be displayed to the viewer 280 by the image projector 283 as in 293; (4) If the focus of 296 is not in the desired focus-depth of the viewer, a feedback of desired focus depth is sent back from the frame 272 or frame 282 to the recording device 294 as in 295 and 297, to further adjust 296 focus depth to reach desired focus depth; (5) The achievable focus depth of the focus depth adjustment component 296 can be different than human eye, thus an enhanced vision can be realized by enabling viewer 270 or viewer 280 with the ability to have enhanced focus depth capability, and preferably together with enhanced zoom range at the same time, of live objects 298; and (6) Position, orientation and movement of viewer 270 or viewer 280 head can also be used as input parameter when updating the images displayed to the viewer 270 or viewer 280.

Figure 30:
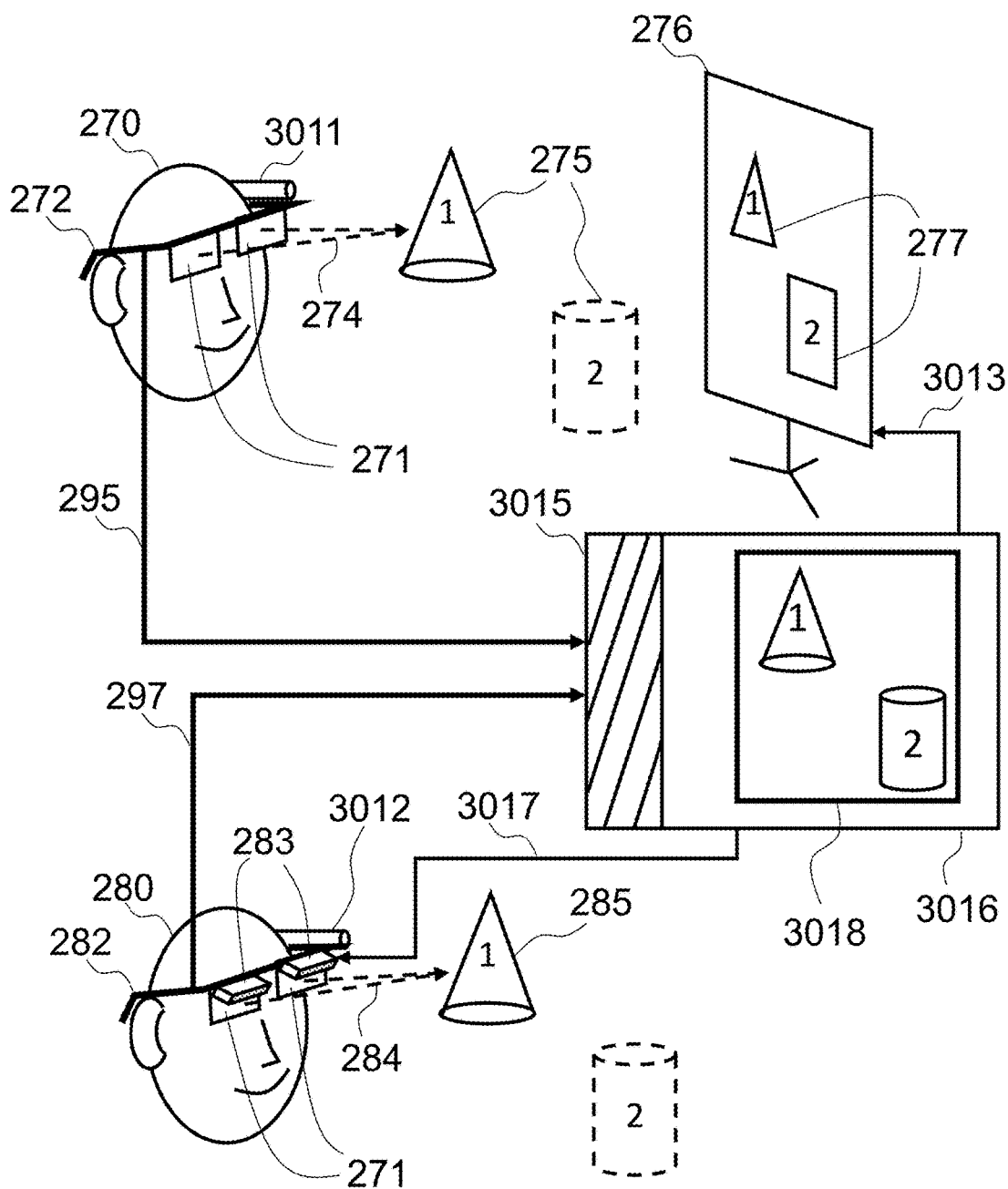
FIG. 30 is a schematic illustrating application of invention for artificial reality.

FIG. 30 is a schematic diagram illustrating the application of the current invention for artificial reality. The application in FIG. 30 is substantially similar as the application illustrated in FIG. 29 except the following: (1) Images displayed to the viewer are generated by an image generation device 3016; (2) Viewer's sense of being focusing on object 1 is from sending a command to change the focus depth adjustment parameter 3015 of the image generation device 3016 to change the focus depth of the generated image 3018, so that the "object 1" in generated image 3018 is in focus; (3) Generated image 3018 with desired focus depth is then sent to be displayed to the viewer 270 on display screen 276 as in 3013 or sent to be displayed to the viewer 280 by image projector 283 as in 3017; (4) The image scene 3018 and objects do not actually exist in reality, but rather are computer generated artificial objects, such that the viewer 270 or viewer 280 is viewing an image scene 3018 that is artificial. With the artificial scene 3018, re-focusable capability and 3D vision, the viewer 270 or viewer 280 can have an artificial reality experience; (5) If the focus of 3018 is not in the desired focus-depth of the viewer 270 or viewer 280, a feedback of desired focus depth is sent back from the frame 272 or frame 282 to the image generation device as in 295 and 297, to further adjust the focus depth adjustment parameter 3015 to reach desired focus depth of generated image 3018; (6) Interaction between the viewer and the artificial objects can be realized by establishing one or more of other input methods into the image generation device 3016, whereas example inputs from viewer 270 or viewer 280 are: (a) eye movement; (b) eye lips movement; (c) body gesture; (d) body movement; € force exerted by viewer 270 or viewer 280 to an external controller device; (f) vocal, optical and electrical signals initiated by the viewer 270 or viewer 280, to achieve human-machine interaction, whereas camera(s) 3011 and 3012 attached to the supporting frame can be used as the gesture and movement capturing device.

As an example of human-machine interaction: when viewer 270 or viewer 280 focuses on "object 1" and "object 1" becomes focused in the view, the viewer can do a gesture to try to rotate "object 1" in space. The gesture is then captured by camera(s) 3011 and 3012 and sent as an input signal into the image generation device 3016. The image generation device 3016 then generates new images where the "object 1" being rotated from original orientation to new orientations following viewer 270 or viewer 280 gesture. To the viewer 270 or viewer 280, the "object 1" appears to be rotating in space according to the viewer 270 or viewer 280 rotating gesture. During this process, "object 2" position and orientation stays unchanged in the image and to the viewer's perception, since it is not focused upon. Position, orientation and movement of viewer's head can also be used as input parameter to device 3016 during the human-machine interaction.

Figure 31A:
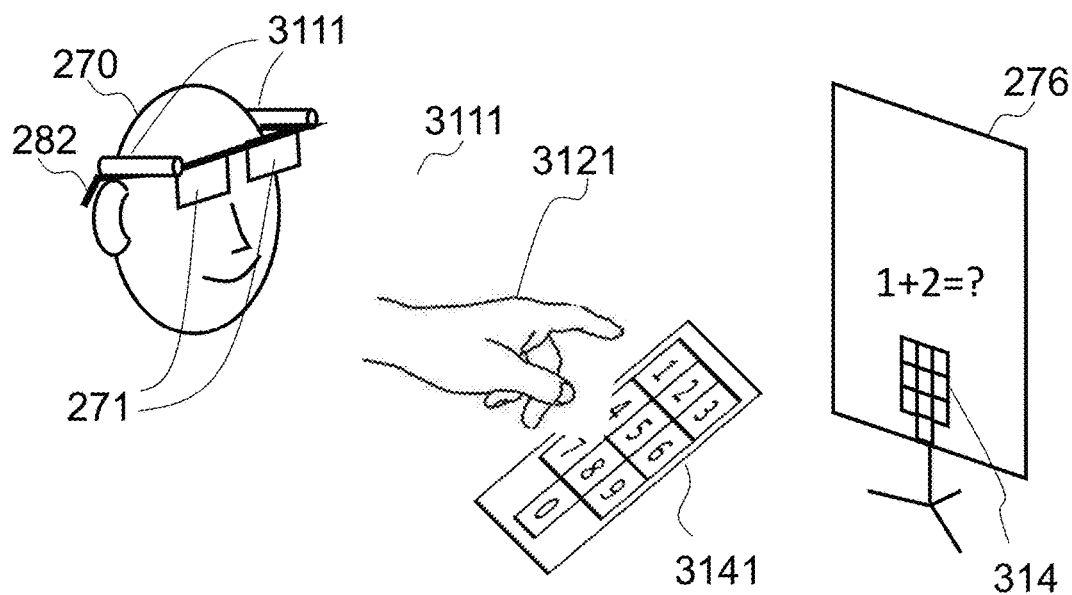
FIG. 31A and FIG. 31B are schematics illustrating the application of the invention for augmented reality with artificial object augmenting interaction with real objects.
Figure 31B:
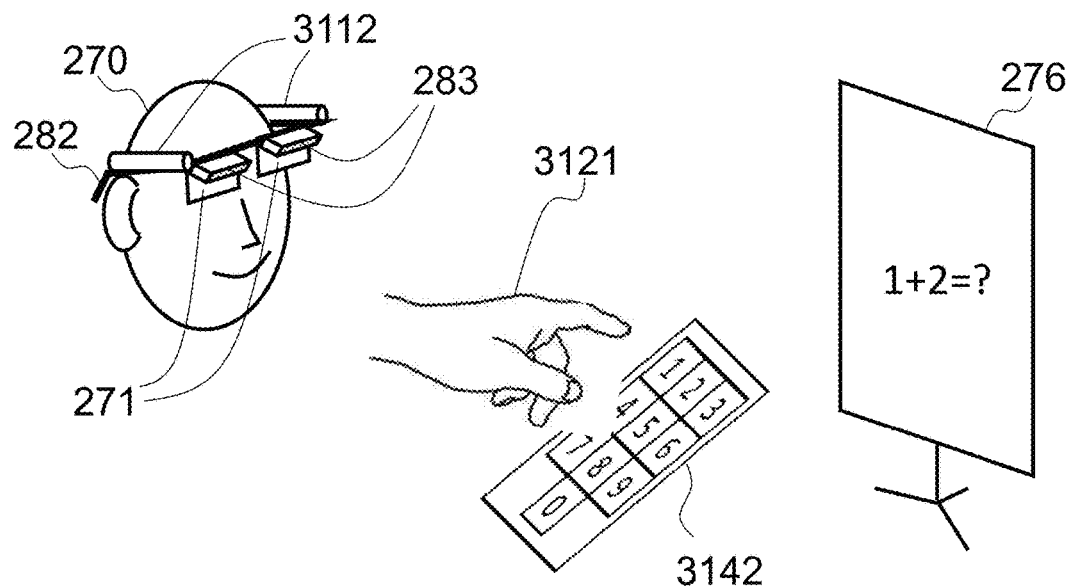

FIG. 31A and FIG. 31B are schematic diagrams illustrating the application of the current invention for augmented reality with artificial objects augmenting viewer interaction with real objects. The application in FIG. 31A and FIG. 31B is substantially similar as the application illustrated in FIG. 27 and FIG. 28 except the following: (1) Viewer 270 is viewing real object(s) (not shown in FIG. 31A or FIG. 31B) or objects on real display 276; (2) Imaginary objects 3141 and 3142, which are key pads in FIG. 31A and FIG. 31B, appear to the viewer 270 at spatial positions different than real object(s) or objects on real display 276, where: (a) The imaginary object 3141 can be produced by projecting a 3D image 314 on a common display where the real objects are displayed (FIG. 31A); (b) The imaginary object 3142 can be produced by the projectors 283 on the supporting frame 282 to the viewer 270 (FIG. 31B); (3) The imaginary objects 3141 and 3142 can appear as 3D objects to viewer 270 by the stereoscopic vision enabling devices on the see-through components 271; (4) Viewer 270 can re-focus on different imaginary objects 3141 and 3142 and interact with the objects 3141 and 3142 with body gestures, for example "touching" the objects 3141 and 3142, and induce a visual or physical response from the real object(s) or objects on real display 276 in view, where: (a) Camera(s) 3111 and 3112 on the supporting frame 282 can be used to capture the body gesture of the viewer 270 and measure the position of the body part 3121 relative to the intended position of the imaginary objects 3141 and 3142 to the viewer 270; (b) With body part position matching position of the imaginary objects 3141 and 3142, and with recognizing viewer's body gesture, a command can be generated from the gesture and a response can be made from the real objects or objects on real display 276.

As an example, in the FIG. 31A and FIG. 31B, when the viewer 270 touches the imaginary keypads 3141 and 3142 number 3 in viewing space by finger 3121 at the spatial position where the number "3" buttons appear to be to the viewer 270, the display 276 will show "1+2=3". When viewer steers away eyes from keypad 3141 and 3142, re-focuses and looks at display at a further distance, the keypads 3141 and 3142 can appear as blurred, similar to a real key-pad in same spatial position would appear to the viewer 270, or keypads 3141 and 3142 can also just disappear from the view of viewer 270. Position, orientation and movement of viewer's head can also be used as input parameter during interaction of viewer 270 with the imaginary objects 3141 and 3142.

Figure 32:
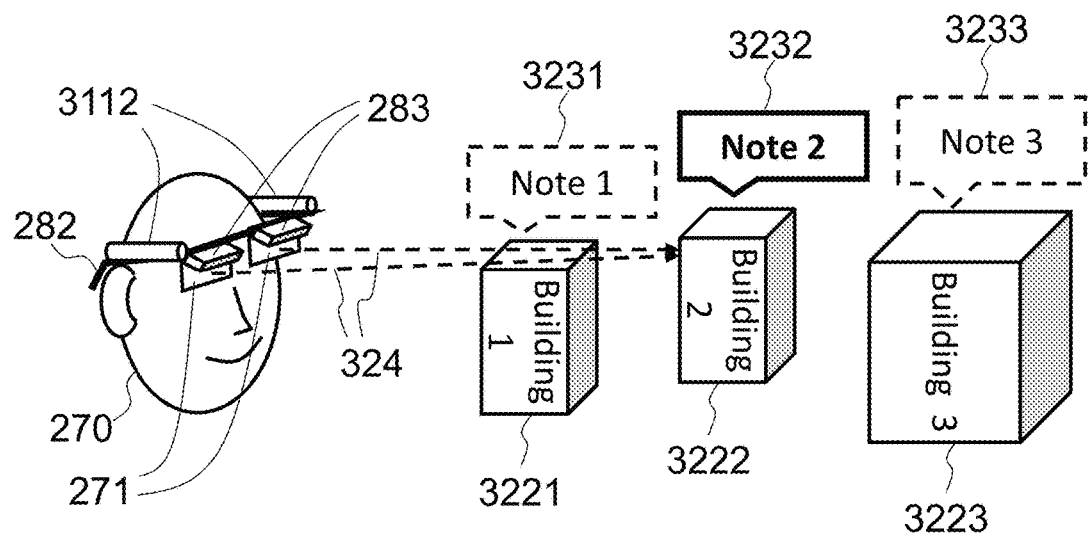
FIG. 32 is a schematic illustrating the application of the invention for augmented reality with artificial object augmenting real objects.

FIG. 32 is a schematic diagram illustrating the application of the current invention for augmented reality with artificial object augmenting real objects. The application in FIG. 32 is substantially similar as the application as illustrated in FIG. 31B except the following: (1) Imaginary objects 3231, 3232 and 3233 are displayed to the viewer 270 at different spatial positions to the viewer 270, where imaginary objects can be any of: (a) The imaginary objects 3231, 3232 and 3233 are produced by the projectors 283 on the supporting frame 282 that project image to the viewer 270; (b) The imaginary objects 3231, 3232 and 3233 can appear as 3D objects to viewer 270 by the stereoscopic vision enabling devices on see-through components 271; (c) Imaginary objects 3231, 3232 and 3233 as perceived by viewer 270 are at spatial positions that associated with, and in close proximity to, various real objects 3221, 3222 and 3223; (2) Viewer 270 can re-focus on different real objects 3221, 3222 and 3223, wherein one of the corresponding imaginary objects 3231, 3232 and 3233 associated with each of real objects 3221, 3222 and 3223 will also appear to be in-focus to viewer 270 when the associated real object is in-focus; (3) When a real object is in focus to the viewer 270, the viewer's focus point is compared to the physical distance and position of the real objects 3221, 3222 and 3223 to the viewer 270. The real object 3221, 3222 or 3223 in focus to viewer 270 will be identified as being at correct position and distance that matches the viewer 270's intended focus depth and focus point along the eye-sight 324 direction. Then an imaginary object 3232 associated to that real object 3222 being in-focus is also brought into focus in viewer 270's view and at position in proximity to the real object 3222. (4) Viewer 270 can interact with the imaginary objects associated with the real objects with any or any combination of: (a) body gestures; (b) vocal, electrical, or optical signals, for example viewer 270 "pointing to" the imaginary object 3232 in-focus or speaking out a vocal command, wherein the said signals are acquired by a signal processor in the supporting frame 282 or a signal processor separated from the supporting frame, and the said signals are interpreted to produce a visual change of the imaginary object 3232 in view. Camera(s) on the supporting frame 282 can be used to capture the body gesture of the viewer 270 and measure the position of the body part relative to the imaginary object 3232 in-focus or the viewer 270's eye-sight 324 direction. With body part position matching the imaginary object 3232 in focus or the viewer 270's eye-sight 324 direction, a command can be generated from the body gesture and a response can be produced by the imaginary objects. Position, orientation and movement of viewer 270's head can also be used as input parameter when updating the images displayed to the viewer 270.

For example, in FIG. 32, when the viewer 270 focuses on Building 2 of 3222, the imaginary box 3232 of "Note 2" appears and in focus to the viewer 270 with physical position appear to viewer 270 to be on top on the "Building 2" of 3222. "Note 2" 3232 can contain information about the "Building 2" 3222. "Note 1" 3231 on "Building 1" 3221 and "Note 3" 3233 on "Building 3" 3223 can appear blurred or entirely invisible to the viewer 270. When viewer 270 uses a finger to point to the "Note 2" 3232 direction, the cameras 3211 and 3212 on supporting frame 282 captures viewer 270's hand direction and matches to "Note 2" 3232 direction and makes a change of "Note 2" 3232 appearance as a response to the gesture.

In this application, the objects 3221, 3222 and 3223 in the actual view that the viewer 270 is seeing will form projection image on the retina of the viewer 270's eye. The object 3222 having the clearest projection image or clearer than other objects 3221 and 3223 can also be used to retrieve the information of the focus depth of the lens, and focusing point of the viewer 270's sight. For example, "Building 2" 3222 shows clearest image on viewer 270's retina. By identifying this object 3222 from the image on the retina and comparing to the image that the camera(s) 3211 and 3212 capture of the scene that viewer 270 is viewing, the eye-lens focus depth and location of focusing point in the view of viewer 270's eye can be obtained.

Figure 33:
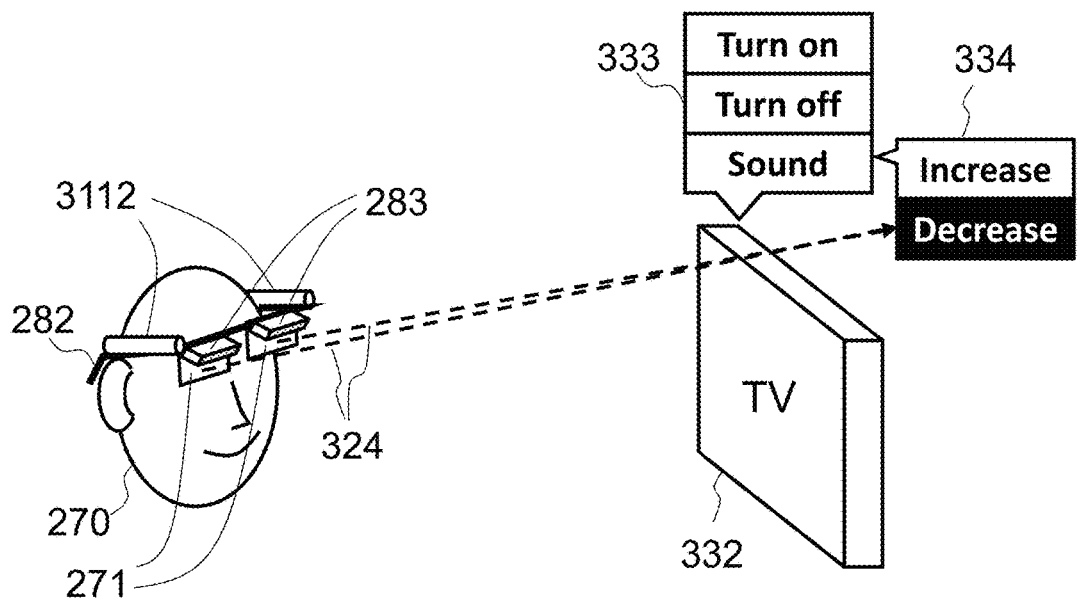
FIG. 33 is a schematic illustrating the application of the invention for augmented reality with artificial object augmenting viewer's interaction with real objects.

FIG. 33 is a schematic diagram illustrating the application of the invention for augmented reality with using artificial object to control real objects with using viewer's eye or body gestures to interact with the real object. The application in FIG. 33 is substantially similar as the application as illustrated in FIG. 32 except the following: (1) Viewer 270 interacts the real object 332, a TV, in FIG. 33, to cause an actual response or action of the real object 332; (2) Viewer 270 interaction with the real object 332 is through the imaginary objects 333 and 334 that appear and in-focus in viewer's vision when viewer 270 focuses on real object 332; (3) Interaction initiated by the viewer 270 is in-part by viewer 270 eye gesture, or in some embodiments together with other body gestures of viewer 270. Such eye gestures can be any one or any combination of: (a) time of stare by viewer 270 on the imaginary objects 333 and 334; (b) movement of viewer 270 eyeball; (c) opening and closing of eye lips of viewer 270 and its frequency; (d) change of eye lips open width; and (e) eye-sight 324 focus point shift in space; (4) Said eye gestures can produce a change of the imaginary objects 333 and 334 appearance which leads to a physical response or action of the real object 332 that is associated with the imaginary objects 333 and 334, wherein such response of the real object 332 can be accomplished by communications through signals of any or any combination of: electrical signal, optical signal, acoustic signal and radio signal, between a signal processor 2721 (not shown in FIG. 33), which processes the viewer's eye information, and in some embodiments, other input signals from viewer 270 body gestures or vocal commands, and the real object 332. Said communication between the processor 2721 and the real object 332 can also be achieved through a wireless data network or a wireless data link.

As an example of this application, when the viewer 270 of FIG. 33 focuses on the television 332 and with long enough time staring at the television 332, or by other enabled eye or body gestures, or by vocal signals, an imaginary menu 333 can appear to viewer 270 in proximity to the television 332 and lists items that are related to the operation of the television 332. When viewer 270's eye-sight 324 focus point shifts along the different items of the menu 333, different items can be highlighted in viewer 270's view. Similarly, a sub-menu 334 associated with certain menu 333 item, for example "increase/decrease" sub-menu of "Sound" item as in FIG. 33, can appear. With viewer's eye sight 324 focus point stays on a given menu item without further shifting for more than a certain amount of time, or with a subsequent eye gesture initiated by the viewer, for example a closing and then opening of the eye lips, or by other enabled eye or body gestures, or by vocal signals, a choice of the given menu item where the viewer's eye sight focuses upon is made. Such choice is then processed by the processor 2721 and communicated to the television 332 through a data network or a data link and an action is made to TV 332, for example a decrease of "Sound" volume of TV 332 as in FIG. 33.

Figure 34:
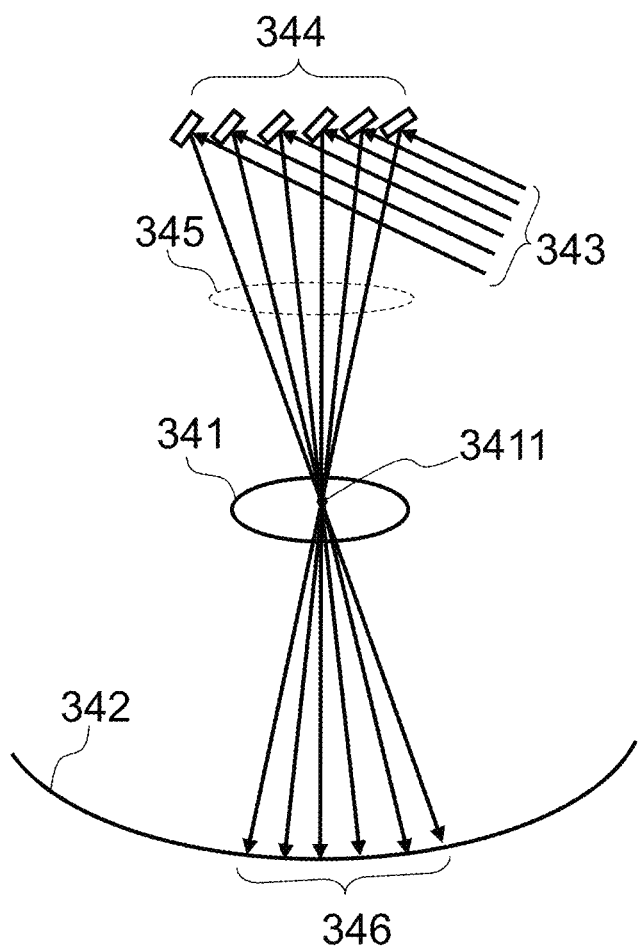
FIG. 34 is a schematic illustrating a MEMS-based micro-mirror array used for direct projection of image on the retina of viewer's eye.

FIG. 34 is a schematic diagram illustrating a MEMS actuated micro-mirror array used for direct projection of image on the retina of viewer's eye. A collimated beam of projection light 343 with high directionality is projected upon a mirror array 344. The mirror array 344 can be in the form of mirrors in a one-dimensional array that also scans in the direction normal to the array formation, or a two-dimensional matrix. Each mirror in the mirror array is actuated by a MEMS based mechanism. The projection light 343 can be produced by a light source of any of, but not limited to: light emitting diode ("LED"), laser diode, solid or gas based laser, fluorescent lamp, and halogen lamp. Each mirror in the mirror array 344 is tilted at certain angle to reflect the projection light 343 into the pupil of the viewer's eye and through the eye-lens 341. With adjusting the angle of tilting of each mirror in the mirror array 344, each light beam of the reflected light 345 from each mirror can be arranged to pass through the eye-lens 341 at the eye-lens optical center point 3411, which is a preferred scheme of this method. In such scheme, the reflected light 345 beams effectively concentrate on the optical center point 3411. With reflected light 345 passing through the optical center point 3411, the refraction by eye-lens of the reflected light 345 is minimal and reflected light 345 enters the eye in the form of a straight light beam with minimal distortion. When reflected light 345 from each mirror reaches the retina 342 of the viewer's eye, a light spot is created, which is then regarded as a pixel 346 projected by the corresponding mirror of mirror array 344 of the projection light 343. During operation, each mirror of the mirror array 344 produces a different pixel 346 on the retina. With all pixels combined, an image can be effectively created on the retina by the mirror array.

Compared to prior arts, which uses single 2-D scanning mirror to project laser beam onto retina to produce image, this new method as shown in FIG. 34 with using mirror array relieves the concern of permanent retina damage in the case of a malfunction. In prior arts using single mirror scanning method, since a single light beam power is effectively spread into a larger area on the retina during scan to produce image, area light power density on the retina can be small enough to not cause any damage to the retina. During malfunction, if the mirror stops moving and all light power is then focused on a single spot on the retina, retina damage is then very likely. In fact, this possibility of retina or eye damage is one limiting factor of the prior arts adoption into commercial use For the method as in FIG. 34, incoming projection light 343 intensity is already spread through all mirrors of the mirror array 344, with each mirror only producing a light spot or pixel 346 on the retina 342 with a small portion of the total light power of the projection light 343. During malfunction, even if the mirrors stop moving, the light pixels 346 on the retina 342 stays spread out and thus damage by the focused light energy as in prior art with single 2-D scanning mirror can be avoided. Mirrors of 344 can reflect incoming light 343 to project upon retina 346 in sequential order, thus only one or a few mirrors reflect light beam passing through eye-lens 341 and projecting upon 346 at any given instant time, thus further reducing risk of eye damage.

A second advantage of the method of FIG. 34 is the speed of image refreshing is much faster than in prior art of single 2-D scanning mirror. In prior art of single 2-D scanning mirror, an image is refreshed at the max speed of the single scanning light beam finishes scanning of the whole image. While in the new method of FIG. 34, the image is refreshed at the max speed of changing the angle of a single mirror, whereas all mirrors of the mirror array 344 can be updated of their angular positions in a single step, which is much faster than scanning a single 2-D mirror to produce an entire image.

A third advantage of the new method is the ability to achieve wider-viewing angle and higher resolution than prior art. The mirror array 344 can be formed on a curved substrate such that high angle reflection of the incoming projection light 343 by edge mirrors of mirror array 344 can be achieved, and produce wide-viewing-angle image on the retina 342. For prior art, largest viewing angle is limited by the MEMS mechanism and the maximum tilting angle of the mirror. Since the light beam of the projection light 343 is only required to be a wide and collimated light, and the mirror size of the mirror array 344 determines the reflected beam size and eventually the pixel 346 size on retina 342, with advanced lithography and manufacturing techniques, the mirror size and pixel 346 size can reach micron-level or smaller, approaching or exceeding the detection resolution of the retina of a human eye. For prior art single mirror scanning method, due to safety concern as well as scanning speed and laser system limitations, micron-size light beam is not applicable to achieve the function of direct projection imaging.

The method as in FIG. 34 can have any one or any combination of below features: (1) The driving mechanism of the mirrors in the mirror array 344 can be any of: MEMS, magnetic force, piezoelectric effect, electrostatic force, capacitive force, or thermally induced shape change; (2) The reflected light 345 beams effective concentration point can be any of: eye-lens optical center 3411, between eye-lens optical center 3411 and cornea, in front of cornea and outside the eye, inside the eye and at position between the eye-lens optical center 3411 and retina 346, wherein the concentration point can be either a focus point of light beam 345 or a point of smallest light beam 345 size; (3) The projection light 343 can be alternating between various wavelength, wherein at each different wavelength, the mirrors of the mirror array 344 change to a different set of angle positions, such that image projected on retina is perceived as a color image by viewer; (4) There can be multiple projection light 343 sources projecting on the mirror array 344, with each projection light 343 source having a different light wavelength, or different color. The mirror array 344 can have multiple subsets of mirrors with each subset of mirrors reflecting each of the multiple light 343 sources and produces multiple images of different colors overlapping on the retina to form a colored image. The mirrors of mirror array 344 can be readily replaced with optical prisms to achieve sample reflection function without limitation.

Mirrors of mirror array 344 can be projecting pixels 346 on the retina 342 with different timing instead of projecting all pixels simultaneously, so that high local light intensity of the effective focus point of the reflected light 345 can be reduced to avoid damage to eye tissue.

Figure 35:
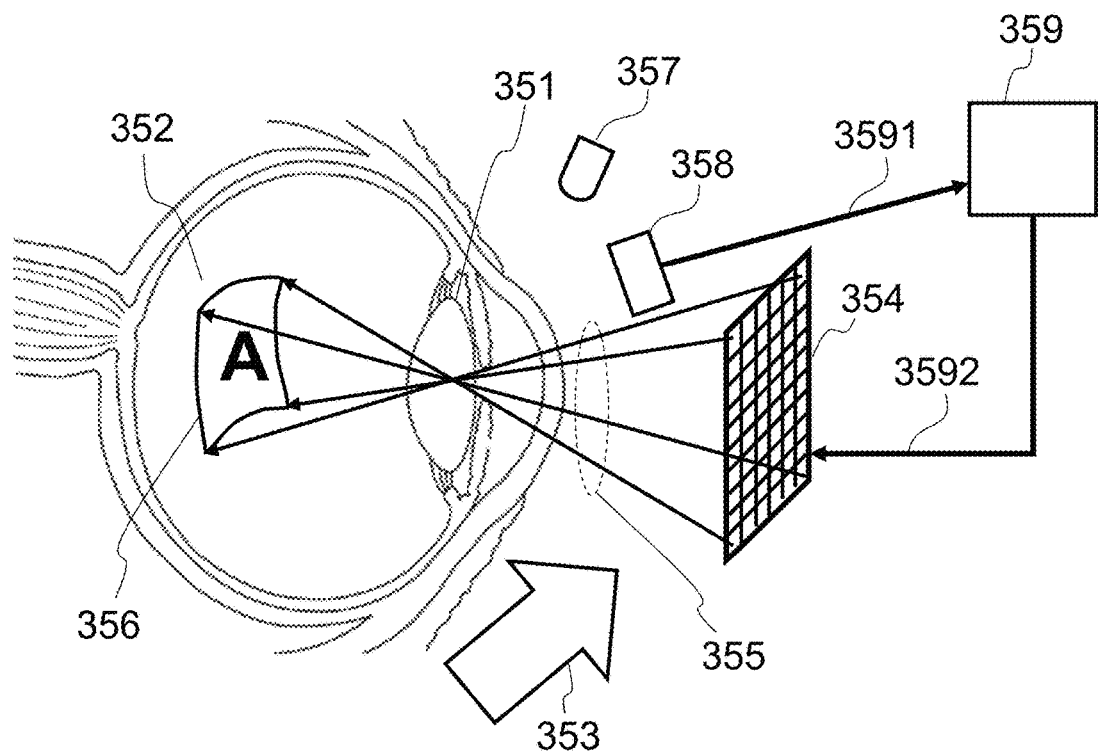
FIG. 35 is a schematic illustrating the MEMS-based micro-mirror array of FIG. 34 being implemented with input from viewer's eye information to accommodate the viewer's eye-lens change and project image in focus on retina at varying eye-lens focus depth, with reflected light converging towards an area inside the eye-lens.

FIG. 35 is a schematic diagram illustrating the micro-mirror array of FIG. 34 being implemented with input from viewer's eye information to accommodate the viewer's eye-lens change and project image in focus on retina at varying eye-lens focus depth. Similar as described in FIG. 34, a two-dimensional mirror array 354 reflects projection light 353 by each mirror of the mirror array 354. Reflected light 355 passes through the eye-lens and produces a projected image 356 on the retina 352.

All specifications and descriptions of the mirror array 354, eye-lens 351, retina 352, reflected light 355, projection light 353, and projected image 356 are similar as the mirror array 344, eye-lens 341, retina 342, reflected light 345, projection light 343, and projected image 346 in FIG. 34.

However, FIG. 35 shows additional components including optical emitter 357 and optical detector 358, which are used to detect the eye-lens change and pupil position change as described in FIG. 12A through FIG. 12H. The optical signal containing eye-information change regarding eye-lens and pupil is sent to a computing device 359 as shown by 3591. The computing device 359 calculates the desired focus depth from the sensed eye-information and produced updated version of the image 356 to be projected on retina 352, which reflects the desired focus depth of the viewer. The updated image is sent from computer device 359 to the mirror array 354 controller as shown by 3592. The mirror array 354 then changes accordingly to project updated image with any change of: image shape, size, form, color, contrast, brightness or other optical properties to produce an effective change of viewer's perception that follows the focus depth change of the eye-lens of the viewer's eye.

For example, when viewer tries to see clearly of an originally de-focused first object of many objects in the projected image 356 and changes the eye-lens to try to focus on the first object, the mirror array changes accordingly such that the first object appears clearly focused in the projected image 356 with a final form that reflects intended perceived spatial position of said first object having a focused image, to give the viewer a sense of 3D space and ability of focusing on the objects into the 3D space.

Figure 36A:
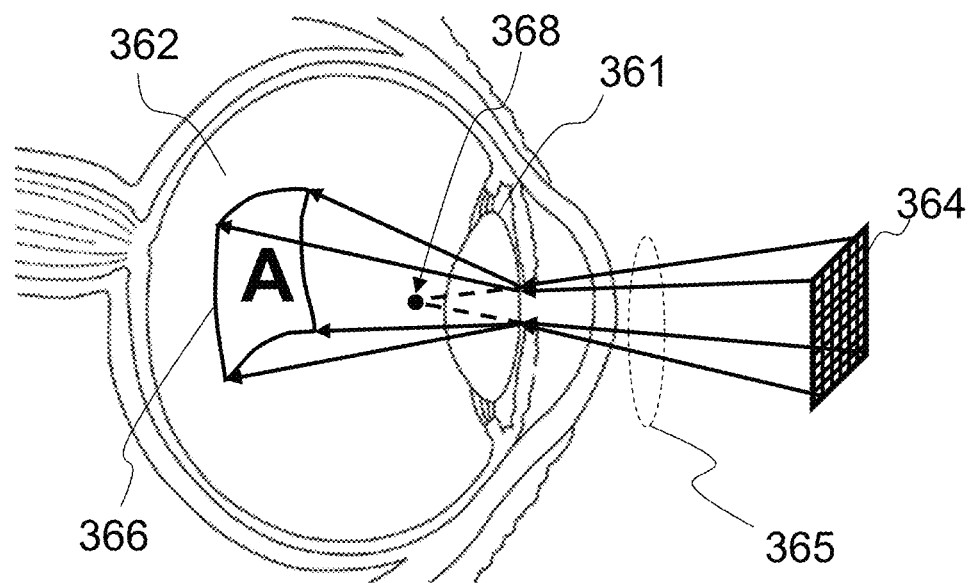
FIG. 36A is a schematic illustrating the MEMS-based micro-mirror array being implemented with reflected light converging towards an area behind the eye-lens before entering the pupil of the eye.
Figure 36B:
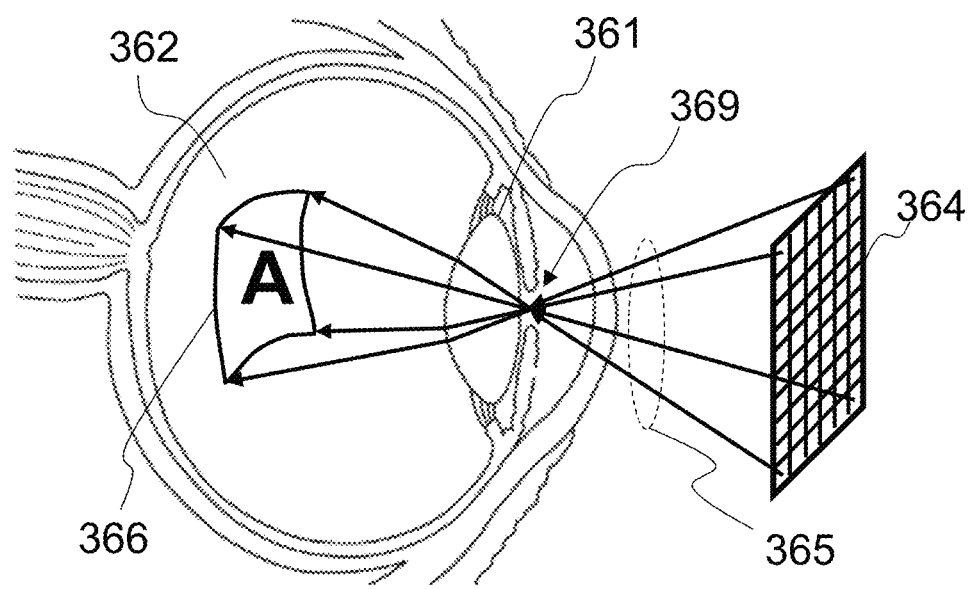
FIG. 36B is a schematic illustrating the MEMS-based micro-mirror array being implemented with reflected light converging towards an area in front of the eye-lens before entering the pupil of the eye.

FIG. 36A and FIG. 36B then show alternative possible image projection light paths than the light path produced by the mirror array 354 as shown in FIG. 35. All specifications and descriptions of the mirror array 364, eye-lens 361, retina 362, reflected light 365, and projected image 366 are similar as the mirror array 354, eye-lens 351, retina 352, reflected light 355, and projected image 356 in FIG. 35. In FIG. 36A, the reflected light 365 converges towards an area or a point 368 behind the eye-lens 361 within the eye before entering the eye-lens 361. Then reflected light 365 of FIG. 36A is diffracted by the eye-lens 361 and produces image 366 upon the retina 362. In FIG. 36B, another light path is shown where the reflected light 365 is converged towards an area or a point 369 in front of eye-lens 361, where 369 is preferred to be in close proximity to the opening the pupil of the eye, before entering the eye-lens 361. Then reflected light 365 of FIG. 36B is diffracted by the eye-lens 361 and produces image 366 upon the retina 362. The different light paths of FIG. 36A and FIG. 36B from FIG. 35 are achievable by adjusting mirror array 364 mirror angle arrangement and distance of mirror array 364 from eye-lens 361.

The mirror arrays 344, 354 and 364 as shown in FIG. 34, FIG. 35, FIG. 36A and FIG. 36B reflect incoming light 343 and 353, which is preferred to have high directionality, to produce projected images on the retina of the eye. Alternatively, an array of light emitting devices that can produce and project high directionality light beams directly from different angles into the eye can also achieve the same direct retina image projection without the need of an incoming light beams 343 or 353 as in FIG. 34 and FIG. 35.

Figure 37A:
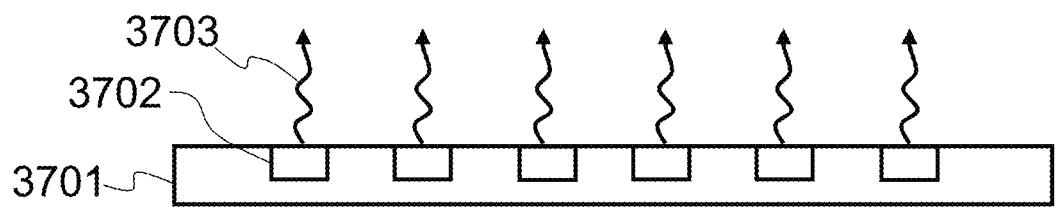
FIG. 37A is a schematic illustrating a substrate with embedded array of light emitting devices for the purpose of projecting image on the retina of the eye.

FIG. 37A shows a first example of a substrate 3701 supporting light emitting devices 3702 in the form an array, for the purpose of replacing the mirror array 344, 354, 364 as in FIG. 34-FIG. 36B by directly producing an array of high directionality light beams to project image on the retina of the viewer's eye. The substrate 3701 with the light emitting devices 3702 shall replace the incoming light 343, 353 and mirror arrays 344, 354 as in FIG. 34 and FIG. 35. In FIG. 37A, an array of light emitting devices 3702 are disposed upon the substrate 3701. Each of the device 3702 is producing a light beam 3703. For the purpose of direct image projection on the retina of the eye, the light beam 3703 is preferred to be sufficiently directional, such that each of the light beam 3703 from a given light emitting device 3702 produces a specific light spot upon the retina of the eye which constitute a pixel of the image that is to be projected upon the retina. The light emitting devices 3702 can by any of, but not limited to, light emitting diodes (LED), organic light emitting diode (OLED), and laser diode. The light emitting devices 3702 may have certain built-in optical cavity structure that is manufactured together with the light emitting device 3702, especially when 3702 is an LED or OLED device, to help promote selected optical modes of the light beam 3703 emitted from the device 3702, such that the emitted light beam 3703 is highly directional.

Figure 37B:
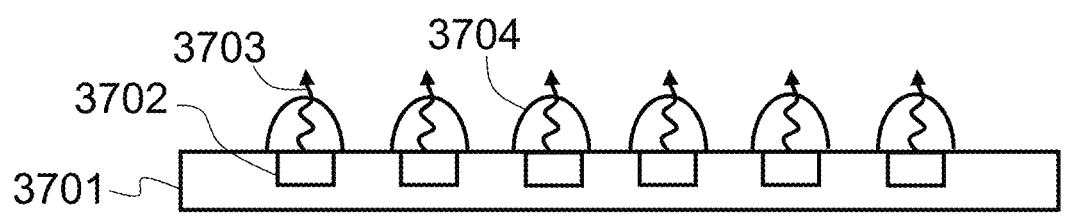
FIG. 37B is a schematic illustrating the substrate of FIG. 37A with embedded array of light emitting devices having a first type of light beam shaping components.
Figure 37C:
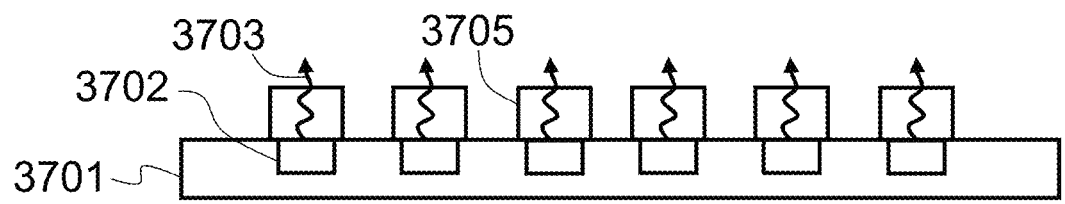
FIG. 37C is a schematic illustrating the substrate of FIG. 37A with embedded array of light emitting devices having a second type of light beam shaping components.

For typical LED or OLED device 3702, due to the light beam 3703 being mostly diverging when directly coming out of the LED or OLED device 3702, light beam shaping components can be placed on the LED or OLED devices 3702. FIG. 37B shows an example of collimation lens 3704 that can be used to collimate and converge the light beam 3703 to achieve high directionality of the light beam 3703. FIG. 37C then shows an example of optical aperture 3705, for example an optical crystal, a section of optical waveguide or optical fiber, being disposed in immediate proximity to the LED or OLED 3702. The optical aperture has the function of selecting light beam 3703 components that is highly directional and allows the passage of such components towards the eye. The collimation lens function of 3704 in FIG. 37B and optical aperture function of 3705 may also be integrated into a single light beam shaping component. Lens 3704 and optical aperture 3705 are preferred to be manufactured and integrated with each LED or OLED device 3702 of the array on the substrate 3701 during a single manufacturing process.

The emitted light beam 3703 angle adjustment can be achieved by a surrounding or underlying mechanical angle adjustment mechanism attached to each individual light emitting device 3702. The angle adjustment mechanism is not shown in FIG. 37A-FIG. 37C, and such mechanism can be based on any of: MEMS, magnetic force, piezoelectric effect, electrostatic effect, capacitive effect, or thermally induced shape change.

The light beam 3703 angle adjustment from the light emitting devices 3702 can also be achieved by a global curvature change of a flexible substrate 3701 wherein the light emitting devices 3702 are disposed upon or embedded within the substrate 3701. In one embodiment, the substrate 3701 is a flexible substrate whose surface curvature can be changed upon an externally exerted force. In another embodiment, the substrate 3701 curvature can be change by electrically controlled mechanisms connected directly to, or embedded within, the substrate 3701, wherein such electrically controlled mechanism can be any of: MEMS, magnetic force, piezoelectric effect, electrostatic force, capacitive force, or thermally induced shape change. In one embodiment, the light emitting devices 3702 are OLED devices that can be manufactured on a flexible substrate. Light beam 3703 from each OLED 3702 device is preferred to be in the direction that is normal to the surface of the substrate 3701, such that when curvature of the substrate 3701 changes, light beam 3703 directions at various locations across the substrate 3701 maintain their normal directions to the substrate 3701 surface. The normal direction of the light beam 3703 to the flexible substrate surface 3701 can be further assisted or maintained by the light beam shaping components 3704 or 3705 as in FIG. 37B and FIG. 37C, which are disposed immediately adjacent to the OLED device 3702 on the flexible substrate 3701 and conform to the curvature of the substrate 3701.

Figure 38:
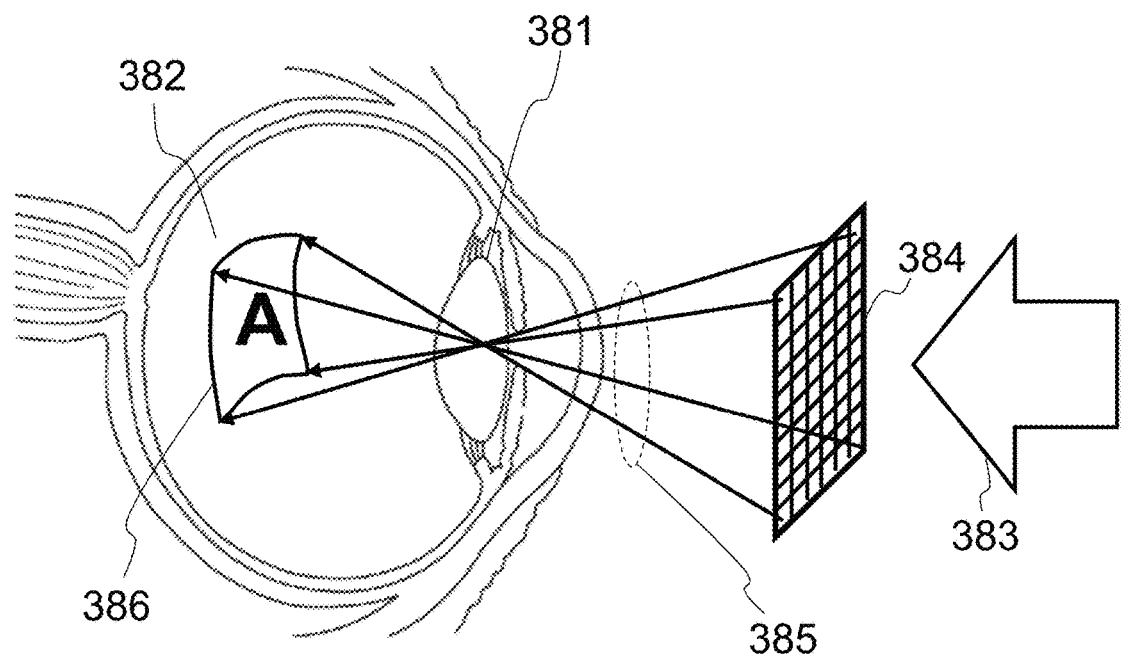
FIG. 38 is a schematic illustrating a substrate with embedded array of light passage components used to project image on retina with incoming light shining towards the eye.

Another alternative method to achieve the same direct retina image projection without the need of the mirror arrays 344, 354 and 364 as use in FIG. 34, FIG. 35, FIG. 36A and FIG. 36B is to use an array of light passage components, for example, an array of micro optical waveguides, or an array of optical fiber sections, or an array of micro optical lens, to create high directionality light beams to project image on the retina. In this new method, the incoming light beams 343 and 353 as in FIG. 34 and FIG. 35 will now be directed to shine through the array of the light passage devices towards the eye pupil, wherein the array of light passage devices allow the incoming light to pass or transmit through at the locations of the light passage devices. FIG. 38 shows an example of the alternative new method, where all specifications and descriptions eye-lens 381, retina 382, and projected image 386 are similar as eye-lens 351, 361, retina 352, 362, and projected image 356, 366 as in FIG. 35-FIG. 36B. Different than in FIG. 35-FIG. 36B, the mirror arrays 354, 364 of FIG. 35-FIG. 36B are replaced by an array of light passage components 384. The incoming light 383 is directed towards the eye-lens and the light beams that pass through the light passage component array 384, i.e. transmitted light 385, are directed in various directions such that an image 386 can be produced on the retina 382.

Figure 39A:
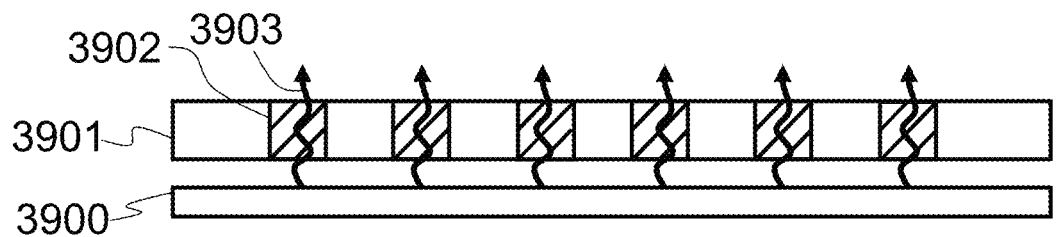
FIG. 39A is a schematic illustrating a substrate with embedded array of light passage components for the purpose of projecting image on the retina of the eye.

FIG. 39A shows a first example of a substrate 3901 supporting light passage components 3902 in the form an array, which constitutes the array 384 as in FIG. 38. Preferably, a light emitting device 3900 projecting light towards the substrate 3901 is in close proximity to the substrate 3901. Each of the light passage components 3902 has a light intake end that is exposed on one surface of the substrate 3901 facing the light emitted device 3900 to allow the light emitted from the device 3900 to enter the light passage components 3902. Each of the light passage components 3902 has a light output end exposed on the opposing surface of the substrate 3901 facing the pupil of the eye, where the light beams 3903 exiting the light passage components 3902 have high directionality to produce projected image on the retina of the eye. Substrate 3901 with the light passage components 3902, and the light emitting device 3900 shall replace the incoming light 343, 353 and mirror arrays 344, 354 as in FIG. 34 and FIG. 35.

For the purpose of direct image projection on the retina of the eye, the light beam 3903 is preferred to be sufficiently directional, such that each of the light beam 3903 coming out from a given light passage component 3902 produces a specific light spot upon the retina of the eye which constitutes a pixel of the image that is projected upon the retina. The light passage components 3902 can be any of, but not limited to, micro optical waveguides, optical fiber sections, or micro optical lens, to create high directionality light beams. The light emitting device 3900 can be composed any of, but not limited to, LED, OLED, laser diode, fluorescent lamp. The light produced by the light emitting device 3900 can be a directional light shining towards the substrate 3901, or an ambient light with low directionality which when passes through the light passage components 3902 obtains high directionality. The light passage components 3902 may have certain partial reflective coating at its light intake and output ends, such that the partial reflection between the two ends within the body of the light passage components 3902 forms an optical cavity that can help promote selected optical modes of the light beam 3903 to be emitted from the component 3902 towards the eye. One such promoted optical mode may make the emitted light beam 3903 being highly directional.

Figure 39B:
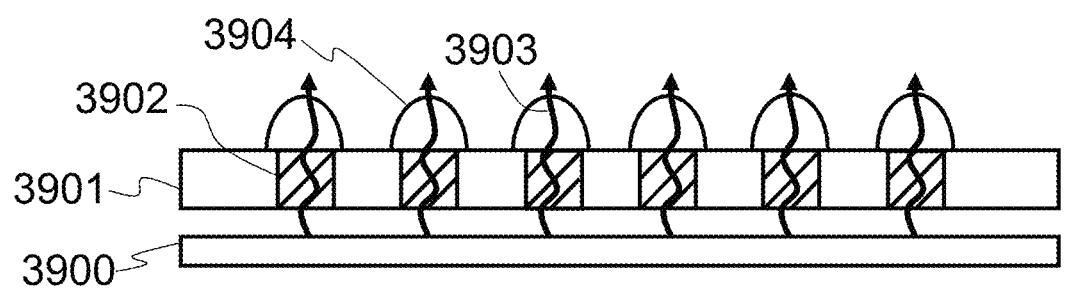
FIG. 39B is a schematic illustrating the substrate of FIG. 39A with embedded array of light passage components having a first type of light beam shaping components.
Figure 39C:
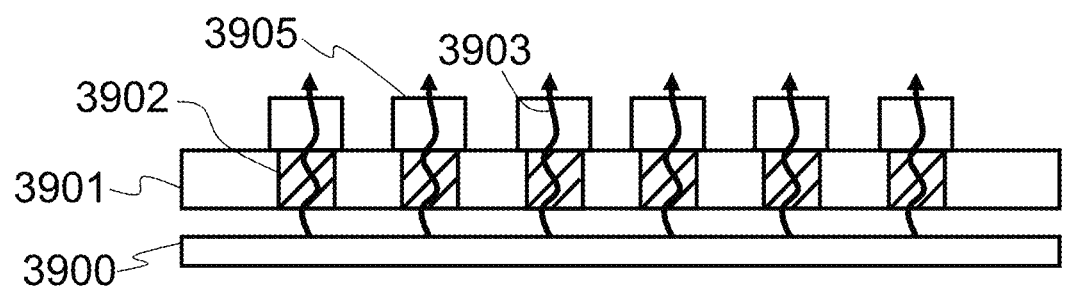
FIG. 39C is a schematic illustrating the substrate of FIG. 39A with embedded array of light passage components having a first type of light beam shaping components.

For the case where the light beam 3903 being still diverging when coming out of the output end of the light passage components 3902, light beam shaping components can be placed immediately next to the light passage components 3902. FIG. 39B shows an example of collimation lens 3904 that can be used to collimate and converge the light beam 3903 to achieve high directionality of the light beam 3903. FIG. 39C then shows an example of optical aperture 3905, for example an optical crystal, optical waveguide or optical fiber, being disposed in immediate proximity to the light passage components 3902. The optical aperture 3905 has the function of selecting light beam 3903 components that is highly directional and allows the passage of such components towards the eye. The collimation lens function of 3904 in FIG. 39B and optical aperture function of 3905 may also be integrated into a single light beam shaping component. Lens 3904 and optical aperture 3905 are preferred to be manufactured and integrated with each light passage component 3902 on the substrate 3901 during a single manufacturing process.

The emitted light beam 3903 angle adjustment can be achieved by a surrounding or underlying mechanical angle adjustment mechanism attached to each individual light passage component 3902. The angle adjustment mechanism is not shown in FIG. 39A-FIG. 39C, and such mechanism can be based on any of: MEMS, magnetic force, piezoelectric effect, electrostatic force, capacitive force, or thermally induced shape change.

The light beam 3903 angle adjustment from the light passage components 3902 can also be achieved by a global curvature change of a flexible substrate 3901 wherein the light passage components 3902 are embedded in the substrate 3901. In one embodiment, the substrate 3901 is a flexible substrate whose surface curvature can be changed upon an externally exerted force. In another embodiment, the substrate 3901 curvature can be change by electrically controlled mechanisms connected directly to, or embedded within, the substrate 3901, wherein such electrically controlled mechanism can be any of: MEMS, magnetic force, piezoelectric effect, electrostatic force, capacitive force, or thermally induced shape change. In one embodiment, the light passage components 3902 are manufactured and embedded into a flexible substrate 3901. Light beam 3903 exiting from each light passage component 3902 is preferred to be in the direction that is normal to the surface of the substrate 3901, such that when curvature of the substrate 3901 changes, light beam 3903 directions at various locations across the substrate 3901 maintains their normal directions to the substrate 3901 surface. The normal direction of the light beam 3903 to the flexible substrate surface 3901 can be further assisted or maintained by the light beam shaping components 3904 or 3905 as in FIG. 39B and FIG. 39C, which are disposed immediately adjacent to the light passage components 3902 on the flexible substrate 3901 and conform to the curvature of the substrate 3901.

The array of light emitting devices of FIG. 37A-FIG. 378C, and the array of light passage components of FIG. 39A-FIG. 39C, can both replace the mirror arrays of the FIG. 35-FIG. 36B and produce light beams following similar light paths of converging behind, within or in front of the eye lens to project image upon the retina as shown in FIG. 35-FIG. 36B.

Figure 40A:
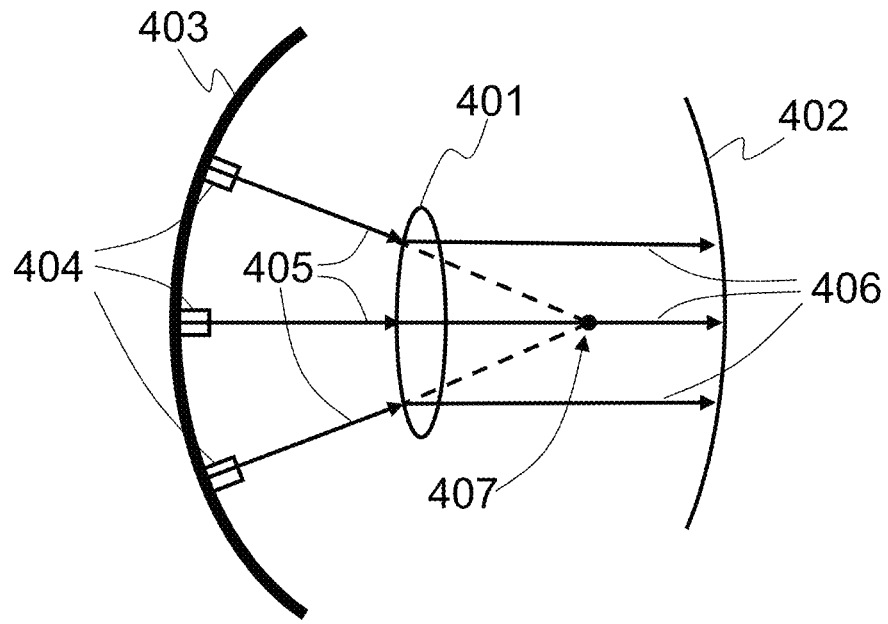
FIG. 40A is a schematic illustrating how a flexible substrate with embedded array of light emitting devices is used to project image on the retina at a first focus depth of the eye-lens.
Figure 40B:
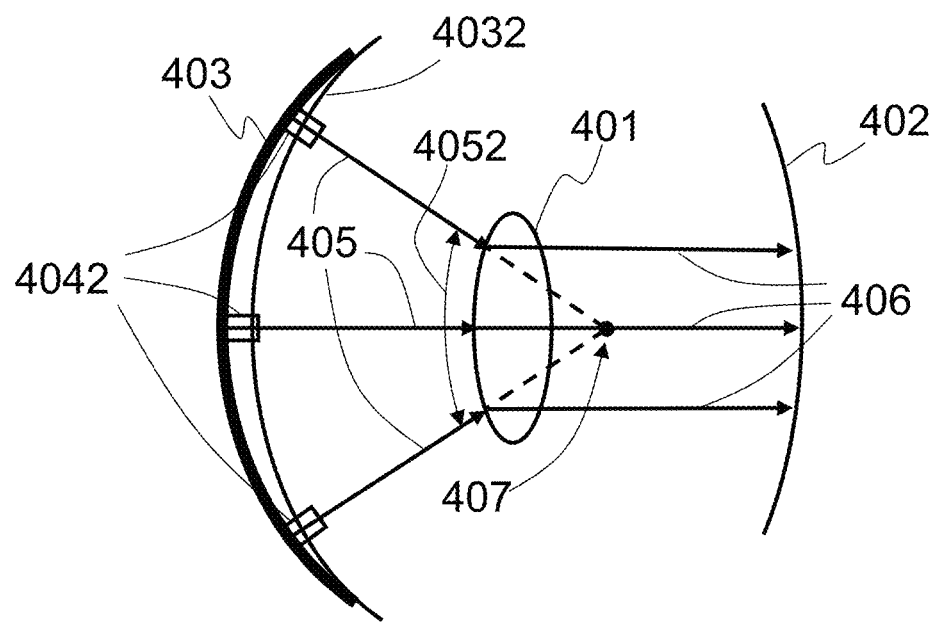
FIG. 40B is a schematic illustrating the flexible substrate of FIG. 40A with embedded array of light emitting devices is used to project image on the retina at a second focus depth of the eye-lens with change of curvature and position of the flexible substrate.

FIG. 40A and FIG. 40B show an example of a flexible substrate with embedded OLED devices being used to project images on the retina of the eye at different focus depth of the eye-lens with changing the curvature of the flexible substrate, during the event of the eye-lens focus depth change by the viewer intention. However, specifications of this example do not limit the application of the general concept of utilizing flexible substrates with embedded light emitting devices in ways that are different than as exactly described in FIG. 40A or FIG. 40B. During description of FIG. 40A and FIG. 40B, the eye-lens 401 will be treated as a typical optical lens.

In FIG. 40A, OLED devices 404 are arranged in an array, preferably in the form of a two-dimensional matrix, across the substrate 403 surface facing the eye-lens 401 of the viewer's eye. OLED devices 404 are arranged in such a way that light beams 405 emitted from the OLED devices 404 are normal to the surface curvature of the substrate 403 at each OLED device 404 location. Light beam shaping components, for example 3704 and 3705, as shown in FIG. 37B and FIG. 7C may also exist on the substrate 403 in immediate proximity to each of the OLED device 404. In the case of the FIG. 40A, light beams 405 that are projected from the substrate 403 surface towards the eye-lens 401 converge towards the focal point 407 of eye-lens 401 at the back of the eye-lens 401, which is between the eye-lens 401 and retina 402. According to principle of optics, after passing through the eye-lens 401, the light beams 405 are diffracted into parallel light beams 406 that produce an image on the retina 402 of the viewer's eye, with each light beam 406 projected upon the retina as a pixel of the projected image.

Designating the two outmost light beams of 406 of FIG. 40A projecting the light spots on the retina 402 being the boundary of the projected image, when eye-lens 401 changes shape, for example as in FIG. 40B when the viewer intends to focus on an object that is closer to the viewer, i.e. focus depth of viewer changes and becomes shorter than in FIG. 40A, the eye-lens 401 is compressed in the vertical length direction and increases in the horizontal width, such that the focal point 407 moves closer to the eye-lens 401 center as in FIG. 40B. To maintain the projected image size and field of view on the retina 402, the light beams 405 are needed to have a larger incoming angle 4052 between the two outmost light beams of 405 as shown in FIG. 40B. Light beams 405 still converge towards the focal point 407 at its closer to eye-lens 401 location. Since the light beams 405 projected by OLED devices 4042 are normal to the substrate surface 403, the light beams 405 are now required to be projected by another set of OLED devices 4042 that are different from the set of OLED devices 404, where outmost light beams of 405 are now emitted from OLED devices 4042 that are closer to the substrate 403 edges. At the same time, the substrate 403 needs to increase its curvature and its center distance from the eye-lens 401 relative to its original curvature and position as labeled 4032 in FIG. 40B, to a new position as shown by substrate 403 to achieve the required projected image on the retina 402 at the changed focus depth of the eye-lens 401.

Besides the substrate curvature and position change to achieve a global light beam angle re-orientation of the incoming light beams 405 as shown in FIG. 40A and FIG. 40B, to project image on the retina 402 at different focus depth of the eye-lens 401, one or more of the OLED devices 404 or 4042 may also have a surrounding or underlying mechanical angle adjustment mechanism that is (1) attached to each of these one or more OLED devices 404 or 4042, or (2) attached to any light beam shaping components disposed in close proximity to each of the OLED device to transmit the light beams as described in FIG. 37B-FIG. 37C, or (3) attached to any reflective optical components, for example mirrors, disposed in close proximity to each of the OLED device to reflect the light beams, and thus adjust the light beams emitted from these OLED devices 404 or 4042, for fine angle adjustment. The angle adjustment mechanism can help accomplish faster and more accurate light beam angle control, or in some embodiments provide light beams at angles that are not achievable by global angle adjustment with the flexible substrate curvature change alone. In some embodiment, for a 2-dimensional matrix of the OLED array, the flexible substrate can be used to adjust light beams angles in a first angular freedom direction and the angle adjustment mechanism is used to adjust light beams angles in the second angular freedom direction orthogonal to the first direction, such that a combined function of flexible substrate and angle adjustment mechanism achieves an effective focus of the light beams at various locations in space. The angle adjustment mechanism is not shown in FIG. 40A and FIG. 40B, and such mechanism can be based on any of: MEMS, magnetic force, piezoelectric effect, electrostatic force, capacitive force, or thermally induced shape change. Even though the FIG. 40A and FIG. 40B are described with assuming all light beams 405 being emitted from OLED devices 404 or 4042 are normal to the substrate surface, in some embodiments, one or more of the OLED devices 404 or 4042 may emit light beams 405 in directions not normal to the surface of the substrate. For example, the OLED devices 404 or 4042 that are closer to the edge of the substrate 403 may emit light beams at angles not normal to the substrate, to achieve a better quality projected image on the retina 402 or to achieve a wider field of view that the viewer perceives. The OLED devices 404 or 4042 emitting light beams 405 not being normal to the substrate surface can be an inherent feature that is built into the OLED array 404 or 4042 on the substrate 403 during manufacturing, or achieved by the angle adjustment mechanisms as aforementioned.

Flexible substrate method as described in FIG. 40A and FIG. 40B is based on OLED devices array. For the same purpose of projecting image at different eye-lens focus depth, the same concept of adjusting the curvature and position of flexible substrate as described in FIG. 40A and FIG. 40B can be readily combined with any array of light emitting devices or array light passage components as described in FIG. 37A-FIG. 39C without limitation and with necessary adjustments as described in FIG. 37A-FIG. 39C.

Figure 41A:
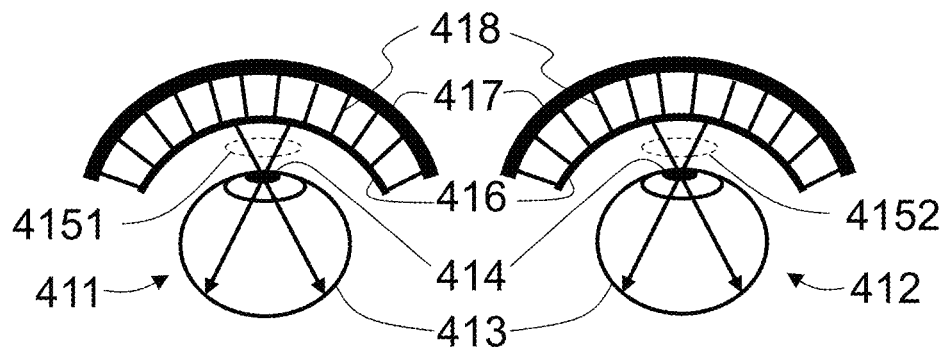
FIG. 41A is a schematic illustrating embodiment how flexible substrates with embedded array of light emitting devices, or array of light passage components, can be used to project image on the retina of the eye when the viewer is focusing on various objects at a first distance and a first viewing angle relative to the viewer.
Figure 41B:
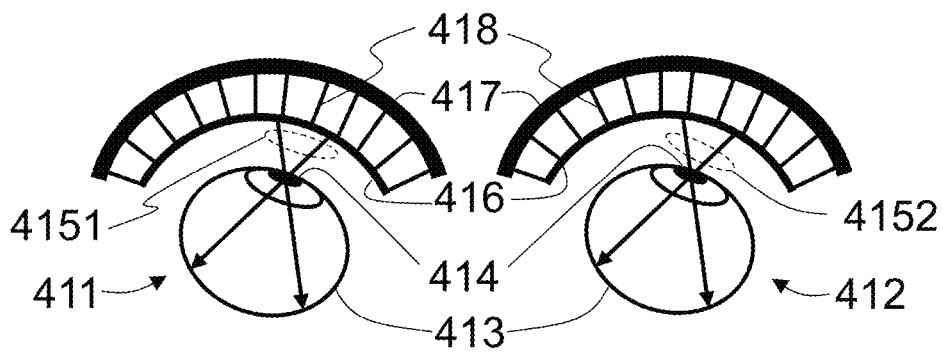
FIG. 41B is a schematic illustrating how flexible substrates of FIG. 41A with embedded array of light emitting devices, or array of light passage components, project image on the retina of the eye when the viewer is focusing on objects at a second distance and a second viewing angle relative to the viewer, with change of the curvature and position of the flexible substrates.
Figure 41C:
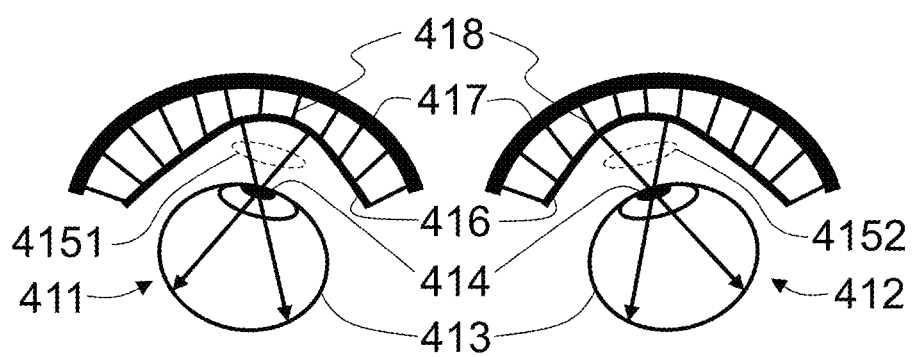
FIG. 41C is a schematic illustrating how flexible substrates of FIG. 41A with embedded array of light emitting devices, or array of light passage components, project image on the retina of the eye when the viewer is focusing on objects at a third distance and a third viewing angle relative to the viewer, with change of the curvature and position of the flexible substrates.

FIG. 41A, FIG. 41B and FIG. 41C describe the embodiment of application of the flexible substrate 416 to project image on retina 413 of the eyes, left eye 411 and right eye 412, of the viewer. FIG. 41A shows the case when the viewer is looking at and focusing on a far object. In FIG. 41A, the eye sights of the two eyes 411 and 412 are sufficiently parallel. One flexible substrate 416 in the curved form and containing light emitting devices or light passage components is positioned in proximity to the pupil 414 of each eye. A housing 417 providing fixture and support for each of the substrate 416 exists on the opposing side of each of the substrate 416 relative to the eyes 411 and 412. The housing 417 maintains its position and is sufficiently stationary relative to each of the eye 411 and 412. The connections 418 as shown in FIG. 41A between each pair of substrate 416 and housing 417 represent the substrate curvature adjustment mechanism that is capable of changing the curvature of the substrate 416 and the position of the substrate 416 relative to the pupil 414 of each eye 411 and 412 during the event of eye sight direction change or eye-lens focus depth change. In the case when light passage components array is embedded in the substrates 416 to produce directional light beams, light emitting devices 3900 as described in FIG. 39A-FIG. 39C can be disposed in between the substrate 416 and housing 417 for each eye. Light beams 4151 from the substrate 416 facing the left eye 411, produced by light emitting devices or light passage components embedded substrate 416, shine into left eye 411 through pupil 414 to project image on the retina 413 of left eye 411, while light beams 4152 from the substrate 416 facing the right eye 412, produced by light emitting devices or light passage components embedded on substrate 416, shine into right eye 412 pupil 414 to project image on the retina 413 of right eye 412.

In FIG. 41B, both eyes 411 and 412 rotate to the right side when the viewer is looking at and focusing on a far object to the right side of the viewer. In FIG. 41B, the eye sights of the two eyes 411 and 412 are still sufficiently parallel due to the object being far, but both eyes rotate to the right side of the substrate 416. With detection of such eye-sight angle change and any focus depth change, the substrate 416 curvature are adjusted by the adjustment mechanism 418. FIG. 41B shows the right side connections 418 connecting to each substrate 416 being elongated and the left side connections 418 connecting to each substrate 416 being shrunk in length, and the substrate 416 facing each eye shows an increased curvature on the right side and a reduced curvature of the left side of each of the substrate 416. Meanwhile, light beams 4151 and 4152 shining into each eye 411 and 412 are produced by a new set of light emitting devices or light passage components closer to the right side of the substrate 416 for each eye. With the aforementioned substrate 416 curvature change and re-arrangement of light beam emitting locations from the substrate 416 as in FIG. 40B, image projection on retina 413 of each eye can be achieved with desired perception by the viewer in the case of FIG. 41B when the viewer rotate the eyes to focus on a right side far object.

FIG. 41C then shows the case when the viewer is looking at and focusing on a near object, where the eye sights of the two eyes 411 and 412 are converging to a point at the center, due to the object being close and centered. With detection of such eye-sight angle change and focus depth change, the substrate 416 curvature are adjusted by the adjustment mechanism 418 for both eyes following the process similar to what is described in FIG. 40B when focus depth becomes shorter. FIG. 41C describes such curvature change of substrate 416 by showing the left eye 411 rotating to the right, while the substrate 416 facing the left eye 411 shows the section of the substrate 416 producing the light beams 4151 having an substantially increased local curvature. At the same time, the connections 418 are shortened at the section of the substrate 416 producing the light beams 4151. With a larger substrate 416 curvature and increased distance from left eye pupil 414 at the section of the substrate 416 producing the light beams 4151, same as described in FIG. 40B, light beams 4151 project image on the retina 413 of the left eye 411 to achieve a correct perception by the viewer to look at a close object. Similarly, for right eye 412 that rotates to the left, substrate 416 facing the right eye 412 and connections 418 undergo same adjustment such that the light beams 4152 from the section of the substrate 416 can project image on the retina 413 of the right eye 412 to achieve a correct perception by the viewer.

The substrate adjustment mechanism 418 as shown in FIG. 41A-FIG. 41C can be based on any one or any combination of: MEMS, magnetic force, piezoelectric effect, or thermally induced shape change, memory alloy, artificial muscle, and air pressure.

FIG. 34-FIG. 41C show various embodiments of methods to utilize array of mirrors, array of light emitting devices, and array of light passage components to produce image directly on the retina of the eye. However, in practice by those skilled in the art, between the various arrays and the eye, other optical components, which can include any of: optical lens, mirrors, prisms, optical filters, optical polarizers, and optical shutters, can be used to control the light beams going into the eye to have the proper configuration to produce desired image. However, the fundamental function of using individual light beam angle adjustment by various described mechanisms, or using global light beam angle adjustment by a flexible substrate, or a combination of the two, is the major function that enables the viewer to see objects far and near with a desired perception from the images projected on the retina when viewer's viewing angle and focus depth change.

FIG. 42A through FIG. 42E then show possible implementations of various mechanical angle adjustment mechanisms as aforementioned from FIG. 34 through FIG. 41C. These examples do not limit the implementation of these mechanisms in ways that are different than as exactly described, but following same demonstrated principles.

Figure 42A:
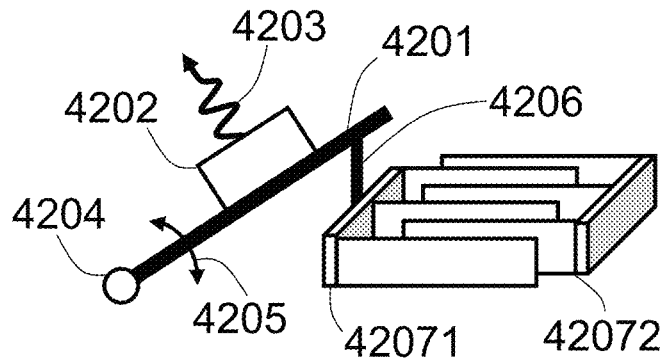
FIG. 42A is a schematic illustrating light beam angle adjustment with a MEMS device.

FIG. 42A shows a light output device 4202, which can be a mirror reflecting an incoming light (not shown in FIG. 42A), a light emitting device, or a light passage device passes an incoming light (not shown in FIG. 42A). Light output device 4202 outputs a directional light beam 4203. Light output device 4203 is disposed on a rotational platform 4201 that has a rotational hinge point 4204. When platform 4201 rotates around the hinge point 4204 as indicated by arrow 4205 by a pushing or pulling force exerted on the fixture 4206 that is attached to the platform 4201, the output device 4202 rotates with platform 4201 and the directional light beam 4203 also changes its direction. FIG. 42A shows the case when the force exerted on fixture 4206 is by a MEMS device, which contains at least one pair of MEMS actuation arm sets, where arm set 42072 is stationary and arm set 42071 is attached to fixture 4206. When the arm set 42071 and arm set 42072 are with various voltage or electrostatic charges, due to electrostatic effect between the arms of 42071 and arms of 42072, the arm set 42071 can move relative to the stationary arm set 42072 and exerts push or pull force on the fixture 4206. Subsequently, the light beam 4203 angle is changed.

Figure 42B:
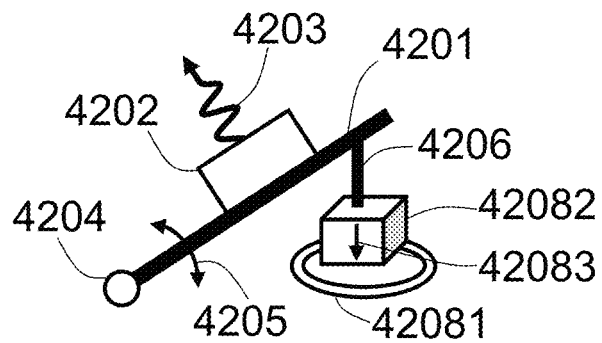
FIG. 42B is a schematic illustrating light beam angle adjustment with magnet and electric coil.

FIG. 42B is identical to FIG. 42A except that the fixture 4206 is attached to a permanent magnet 42082, with 42083 arrow designating the magnetization direction of the magnet 42082. 42081 is an electric coil disposed in proximity to the magnet 42082. When current is applied through the coil 42081 with various current flow directions and current strength, the coil 42081 generates different magnetic field which subsequently pulls or pushes the magnet 42082 and the attached fixture 4206 to change the light beam 4203 angle.

Figure 42C:
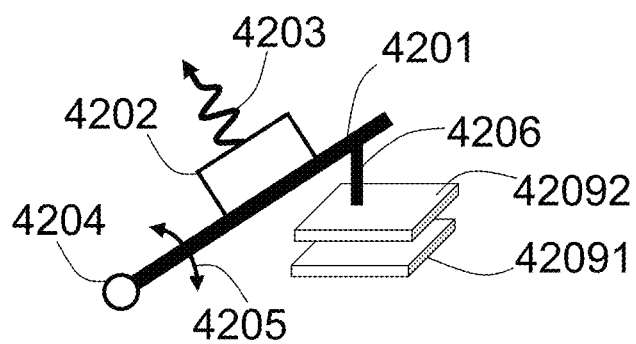
FIG. 42C is a schematic illustrating light beam angle adjustment with capacitive device.

FIG. 42C is identical to FIG. 42A except that the fixture 4206 is attached to an electrode 42092 of a capacitive device, which contains another stationary electrode 42091. When opposing electric charges are stored on electrodes 42091 and 42092, the two electrodes attract each other. When same electric charges are stored on plates 42091 and 42092, the two electrodes repel each other. Alternatively, if the capacitive device is used as a capacitor, where electrodes 42091 and 42092 store opposite charges, and the capacitor is being charged by an electrical source, due to capacitive effect the electrodes 42091 and 42092 will expel each other during the charging process. If the capacitor is being drained of stored charges, due to the capacitive effect the two electrodes 42091 and 42092 will attract each other. During the expel and attraction process of the electrodes, electrode 42092 can move relative to the stationary electrode 42091, which subsequently pulls or pushes the fixture 4206 to change the light beam 4203 angle.

Figure 42D:
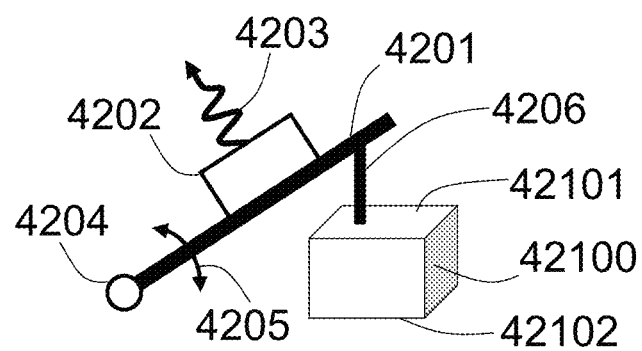
FIG. 42D is a schematic illustrating light beam angle adjustment with a piezo element.

FIG. 42D is identical to FIG. 42A except that the fixture 4206 is attached to a surface 42101 of a piezo element 42100. When a voltage is applied between the surface 42101 and the surface 42102 that is on the surface of the piezo element 42100 opposing the surface 42101, the shape of the piezo element extends or contracts in its shape between the surfaces 42101 and 42102 depending on the direction and amplitude of the voltage. Alternatively, for some other type of piezo element, a voltage can be applied between opposing surfaces of the piezo element 42100 that are normal to the surface of 42101 to induce a piezo element shape change between surfaces 42101 and 42102. When the surface 42102 is fixed on a stationary substrate, or the piezo element 42100 is fixed in space, the piezo element 42100 shape change subsequently pulls or pushes the attached fixture 4206 to change the light beam 4203 angle.

Figure 42E:
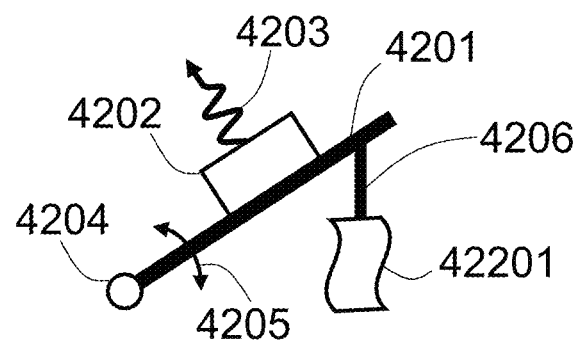
FIG. 42E is a schematic illustrating light beam angle adjustment with a thermally induced shape change element.

FIG. 42E is identical to FIG. 42A except that the fixture 4206 is attached to a thermally induced shape change element 42201, where the free end of the element 42201 is attached to fixture 4206, and a distal end of the element 42201 is fixed on a stationary substrate. When element 42201 is heated or cooled, the shape of element 42201 will change by extending or contracting between the free and the distal ends. Such heating or cooling can be through applying various current flowing through the element 42201, where the current may heat or cool the element depending on the material, composition and structure of element 42201. When the element 42201 shape changes, it will subsequently pulls or pushes the attached fixture 4206 to change the light beam 4203 angle.

While the current invention has been shown and described with reference to certain embodiments, it is to be understood that those skilled in the art will no doubt devise certain alterations and modifications thereto which nevertheless include the true spirit and scope of the current invention. Thus the scope of the invention should be determined by the appended claims and their legal equivalents, rather than by examples given.

What is claimed is:

1. A method to display images to a viewer comprising:
   providing an eye sensor and a substrate containing an array of light emitting devices;
   producing light beams passing through eye-lens of eyes of said viewer to project a first image on retinas of said eyes using said array of light emitting devices, wherein said substrate having a first curvature and said eye-lens having a first focus depth;
   detecting said eye lens having a second focus depth using said eye sensor;
   deforming said substrate to obtain a second curvature, wherein said light beams pass through said eye-lens at said second focus depth to project a second image on said retinas;
   wherein said second focus depth is shorter than said first focus depth and said second curvature is larger than said first curvature.

2. The method according to claim 1, wherein said eye sensor detects said eye-lens changing to said second focus depth through shape change of said eye-lens including:
   compression of said eye-lens in a length direction; and
   increase of said eye-lens in a width direction.

3. The method according to claim 2, wherein said shape change of said eye-lens causes a shape change of corneas of said eyes, and wherein said shape change of said corneas is detected by said eye sensor.

4. The method according to claim 1, wherein said eye sensor comprises an optical emitter and an optical detector.

5. The method according to claim 1, wherein said light beams are directional.

6. The method according to claim 5, wherein said light beams directions are normal to a surface of said substrate facing said eyes.

7. The method according to claim 1, wherein said substrate operates to obtain said second curvature through a curvature adjustment mechanism operated via:

magnetic force;
piezoelectric effect;
thermally induced shape change;
memory alloy; or
air pressure.

8. The method according to claim 7, wherein said substrate is connected to a housing structure on a side of said substrate opposing said eyes.

9. The method according to claim 8, wherein said substrate operates to obtain said second curvature with said curvature adjustment mechanism by changing distance between said substrate and said housing structure.

10. The method according to claim 7, wherein said curvature adjustment mechanism is electrically controlled.

11. The method according to claim 1, wherein said light emitting devices are any of:
light emitting diode;
organic light emitting diode; and
laser diode.

12. The method according to claim 1, wherein at least one of said light emitting devices has an angle adjustment mechanism that is attached to said at least one of said light emitting devices, wherein said angle adjustment mechanism is operated via any one or: Micro Electro-Mechanical System (MEMS), magnetic force, piezoelectric effect, electrostatic force, capacitive force, or thermally induced shape change.

13. The method according to claim 1, wherein at least one of said light emitting devices is attached to a light beam shaping component including any one of: collimation lens, optical crystal, optical waveguide, and optical fiber.

14. The method according to claim 13, wherein said light beam shaping component induces directionality of a light beam passing through said light beam shaping component with any of:
collimating said light beam;
converging said light beam; and
selective passing of directional components of said light beam.

15. The method according to claim 1, wherein said array of light emitting devices are disposed upon said substrate in the form of a two-dimensional matrix.

16. A method to project images to eyes of a viewer comprising:
providing an eye sensor;
providing a substrate having a first curvature and containing an array of organic light emitting diodes (OLEDs);
producing directional light beams passing through eye-lens of said eyes to project a first image on retinas of said eyes using said array of OLEDs, wherein said eye-lens having a focus depth;
detecting a change of said focus depth using said eye sensor;
deforming said substrate to obtain a second curvature after said change of said focus depth, wherein said directional light beams projecting a second image on said retina after said change of said focus depth.

17. The method according to claim 16, wherein at least one light beam shaping component is attached to at least one OLED of said array of OLEDs, wherein said at least one light beam shaping component comprises any of: collimation lens, optical crystal, optical waveguide, and optical fiber.

18. A method to project images to eyes of a viewer comprising:
providing an eye sensor, and a substrate having a first curvature and containing an array of light passage components (LPCs);
an incoming light passing through said array of LPCs resulting in directional light beams passing through an eye-lens of said eyes to project a first image on retinas of said eyes, wherein said eye-lens having a focus depth;
detecting a change of said focus depth using said eye sensor;
deforming said substrate to obtain a second curvature after said change of said focus depth, wherein said directional light beams project a second image on said retinas after said change of said focus depth.

19. The method according to claim 18, wherein said LPCs are any one of: micro optical waveguides, optical fiber sections, or micro optical lens.

20. The method according to claim 18, wherein said eye sensor comprises an optical emitter and an optical detector.

* * * * *